United States Patent [19]

Wood

[11] Patent Number: 5,003,596
[45] Date of Patent: Mar. 26, 1991

[54] METHOD OF CRYPTOGRAPHICALLY TRANSFORMING ELECTRONIC DIGITAL DATA FROM ONE FORM TO ANOTHER

[75] Inventor: Michael C. Wood, Jamestown, N.Y.

[73] Assignee: Cryptech, Inc., Jamestown, N.Y.

[21] Appl. No.: 395,448

[22] Filed: Aug. 17, 1989

[51] Int. Cl.$^5$ .............................................. H04L 9/06
[52] U.S. Cl. .................................... 380/28; 380/9; 380/37; 380/43; 380/50
[58] Field of Search ................ 380/9, 23, 25, 28–30, 380/43, 49, 50, 37, 42, 21

[56] References Cited

U.S. PATENT DOCUMENTS

| | | | |
|---|---|---|---|
| Re. 30,957 | 6/1982 | Feistel | 380/48 |
| 3,461,451 | 8/1969 | Guteber | 341/178 |
| 3,796,830 | 3/1974 | Smith | 380/37 |
| 3,798,359 | 3/1974 | Feistel | 380/37 |
| 3,798,360 | 3/1974 | Feistel | 380/37 |
| 3,958,081 | 5/1976 | Ehrsam et al. | 380/29 |
| 3,962,539 | 6/1976 | Ehrsam et al. | 380/29 |
| 4,074,066 | 2/1978 | Ehrsam et al. | 380/25 |
| 4,078,152 | 3/1978 | Tuckerman, III | 380/37 |
| 4,107,458 | 8/1978 | Constant | 380/37 |
| 4,157,454 | 6/1979 | Becker | 380/37 |
| 4,160,120 | 7/1979 | Barnes et al. | 380/29 |
| 4,172,213 | 10/1979 | Barnes et al. | 380/29 |
| 4,202,051 | 5/1980 | Davida et al. | 380/46 |
| 4,206,315 | 6/1980 | Matyas et al. | 380/23 |
| 4,255,811 | 3/1981 | Adler | 380/37 |
| 4,274,085 | 6/1981 | Marino, Jr. | 380/29 |
| 4,275,265 | 6/1981 | Davida et al. | 380/29 |
| 4,316,055 | 2/1982 | Feistel | 380/37 |
| 4,322,577 | 3/1982 | Brandstrom | 380/37 |
| 4,369,332 | 1/1983 | Campbell | 380/43 |
| 4,375,579 | 3/1983 | Davida et al. | 380/28 |
| 4,703,503 | 10/1987 | Asai | 380/28 |
| 4,731,843 | 3/1988 | Holmquist | 380/29 |
| 4,751,733 | 6/1988 | Delayaye et al. | 380/42 |
| 4,759,062 | 7/1988 | Traub et al. | 380/25 |
| 4,760,600 | 7/1988 | Nakai | 380/50 |
| 4,776,011 | 10/1988 | Busby | 380/37 |
| 4,797,921 | 1/1989 | Shiraishi | 380/28 |
| 4,809,327 | 2/1989 | Shima | 380/44 |
| 4,893,339 | 1/1990 | Bright et al. | 380/28 |

OTHER PUBLICATIONS

Privacy and Authentication: An Introduction to Cryptography, Whitfield Diffie and Martin E. Hellman, Proceedings of the IEEE, vol. 67, No. 3, Mar. 1979, p. 397.
The Data Encryption Standard: Past and Future, Miles E. Smid and Dennis K. Branstad, Proceedings of the IEEE, vol. 76, No. 5, May 1988, p. 550.
An Introduction to Contemporary Cryptology, James L. Massey, Proceedings of the IEEE, vol. 76, No. 5, May 1988, p. 533.

*Primary Examiner*—Stephen C. Buczinski
*Assistant Examiner*—Bernarr Earl Gregory
*Attorney, Agent, or Firm*—Webb, Burden, Ziesenheim & Webb

[57] ABSTRACT

A cryptographic system creates a key table from a single key such that the relationship between the keys in the key table cannot be determined even if the system implementation is known. The system uses variable functions in which the determinants are changed by the variable function chosen by the determinant. Thus, the functions used in creating the key table do not have to be one-to-one functions. From the key table, four blocks of bytes of additional key based determinants are formed which are called masks. The original key does not exist in either the key table or the mask table. The system preferably uses the key table in a multiple round encryption process. The keys chosen from the table for a key addition operation are a function of the plaintext, the current state of the ciphertext, and the mask values. Therefore, the order in which the keys are chosen is not predetermined or patterned. The system also selects the other encryption functions, including permutations and substitutions, by the plaintext, current state of the ciphertext and the mask values. The cryptographic system also can include a function referred to as the enclave function. This function operates on lookup tables and creates complete inter-symbol dependency on the block of bytes.

62 Claims, 15 Drawing Sheets

METHOD OF CRYPTOGRAPHICALLY TRANSFORMING ELECTRONIC DIGITAL DATA FROM ONE FORM TO ANOTHER

BACKGROUND OF THE INVENTION

1. Field of the Invention

This invention relates to cryptography and, more particularly, to a system for protecting stored and transmitted data from cryptanalytic attack.

2. Description of the Prior Art

The use of various cryptographic systems for converting secret or sensitive information from an intelligible form to an unintelligible form is well established. The intelligible form of the information or data is called "plaintext" and the unintelligible form is called "ciphertext". The process of converting from plaintext to ciphertext is called "encryption" or "encipherment" and the reverse process is called "decryption" or "decipherment". Most cryptographic systems make use of a secret value called the key. Encryption and decryption are easy when the algorithm and the key are known, but decryption should be virtually impossible without the use of the correct key. The process of attempting to find a shortcut method, not envisioned by the designer of the algorithm, for decrypting the ciphertext when the key is unknown is called "cryptanalysis".

Cryptography has a long history, tracing its roots back to at least the time of Julius Caesar who employed a substitution cipher in which each letter in the plaintext was replaced by the third later letter in the alphabet. Thus, Julius Caesar employed a linear substitution cipher which used the number three as the secret key. Non-linear substitutions, in which the alphabet is scrambled or mixed are also well-known. However, simple substitutions, whether linear or nonlinear, are relatively easy to attack when only a few sentences of the ciphertext are known. Indeed, William Legrand in Edgar Allan Poe's short story "The Gold-Bug" was able to locate a fortune in buried gold and jewels by a cryptanalytic attack on Captain Kidd's message.

Today's businesses require a much more sophisticated and secure encryption system to protect private message transmissions from computers, facsimile machines, banking machines, and the like. The most secure key based system in the history of cryptography is the one time tape or one time pad. In this system, the key is as long as the message to be encrypted and is simply added (modular arithmetic) to the message. The key is used only once and is randomly derived. Although this method is secure, it is inefficient to create new keys for every block of information transmitted and then secretly distribute these keys. Therefore, the one time tape is seldom if ever used in most applications.

The goal of modern cryptography is to create an encryption system which may not be compromised through current cryptanalytic techniques, or the benefit of breaking the system is not worth the effort required to penetrate the system. In other words, the goal is to design a system which is very difficult to break with current cryptanalytic methods. This is in contrast to the one time pad technique which is impenetrable in both theory and in practice. The one time tape should remain cryptographically unbreakable despite advances in the art of cryptanalysis. However, other prior art systems can and will be broken in time.

Modern encryption systems generally use a short key, such as a key which is eight characters in length. A good example of a modern system is the Data Encryption Standard ("DES") which was developed by IBM in the early 1970's and which was adopted by the United States Bureau of Standards as the standard encryption system for directed to the DES include U.S. Pat. Nos. 3,958,081 and 3,962,539. The Data Encryption Standard is a block type of cipher in which a portion or block of the data to be encrypted is permutated with a prearranged permutation table, modified with a key, and then substituted with a predetermined substitution table. This process is repeated numerous times in what are referred to as rounds. Permutation is also referred to as "transposition" and is a common cryptographic function in which the positions of letters in a message are scrambled in accordance with a predetermined set of directions.

Other modern encryption systems have attempted to simulate the key generation process of a one time pad by using pseudo-random generators which creates a long series of keys having the statistical property of randomness. Patents on such systems include U.S. Pat. Nos. 3,700,806 and 4,369,332. The receiver on the other end of the transmission would have a pseudo-random generator generating keys and using them to decrypt the transmitted ciphertext. Thus the system can change keys as often as desired, even changing the key for every block to be encrypted. The use of pseudo-random generators has greatly enhanced the strength of many systems, but it does not perfectly create a one time pad.

In the cryptanalysis of non-military encryption systems, the following assumptions are generally made: (1) The cryptanalyst knows the encryption system and tables used. If a pseudo-random generator is used, it is also assumed to be known. (2) The cryptanalyst does not know the key. Items 1 and 2 together are generally referred to as Kerckhoff's assumption. (3) The cryptanalyst has a large quantity of previously transmitted plaintext. (4) The cryptanalyst has a large quantity of previously recovered ciphertext corresponding to the plaintext.

A cryptographic system must demonstrate adequate strength under the above conditions. A pseudo-random generator system does not meet all of the criteria for a one time tape. If a pseudo-random generator is used, the relationship between the keys generated would then be given. Although the cryptanalyst may not know the string of keys output (if the generator were key based), he or she would still know the relationship of the key series as it is stated in the pseudo-random generator algorithm. In addition, pseudo-random generators must also be provided with a "seed" value. This, in essence, is another key which has to be generated and distributed for the system. The Data Encryption Standard, with its predetermined permutation and substitution tables and predetermined ordering of the use of these tables, is also subject to cryptanalytic attack. Although the Data Encryption Standard algorithm is a strong encryption system because it is quite complex, it is not impervious to attack by mathematical analysis.

Another technique employing some of the features of a one time pad uses a key table. In this technique, a table including numerous, predetermined keys is included in the encryption system. The keys are then each changed by the secret key. One example of this method can be seen in U.S. Pat. No. 4,776,011. This technique does not perfectly simulate the one time pad for the same reasons the pseudo-random generators do not. The original key table gives the relationship of the keys. Also, in such systems, the order in which the keys are chosen is stated by the system's algorithm, the key combinations selected may be repeated, and without an initializing vector, the same key table will always be used until a new secret key is provided. The invention disclosed herein uses a key table in a unique methodology to overcome these obstacles.

Another method for creating a strong theoretical and practical encryption system is to use a one time function. In this method, every data block encrypted is enciphered by a different cryptographic function combination. In other words, the tables used in the encryption process are variable and a different combination will be chosen by each data block.

Variable functions have also been done in prior art. One example is in U.S. Pat. No. 4,751,733 which includes the use of variable substitution. This patent has many limitations: the patent provides encryption specifically for binary words; the substitution tables must be set up and operate in close relationship to the binary arrangement of the secret key; control codes, which form a key complement or auxiliary key, are needed to direct the substitution process; the method is specifically a substitution-permutation enciphering device; the method does not provide for a variable permutation or other functions; and the method does not provide for an initializing vector which is necessary for one time tape simulation.

It is, therefore, an object of this invention to overcome the weaknesses found in other systems and produce a system which simulates the one time pad process yet requires only a single key. It is another object of the present invention to provide an encryption system which cannot be compromised in theory or in practice, and which allows for a perfect simulation of a one time pad system. It is also an object to create a cryptographic system which provides a one time method approach in that every unique block of data is functionally transformed uniquely. Such has not been accomplished by the prior art and, as a result, the system would offer stronger cryptographic measures against attack. It is also an object of the present invention to provide a secure encryption system which is flexible enough for a variety of applications, such as file storage, data transmission, telecommunication coding and the like. It is also an object to provide an encryption system which permits the use of the block cipher format and provides complete inter-symbol dependency therein.

SUMMARY OF THE INVENTION

Accordingly, I have developed a cryptographic system which includes the creation of a key table from a single key such that the relationship between the keys in the key table cannot be determined even if the system implementation is known. This is accomplished through the use of variable functions in which the determinants are changed by the variable function chosen by the determinant. Thus, the functions used in creating the key table do not have to be one-to-one functions. The determinants are based on the key. From the key table, four blocks of bytes of additional key based determinants are formed which are called masks. These masks are formed from the keys. The original key does not exist in either the key table or the mask table.

The system in accordance with the preferred embodiment of the present invention uses the key table in a multiple round encryption process. Thus, every possible plaintext combination would be encrypted with a different key combination. The keys chosen from the table for a key addition operation are a function of the plaintext, the current state of the ciphertext, and the mask values. Therefore, the order in which the keys are chosen is not predetermined or patterned. The system also selects the other encryption functions, including permutations and substitutions, by the plaintext, current state of the ciphertext and the mask values. In this way, every block will be encrypted with a different combination of permutations and substitutions.

The cryptographic system introduces a function hereinafter referred to as the enclave function. This function also operates on lookup tables and creates complete inter-symbol dependency on the block of bytes. The particular table used with the enclave function is determined only by the mask values. In this way, every block will undergo the same enclave combinations. However, the combination will still be unknown to an attack since the combination chosen is determined from the mask values which were derived from the unknown key.

After the information passes through the predetermined number of rounds of permutations, key additions, enclaves and substitutions, it can be transmitted or stored. Decryption is essentially accomplished by reversing the order of operations with the inverse functions of the substitutions, enclaves, key additions and permutations. The key additions are the same as their inverses.

DESCRIPTION OF THE PREFERRED EMBODIMENT

In a preferred embodiment, the cryptographic system of the present invention is operated in a block cipher format in which small chunks of the plaintext data, referred to commonly as blocks, are encrypted and decrypted at one time. Preferably, the encryption and decryption takes place in a multiple round block type of format. However, it is to be understood that the invention of the present application can also be used in other cryptographic systems, such as stream ciphers and the like, and that multiple rounds may not be employed. However, multiple rounds will strengthen the system considerably.

The encryption system of the present invention uses, in a preferred embodiment, modular arithmetic which is a cyclic mathematical function based on a particular whole number referred to as the modulus. Counting is done by successive incrementing until the number one is less than the modulus reached, and then starting over again with zero. An example of modular 3, compared with whole numbers, can be shown as follows:

| Whole: | 0 | 1 | 2 | 3 | 4 | 5 | 6 | 7 | 8 | 9 | 10 |
|---|---|---|---|---|---|---|---|---|---|---|---|
| Mod 3: | 0 | 1 | 2 | 0 | 1 | 2 | 0 | 1 | 2 | 0 | 1 |

Thus, 10 modular 3, Which is commonly abbreviated as 10 mod 3, is equal to 1. Modular arithmetic can more easily be done by successively subtracting the modular from the number in question until the result is between zero and the modulus minus 1. For example: $10-3=7$; $7-3=4$; and $4-3=1$. Thus, 10 mod 3 since the last subtraction resulted in an answer between 0 and 2, with 2 modulus 1. The general format for a modular arithmetic function is (whole number) mod (modulus)=whole number smaller than the modulus.

Figure 1:
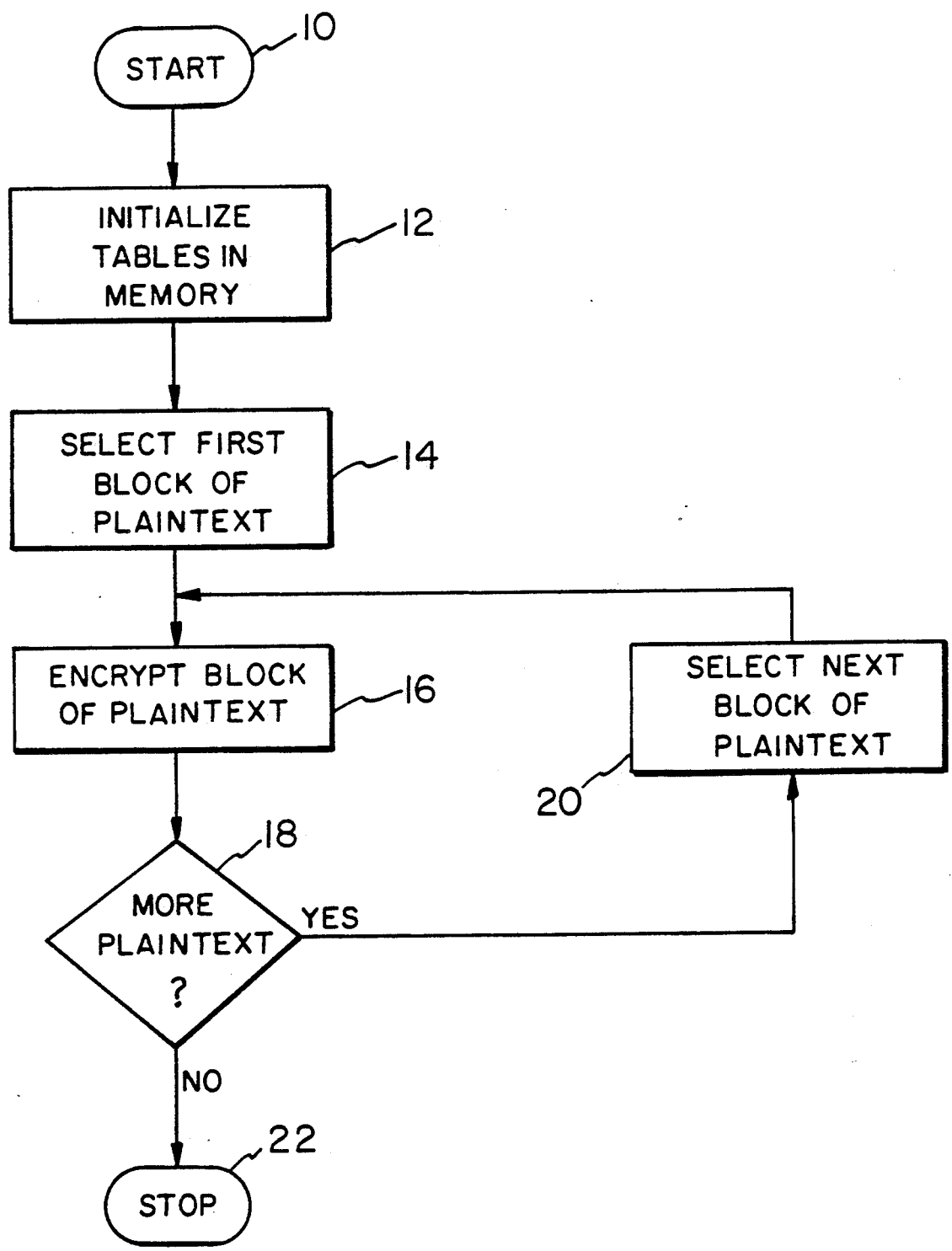
FIG. 1 is a flow chart of the encryption of a length of plaintext in accordance with the present invention.

As shown in FIG. 1, the system commences at the start, reference 10, and then control passes to reference 12 for the initialization of various tables in memory. As will be explained hereinafter in more detail, a number of tables are supplied to the system and a number of tables are created within the system. This takes place initially before any plaintext or ciphertext is encrypted or decrypted. Control then passes to reference 14 where the first block of plaintext is selected. Although FIG. 1 is shown in connection with the encipherment of blocks of plaintext, the same steps would also be followed for decrypting selected blocks of ciphertext. Control then passes to reference 16 where the selected block of plaintext is encrypted in accordance with the cryptographic system of the present invention. If there is more plaintext left to be encrypted, as determined by query 18, the next block of plaintext is selected at reference 20 and the next block is encrypted. If there is no more plaintext, then the system stops operation at reference 22.

Figure 2:
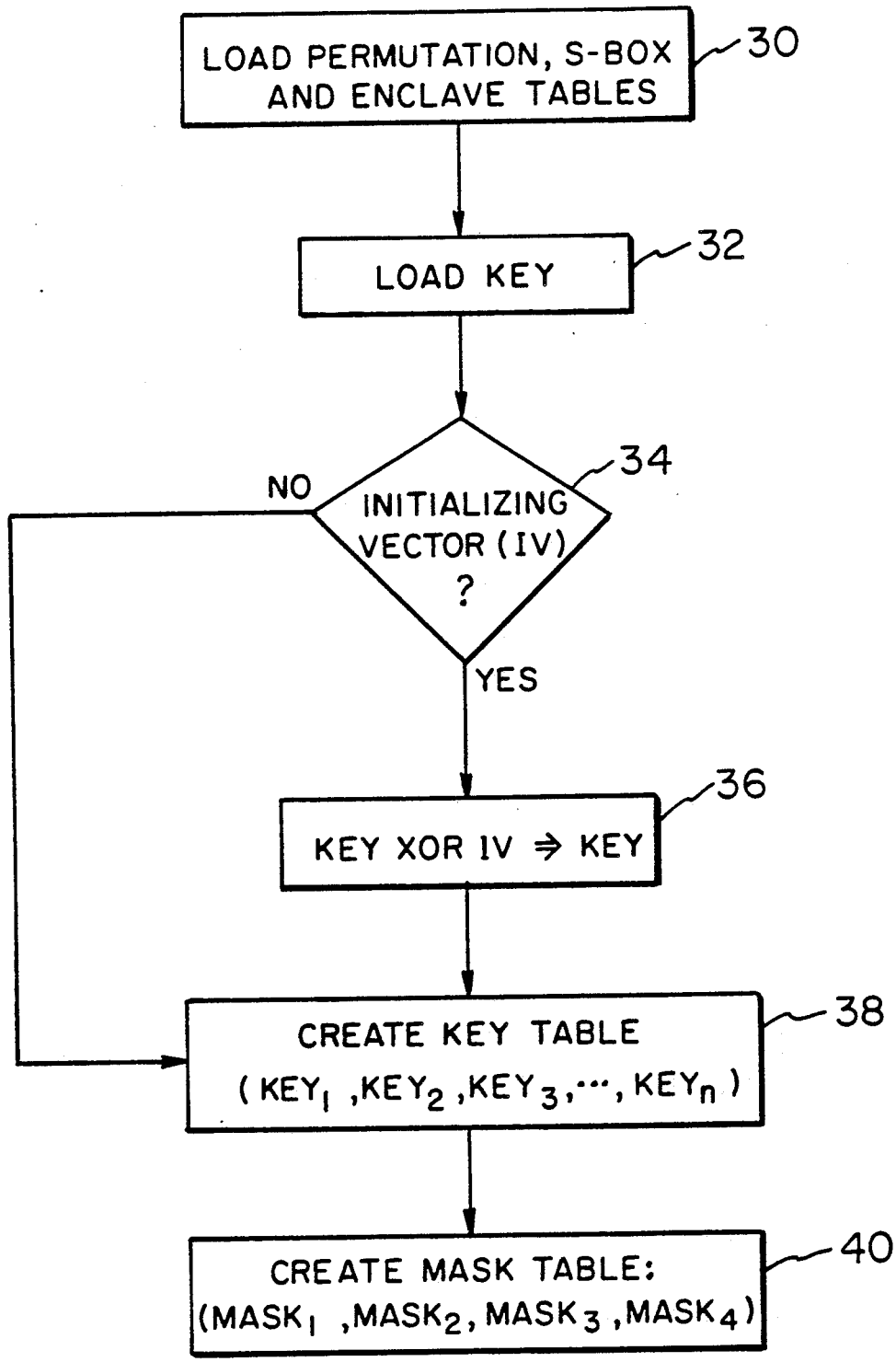
FIG. 2 is a flow chart of the table initialization step shown in FIG. 1.

The step of initializing the tables in memory is shown in more detail in FIG. 2. A permutation table, an S-box table and an enclave table are initially loaded into the system's memory at reference 30. The permutation table includes a plurality of addressable entries which dictate in a particular fashion how the position of the bytes in the block of data undergoing encryption will be scrambled, or will be descrambled for decryption. This is a commonly used cryptographic technique. The S-box table is an arrangement for a plurality of substitution entries which dictate, as directed by a particular entry, how the actual values of each byte of the block undergoing transformation will be changed to another value. While this could be included in the form of a standard substitution table, the S-box table arrangement is more efficient computationally and is well-known in the field of cryptography. The enclave table, loaded into the memory at reference 30, will be explained hereinafter in more detail.

The initial key is then loaded into the system at reference 32. For purposes of this application, a key is any secret value or data block which is not expressly stated or set forth in the system implementation, algorithm or tables, but is installed or loaded into the system to direct the cryptographic process. Basically, a key is a secret value or values upon which the cryptographic process acts, but is not a part of the algorithmic implementation. The system then decides at query 34 whether an initializing vector is included. The use of an initializing vector is common in the field and is typically used when transmitting data across telephone lines and the like. The initializing vector is sent across the lines before the enciphered data and is used in further decryption of the data. As shown at reference 36, the key is combined with the initializing vector in an Exclusive OR operation, in a bit by bit manner, to modify the initial key which is then used at reference 38 to generate the key table. Rather than use an Exclusive OR function, the values of each byte in the key could be added to the value of each byte in the initializing vector to modify the initial key. These are both standard techniques in cryptography for using an initializing vector in connection with a key. If no initializing vector is used, then control passes directly to reference 38 where the key table is generated from the unchanged initial key. Once the key table is created, then control passes to reference 40 where the mask table is generated from the entries generated in the key table. The particular processes used to generate the key table and mask table entries from the initial key are explained hereinafter in detail.

In accordance with a preferred embodiment of the present invention, the block size of the data undergoing cryptographic transformation is selected to be ten bytes long, with each byte including eight digital bits therein. Seven of the bits in each byte are used for the data values and the eighth bit is a parity bit as is well-known in the field. In the preferred embodiment here, the key has been selected to be the same length as the block of data undergoing encryption and decryption. However, the key could be other lengths, if desired. It is necessary that the key be long enough to make guessing the key by an exhaustive attack very difficult. When using seven value bits in each byte, it is preferred that each key include between eight and twenty bytes. While key lengths longer than twenty bytes can be used, it would make the computation in the cryptographic system much more difficult and time consuming and would increase the length of the various tables used in the system, correspondingly increasing the memory space required. The same considerations are applicable in selecting the block of plaintext undergoing encryption, particularly when small blocks of information will be sent through the system. The block size should include an even number of bytes if the enclave function of the present invention is used. However, the block size could be an odd number of bytes if the enclave function was not used.

A major element of the cryptographic system of the present invention is that the particular permutation, substitution or enclave table used in performing a particular cryptographic function on the data is a function of certain values or elements in the data undergoing transformation. This aspect of the present invention is being referred to as a variable function, which is any function where two or more possible choices exist.

This aspect of the present invention is also used initially in generating, from an initial key, a key table which is later used in the encryption/decryption process. Generally, one or more elements from the key are selected and the result of a predetermined mathematical function is used to choose a variable function table. The function is performed on the present state of the key in accordance with the selected table to generate a new key. The result of the mathematical function could also be used to pick, from many available possibilities, the particular function used in conjunction with a particular table. In the preferred embodiment of this invention, the particular type of function is preset and only the table used in conjunction with that function is selected by means of the data undergoing encryption/decryption.

Figure 3:
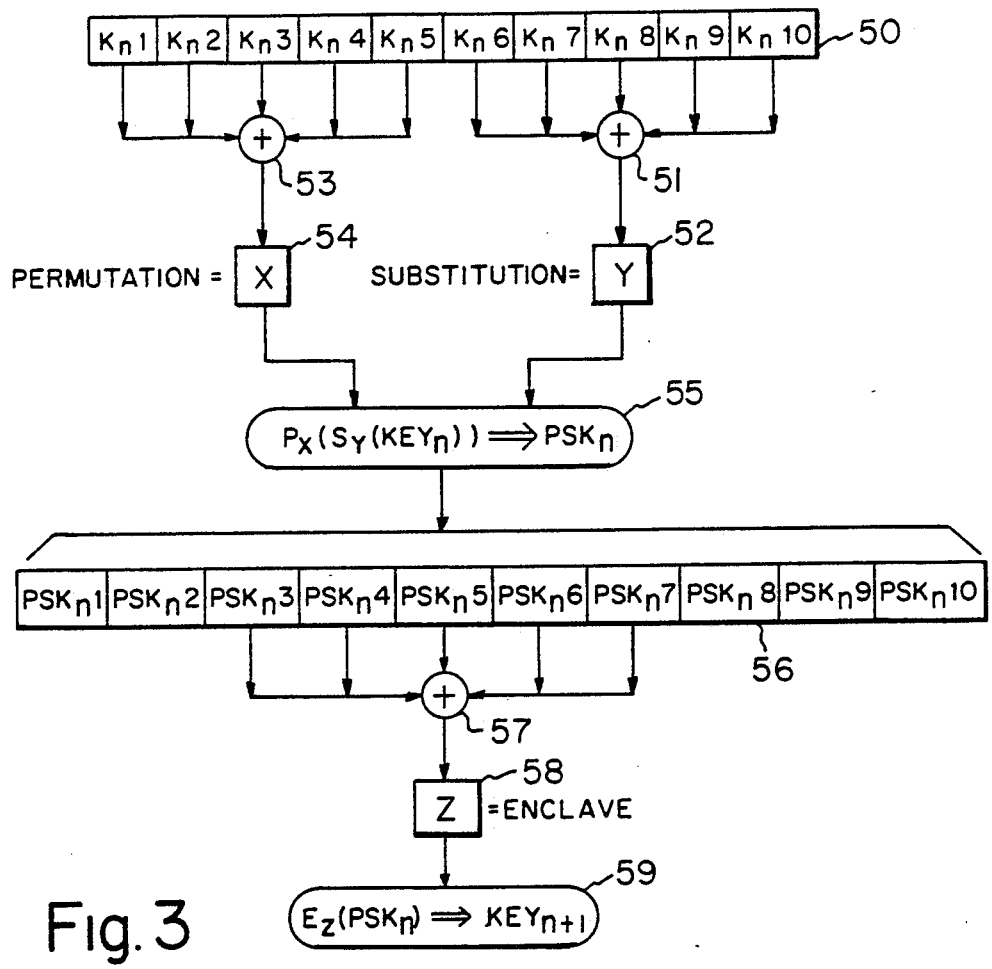
FIG. 3 is a block diagram showing the creation of each entry in the key table.

A particular arrangement for producing the elements of the key table, which uses substitution, permutation and enclave functions, is set forth in FIG. 3. The ten bytes of the key undergoing transformation are shown in element 50 as $K_n1$-$K_n10$. In selecting the substitution table used, the values of the last five bytes of the key are added together using modular arithmetic at element 51 to generate a digital number stored in memory register Y at element 52. The modulus of the modular arithmetic used at element 51 would be determined by the size of the substitution table used in the system. In a preferred embodiment, the substitution table would include 32 tables for 128 byte values and, therefore, the arithmetic used at element 51 would have a modulus of 32. In an example included hereinafter in this application, the substitution table has, for ease of understanding, only 16 tables and element 51 would be modular 16. While FIG. 3 shows the addition of the values in the last five bytes of the key undergoing transformation to generate the number used in selecting the substitution table, it is to be understood that any combination of the ten bytes in the key, including all ten, could be used to generate the Y value at element 52.

In selecting the permutation table used in FIG. 3, the first five values of the key are added together using modular arithmetic at element 53 to generate a digital number stored in memory register X at element 54. Similar to the substitution table calculation, the modular arithmetic used at element 53 for generating the permutation table X would be dependent upon the size of the permutation table used in the system. In a preferred embodiment, there are 128 entries in the permutation table and, therefore, the modular arithmetic at element 53 would be modular 128.

The value Y generated at element 52 is used to select the substitution table which is used to modify the current state of the key. The key is then substituted in accordance with this table. Thereafter, the value X generated at element 54 is used to select the particular permutation table. The key, which previously underwent a substitution operation, is now permutated in accordance with the selected table. This operation, which transforms $key_n$ to an intermediate state referred to as $PSK_n$, is set forth in element 55 in FIG. 3. The transformed key, after undergoing first the substitution and then the permutation, is represented in FIG. 3 as element 56, including bytes $PSK_n1$-$PSK_n10$.

Figure 4:
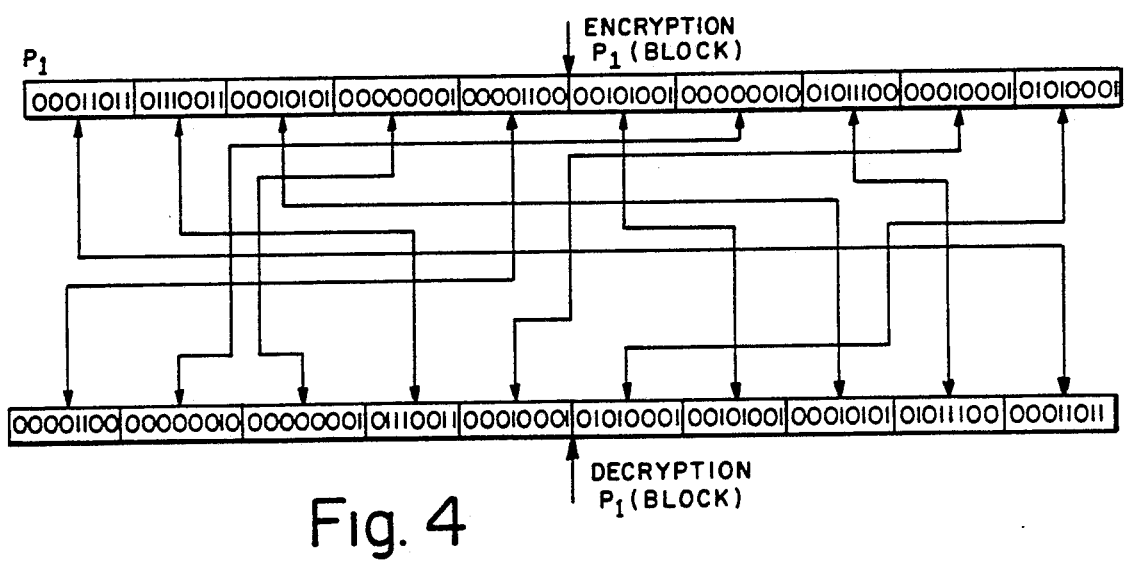
FIG. 4 is a diagram representing an example of one entity in a permutation table.
Figure 5:
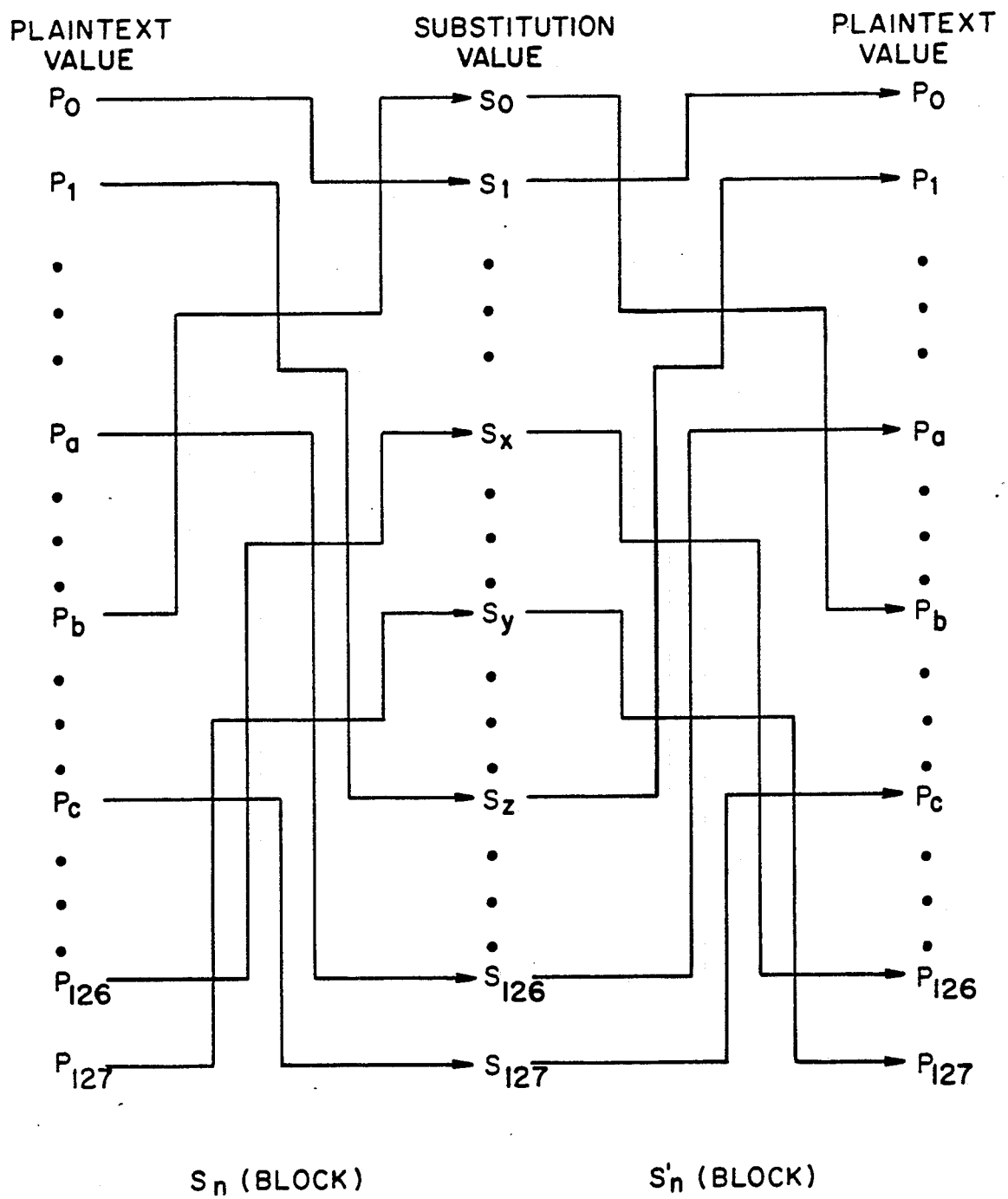
FIG. 5 is a schematic representation of an example of one entry in a substitution table.

A sample permutation table entry is shown in FIG. 4. The position of the eight bit bytes at the top of FIG. 4 will be scrambled as directed by the various arrows to the new position shown at the bottom of FIG. 4. Working from the top to the bottom gives an encryption of the data. To decrypt the data, the positioning is rearranged from the bottom to the top to recapture the initial arrangement of the data. This is a standard technique used in many cryptographic systems and need not be explained in further detail in this application. Likewise, a typical entry in the substitution table is shown in FIG. 5. If a particular plaintext value appears in any of the bytes of the data undergoing transformation, then the substitution table used will direct that the plaintext value be substituted by a new value. For instance, if the plaintext value is $P_0$, then, in accordance with the table shown in FIG. 5, it will be substituted by the new value of $S_1$. Working backwards through the substitution table, the encrypted data can then be decrypted to recapture the original plaintext values. Once again, this is a standard cryptographic technique and need not be explained in further detail. It must be understood that the particular arrangements shown in FIGS. 4 and 5 are only representative of the many possibilities of permutation and substitution table entries and that many other entries would be included in the tables used in the cryptographic system of the present invention.

In FIG. 3, the intermediate state of the key at element 56 is further modified in accordance with a newly developed function, referred to as an enclave function by the applicant. The enclave process is also a variable function in which certain values of the data undergoing transformation are used to generate a number which in turn is used to select which of a plurality of enclave tables will be used to perform the further transformation of the data. In the embodiment shown in FIG. 3, certain values of the intermediate state of the key in element 56, bytes 3, 4, 5, 6 and 7 as shown, are added together using modular arithmetic at element 57 to create a digital number identified as Z and stored in memory register Z in element 58. In a preferred embodiment, the enclave table includes 32 entries and, accordingly, the arithmetic performed at element 57 would be modular 32. Thereafter, the intermediate state of the key is further transformed according to the particular enclave table selected and this transformed key is entered into the key table at element 59. The enclave function will be described in detail hereinafter in connection with FIGS. 6 and 7.

In accordance with the notation used in the present application, "Key" is used to represent the initial key. The initial key is used to generate the first key in the key table, which is identified as $Key_0$. $Key_0$ is stored in the key table and is then used to generate the next entry in the key table, namely, $Key_1$. $Key_1$ is created from $Key_0$ by following the same steps set forth in FIG. 3 for generating $Key_0$ from the original key. The remaining keys in the key table are generated in turn from the immediately preceeding key until the key table is filled. The generation of a key from its predecessor in the key table is represented as element 59 in FIG. 3 where $Key_n$ is used to generate $Key_{n+1}$.

The number of entries in the key table should be a factor, or divide evenly into the alphabet space. In the preferred embodiment described herein, the alphabet space is $2^7$ or 128. If the number of entries is not a factor of the alphabet space, then the statistical chance of certain keys being used is greater than other keys. This discrepancy could aid a cryptanalyst and should be avoided. The maximum number of entries in the key table is the size of the alphabet space and the maximum has been used in the preferred embodiment.

In general, each key in the key table is generated as a result of a variable function performed on the previous key, with the particular variable function determined by information extracted from the prior installed or generated key. The initial key would be the installed key and the generated keys have been referred to as $Key_0$, $Key_1$, etc. In this manner, the key table does not include the initial secret key and, therefore, it is impossible to solve for the initial key from knowledge of information in the key table. As will be explained hereinafter in more detail, a different set of keys will be selected in each round of the encryption and this makes it impossible to search for or solve mathematically for one key used repetitively. This simulates a one time tape when an initializing vector is used with every transmission in connection with the initial key. Also, knowing one key in the key table cannot give the attacker the previous key since a cryptanalyst cannot work backward through the key table. Therefore, this arrangement is much better than a pseudo-random key generator.

It must be noted that the arrangement set forth in FIG. 3 is just one possible implementation of the present invention. There are almost an infinite number of variations possible without changing the spirit or scope of the invention. Any process using the initial key or an installed data block to choose a variable function to create a key table such that the variable function table chosen cannot be determined from the new key created would fall within the scope of this invention.

Figure 6:
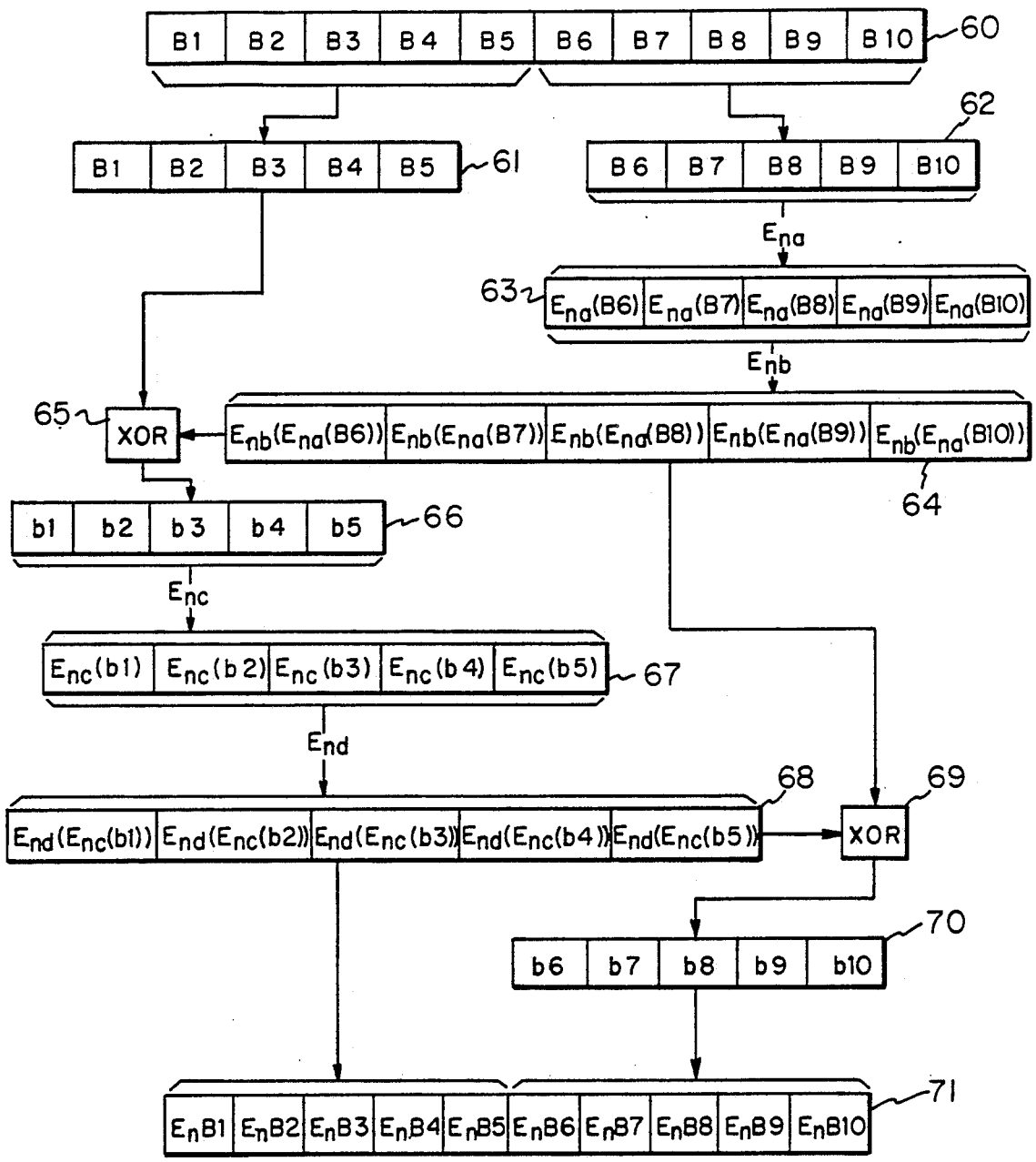
FIG. 6 is a block diagram of the enclave function used in the present invention.

FIG. 6 represents a block diagram of the enclave function used in the present invention. The enclave function is used both in generating the key table in FIG. 3 and is also used in the encryption process shown hereinafter in FIG. 8. The block undergoing transformation is referred to as element 60 in FIG. 6. The block is divided into two portions, namely, a first or left half-block 61 including the first five bytes and a second or right half-block 62 including the last five bytes. Other arrangements for dividing the block into half-blocks can be used, including using the even bytes for the first half-block and the odd bytes for the second half-block, and other arrangements. The block undergoing transformation must include an even number of bytes for the enclave function.

An autoclave function is a known technique in cryptographic systems for changing a block by a function performed on itself. The enclave process of the present invention uses an autoclave type of function in conjunction with other manipulations on the data block to provide complete inter-symbol dependency throughout the entire ten byte block. Complete inter-symbol dependency is achieved when every byte of the block is a function of every other byte of the block and itself.

In the arrangement shown in FIG. 6, the right half-block 62 is transformed by an autoclave function referred to as $E_{na}$ to a new data block referred to as element 63. The particular autoclave function used at $E_{na}$ will be described hereinafter in more detail in connection with FIG. 7. The right half-block at element 63 then undergoes a second autoclave transformation, referred to as $E_{nb}$, to generate the half-block at element 64. This half-block is then combined by a bit by bit Exclusive OR function with the unchanged left half-block 61 at element 65 to generate a new left half-block at element 66. The left half-block at element 66 then undergoes an autoclave function $E_{nc}$ to generate a transformed left half-block at element 67. Thereafter, the left half-block in element 67 undergoes a subsequent autoclave transformation $E_{nd}$ to generate a modified left half-block at element 68. Then the left half-block in element 68 is combined by an Exclusive OR function with the previously transformed right half-block at element 64. This Exclusive OR function generates a new right half-block at element 70. Then the left half-block at element 68 is joined to the right half-block at 70 to create an entire block at element 71 which has undergone the enclave function of the present invention.

After the right half-block 62 has undergone the two autoclave functions in accordance with $E_{na}$ and $E_{nb}$, the right half-block has achieved complete inter-symbol dependency within itself. When the left half-block 61 and the current right half-block 64 are combined by an Exclusive OR function at element 65, the left half-block is completely inter-symbol dependent with the right half-block. When the left half-block at element 66 is then transformed by the two autoclave functions $E_{nc}$ and $E_{nd}$, the left half-block at element 68 will be completely inter-symbol dependent with itself and with the right half-block. Therefore, the left half-block has achieved complete inter-symbol dependency with the entire ten byte block. After the right half-block at element 64 is combined by an Exclusive OR function with the current left half-block at element 69, the right half-block is entirely inter-symbol dependent on the entire ten byte block. When the left half-block at element 68 and the right half-block at element 70 are merged together to form the complete block at element 71, every byte of the block is a function of every other byte of the block and of itself.

The particular autoclave function used in the enclave function shown in FIG. 6 is a process where the element or byte in the half-block undergoing transformation is added to two other elements in the half-block. This process is repeated until each element in the half-block has been so modified. To create the complete inter-symbol dependency within each half-block, it is necessary that at least two elements be added to the element being changed. In addition, this autoclave process is carried out twice on the entire half-block to insure that all of the bytes in the half-block are functions of themselves and of every other byte. $E_{na}$, $E_{nb}$, $E_{nc}$, and $E_{nd}$ are represented by a plurality of enclave tables, each of which includes an entry a, an entry b, an entry c and an entry d. A sample table $E_n$ is set forth below:

| $E_{na}$ | $E_{nb}$ | $E_{nc}$ | $E_{nd}$ |
| --- | --- | --- | --- |
| 3 1 5 | 5 4 3 | 4 1 3 | 3 4 5 |
| 5 3 4 | 2 3 1 | 3 2 5 | 5 2 1 |
| 4 2 1 | 4 2 5 | 1 5 2 | 4 1 3 |
| 1 4 2 | 3 1 2 | 2 3 4 | 2 5 4 |
| 2 5 3 | 1 5 4 | 5 4 1 | 1 3 2 |

Each sub-table has five columns and the autoclave function is performed in five steps from top to bottom. The height of the column of each of the sub tables must be equal in length to the half-block undergoing transformation. In the preferred embodiment, the height of the columns are five since the blocks are ten bytes long and the half-blocks are five bytes long. Every column must include a number signifying every byte in the half-block. In the preferred embodiment, the numbers 1–5 designate the bytes since there will be five bytes in each half-block. Every byte must be accounted for in every column. The row length must be greater than one-half the half-block length and every row must contain a distinct numerical value between one and five. In other words, none of the numbers one through five should be repeated in any row of a sub-table. The total number of tables $E_n$ should be a factor of the encryption space. In summary, the vertical rows of each sub table of $E_n$ must have a different number from one through five and each horizontal row must all have different numbers from one through five. In addition, each of the second and third elements of the sub-table in a particular row must be different from the first entry. The first entry (i.e., in the first row) gives the identity of the byte of the block undergoing transformation and the second and third entries (in the second and third rows) represent the bytes which are arithmetically joined to the byte undergoing transformation to come up with the new value.

Figure 7:
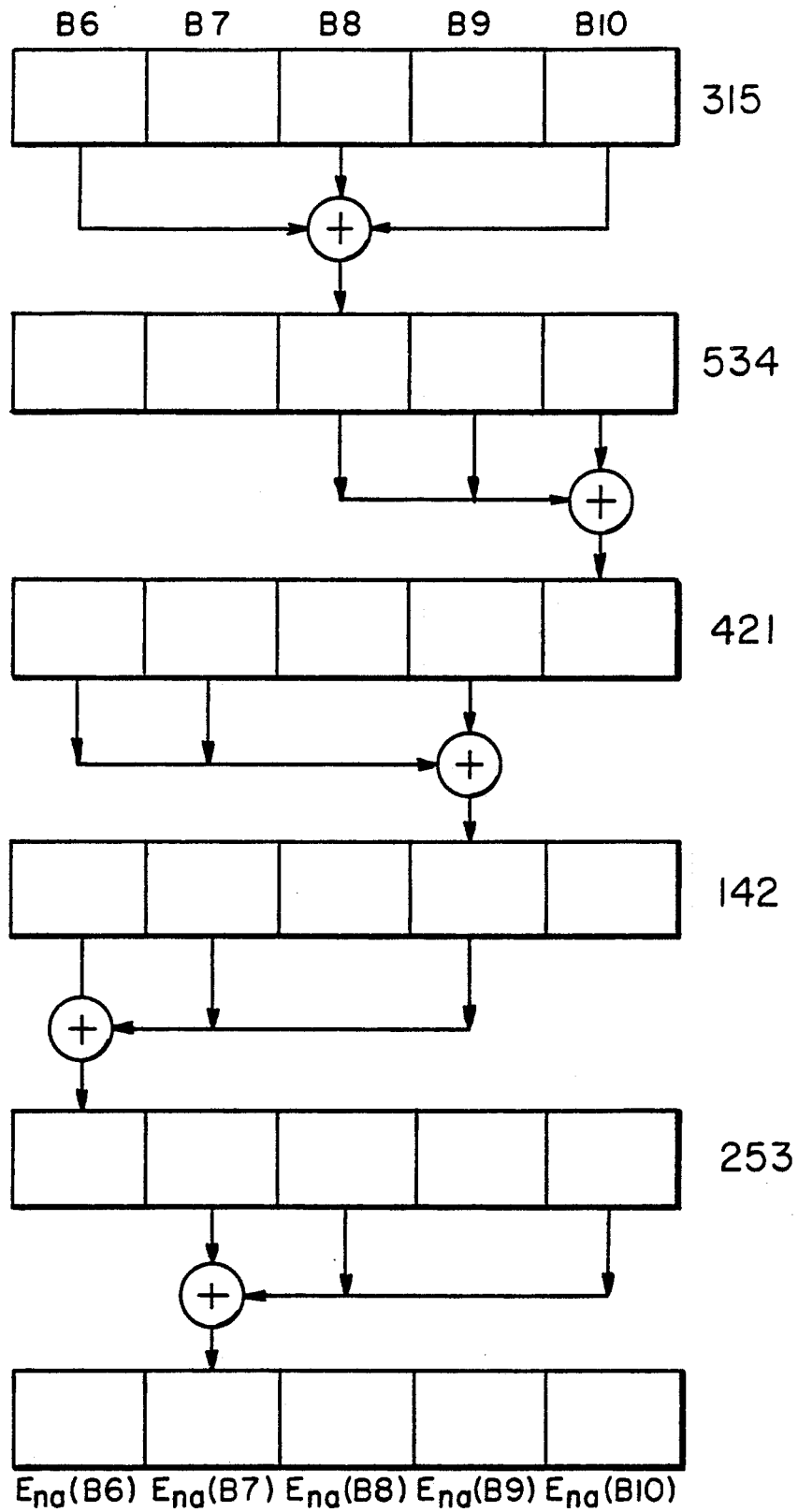
FIG. 7 is a block diagram of the autoclave function used in the enclave function of FIG. 6.

This autoclave function can be represented better in connection with FIG. 7 which shows the transformation of the right half-block in accordance with the specific sample table $E_{na}$ set forth above. The first entry in $E_{na}$ is "3 1 5" which means that the third byte of the half-block (i.e., byte 8 or B8) is added to the value of the first byte (B6) and the fifth byte (B10) to generate the new value of the third byte (B8). Modular arithmetic for each addition is used in accordance with the size of alphabet space. Here, modular 128 would be used in the arithmetic step since the alphabet space is $2^7$ or 128 as determined by the seven data bits in each byte in the preferred embodiment. The next entry in $E_{na}$ is "5 3 4" which means that the fifth byte (B10) is added to the third byte (B8 which had previously been transformed) and also to the fourth byte (B9). The third entry is "4 2 1", which means that the fourth byte (B9) is added to the second byte (B7) and the first byte (B6). The fourth entry, "1 4 2", instructs that the first byte (B6) is added to the fourth byte (B9) and the second byte (B7). The fifth entry in table $E_{na}$ is "2 5 3" which means that the second byte (B7) is added to the fifth byte (B10) and the third byte (B8) to generate the new second byte (B7). As discussed above, the autoclave function is repeated with another table, $E_{nb}$, to create complete inter-symbol dependency within the particular half-block undergoing transformation. $E_{na}$, $E_{nb}$, $E_{nc}$ and $E_{nd}$ could all be identical to each other, but it is better if each of the sub-tables within a particular enclave table $E_n$ are different from each other.

The particular enclave table $E_n$ selected is determined in accordance with a number generated previously through an arithmetic function on the data undergoing transformation. In connection with the creation of the key table, the enclave table selected is determined by the number Z which is generated at element 58 in FIG. 3. The notation "n" in connection with the enclave process in FIG. 6 is to be distinguished from the notation "n" used in connection with generating the entries of the key table in FIG. 3.

The last step shown in the initializing routine set forth in FIG. 2 is the creation of the Mask table at step 40. The Mask values are determinants which are used in the encryption and decryption process to aid in selecting particular entries within tables to perform a transformation on the data. The function of the Masks, which will be apparent later, is to add another distinguishing factor so that a cryptanalyst cannot work backward through the cryptographic algorithm and calculate the original key used in the system.

Generally, the Mask values are the arithmetic result of two or more values from the key table or the original key. The preferred embodiment contains four Mask values with a notation of $Mask_n$ where n can be from one to four. The maximum range for n is equivalent to the number of variable functions included in the cryptographic system. In the preferred embodiment, the system includes permutation, key addition, enclave, and substitution variable functions and, accordingly, the maximum n for the Masks will be four. Each Mask table entry is a block of ten bytes. Therefore, each of these bytes can be addressed as $Mask_{n,b}$ with b ranging from one to ten. In the preferred embodiment, the Masks are created as follows: The first byte in $Mask_1$, referred to as $Mask_{1,1}$, is generated by summing the values of the first byte in the first 32 keys of the key table. These values are summed up using modular arithmetic, herein modular 128, as determined by the alphabet space. The subsequent bytes of the first Mask are each in turn generated by summing up the corresponding byte in each of the first 32 keys in the key table. The second Mask, referred to as $Mask_2$, is generated by a similar summation of the bytes in the next 32 keys in the table, i.e., $Key_{32}$... $Key_{63}$. Similarly, the third Mask is created by operations on the next 32 keys in the key table, namely, $Key_{64}$ through $Key_{95}$. Lastly, the fourth Mask is created by using $Key_{96}$ through $Key_{127}$. The Mask creation can be represented mathematically by the following equations (with 1 less than or equal to b which is less than or equal to 10):

$$MASK_{1,b} = Key_{0,b} + Key_{1,b} + \ldots + Key_{31,b}$$

$$MASK_{2,b} = Key_{32,b} + Key_{33,b} + \ldots + Key_{63,b}$$

$$MASK_{3,b} = Key_{64,b} + Key_{65,b} + \ldots + Key_{95,b}$$

$$MASK_{4,b} = Key_{96,b} + Key_{97,b} + \ldots + Key_{127,b}$$

Other options are available for creating the key table and Masks. The Masks could be generated by just generating four more keys in the key table creation and using these four additional keys as the four Masks. Also, the keys in the key table could be created by the same method used in generating the Masks. Also, the key table could be generated by making the third key a function of the first two keys with or without the use of variable functions after the first two entries in the key table had been generated. Thus, succeeding keys can be created by any of the previously generated keys.

Figure 8:
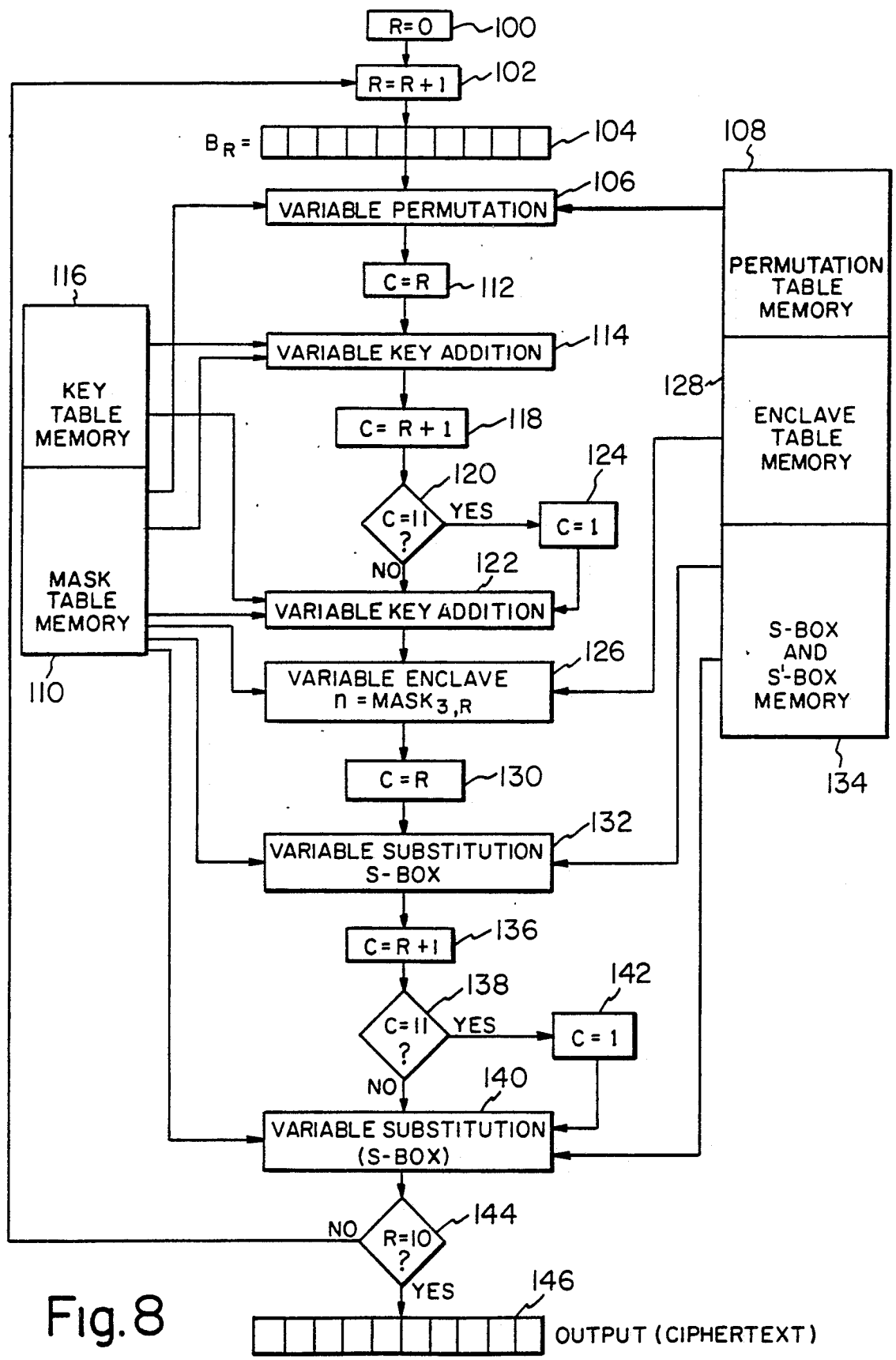
FIG. 8 is a flow chart of the overall encryption process of a block of plaintext in accordance with a preferred embodiment of the present invention.

A flow chart showing the encryption process in accordance with the preferred embodiment of the present invention is shown in FIG. 8. Since the preferred embodiment includes a number of rounds of encryption on each block of data, the letter "R" will be used to designate the round number hereinafter. Initially, the round number is set to zero at step 100. Then the round number R is incremented by one at step 102. The data undergoing encryption is represented by a ten byte block at step 104. During the first round of encryption, the data in element 104 will be the plaintext undergoing encryption. In subsequent rounds, this data will be an intermediate product different from the initial plaintext data but not yet the final ciphertext output.

The data is initially subjected to a variable permutation operation at step 106. As explained hereinafter in more detail in connection with FIG. 9, an entry is selected from the permutation table memory 108 and a value is selected from the Mask table memory 110 to conduct the variable permutation. Control then passes to step 112 where a choice component, referred to as "C", is equated with the round number R. Control then passes to step 114 where a first variable key addition operation is carried out on the data. As explained hereinafter in more detail in connection with FIG. 10, a key is selected from the key table memory 116 and a value is selected from the Mask table memory 110 to carry out the variable key addition. Control then passes to step 118 where the choice component C is set to a value one greater than the round number. Following the operation at step 118, control passes to query 120 where it is determined whether the choice component C is equal to 11. If it is not, then control passes directly to step 122 where a second variable key addition operation is carried out on the data, using a key from the key table memory 116 and using a value from the Mask table memory 110. If following the addition at step 118, the choice component C is equal to 11, then control is passed to step 124 where the choice component is set to a value of one. Then control is passed to the second variable key addition operation at step 122.

Following the second variable key addition function at step 122, control is passed to step 126 where a variable enclave is performed on the data. This variable enclave function was described above in connection with FIGS. 6 and 7, where it was shown that an entry is selected from the enclave table memory 128. The particular enclave table selected is determined by $Mask_{3,R}$ which is obtained from the Mask table memory 110. This can be represented by the equation $n = Mask_{3,R}$ where n is the enclave table memory selected for the operations in FIGS. 6 and 7. As will be explained hereinafter in more detail, $Mask_1$ was used in connection with the variable permutation operation at step 106, $Mask_2$ was used in connection with the variable key additions at steps 114 and 122, and $Mask_4$ will be used in the subsequent variable substitution operations.

Control then passes to step 130 where the choice component C is once again equated to the round number R. Thereafter, the data undergoes transformation in accordance with a first variable substitution at step 132. As will be explained hereinafter in more detail, the variable substitution uses a value from the Mask table memory 110 and selects an appropriate S-Box table from the S-Box and S'-Box memory 134. Control then passes to step 136 where the value of the choice component C is incremented by one. A decision is made at query 138 as to whether the choice component is equal to 11. If it is not, then control is passed directly to a second variable substitution at step 140. If the choice component after step 136 is equal to 11, then control is passed by query 138 to step 142 where the choice component is set to a value of one. Thereafter, control is passed to the second variable substitution at step 140. Like the first variable substitution at step 140, the second variable substitution is described in more detail in FIG. 11 and uses a value from the Mask table memory 110 and uses a table from the S-Box and S'-Box memory 134 to transform the data.

Control thereafter passes to query 144 where it is determined whether the round number has reached a value of 10. If the round number has reached ten, then the encryption process is completed and the ciphertext is represented as an output at step 146. If the round number has not yet reached ten, control is passed back to step 102 where the round number is incremented by one. Then all of the above identified steps, including the variable permutation 106, the first variable key addition 114, the second variable key addition 112, the variable enclave 126, the first variable substitution 132 and the second variable substitution 140, are carried out.

Figure 9:
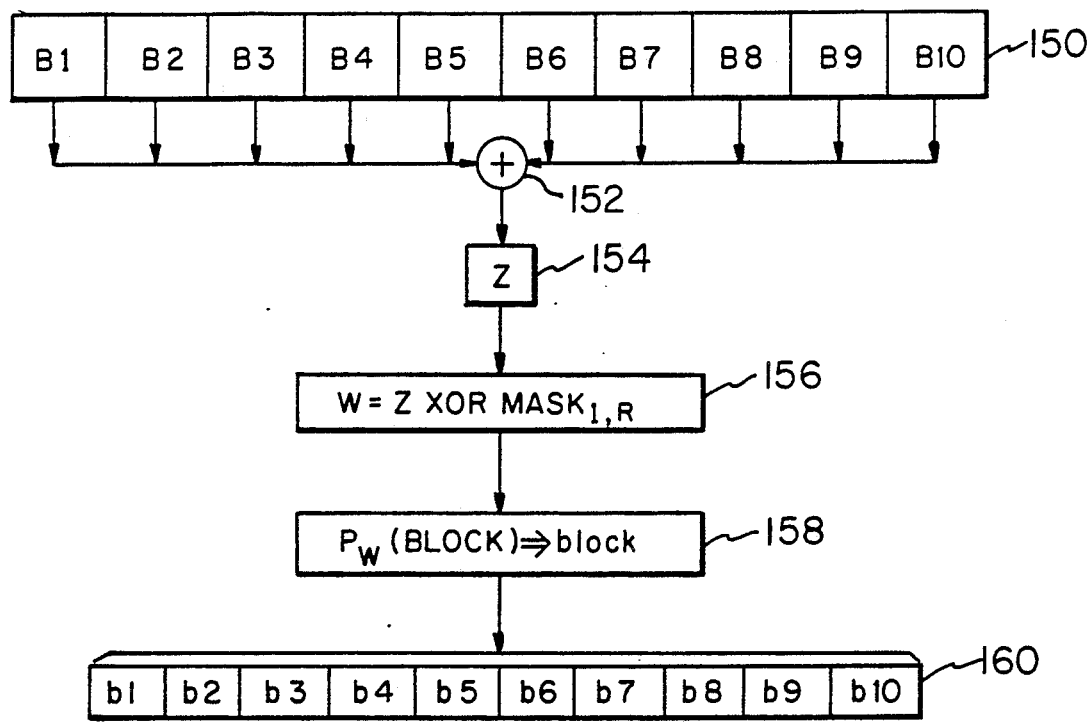
FIG. 9 is a block diagram of the variable permutation used in the encryption process of FIG. 8.

The variable permutation of FIG. 8 is explained in more detail in the block diagram in FIG. 9. The data undergoing transformation is represented as bytes B1 through B10 at element 150. In order to select which table in the permutation table memory 108 is used to carry out the permutation, the values in the ten bytes of the data are added together at element 152 to generate a value stored in memory register Z at element 154. A value is generated by combining in a bit by bit Exclusive OR function the value in register Z generated at element 154 with $Mask_{1,R}$ from the Mask table memory 110. This value is stored in memory register W at element 156. For example, during the first round of encryption, $Mask_{1,1}$ would be used at element 156 to generate W by the Exclusive OR operation with Z. Since there are ten rounds of encryption in the preferred embodiment, each of the ten values in $Mask_1$ will be used in turn during the encryption rounds.

Control then passes to element 158 where a standard permutation is carried out on the block of data using the directions from permutation table W, represented by $P_W$. The block of data after it has been permutated is shown in FIG. 9 at element 160 as bytes b1 through b10. It is important to use all ten bytes of the data undergoing encryption to select the permutation table used for the transformation since this renders it possible to decrypt the same data by the same steps. If only some of the bytes in the block were used to determine the permutation table used, then it would be impossible to determine during the decryption process which permutation table was selected. Rather than combining Z with $Mask_{1,R}$ by an Exclusive OR operation to generate W, it is also possible to sum the values of Z and $Mask_{1,R}$ modular arithmetic, to determine the permutation table used. This is also true throughout the remainder of the application where two digital values are combined together using an Exclusive OR operation. While an Exclusive OR operation is computationally easier to implement on a digital computer, the same result could be obtained in the present invention by merely arithmetically summing the values rather than carrying out the Exclusive OR operation.

Figure 10:
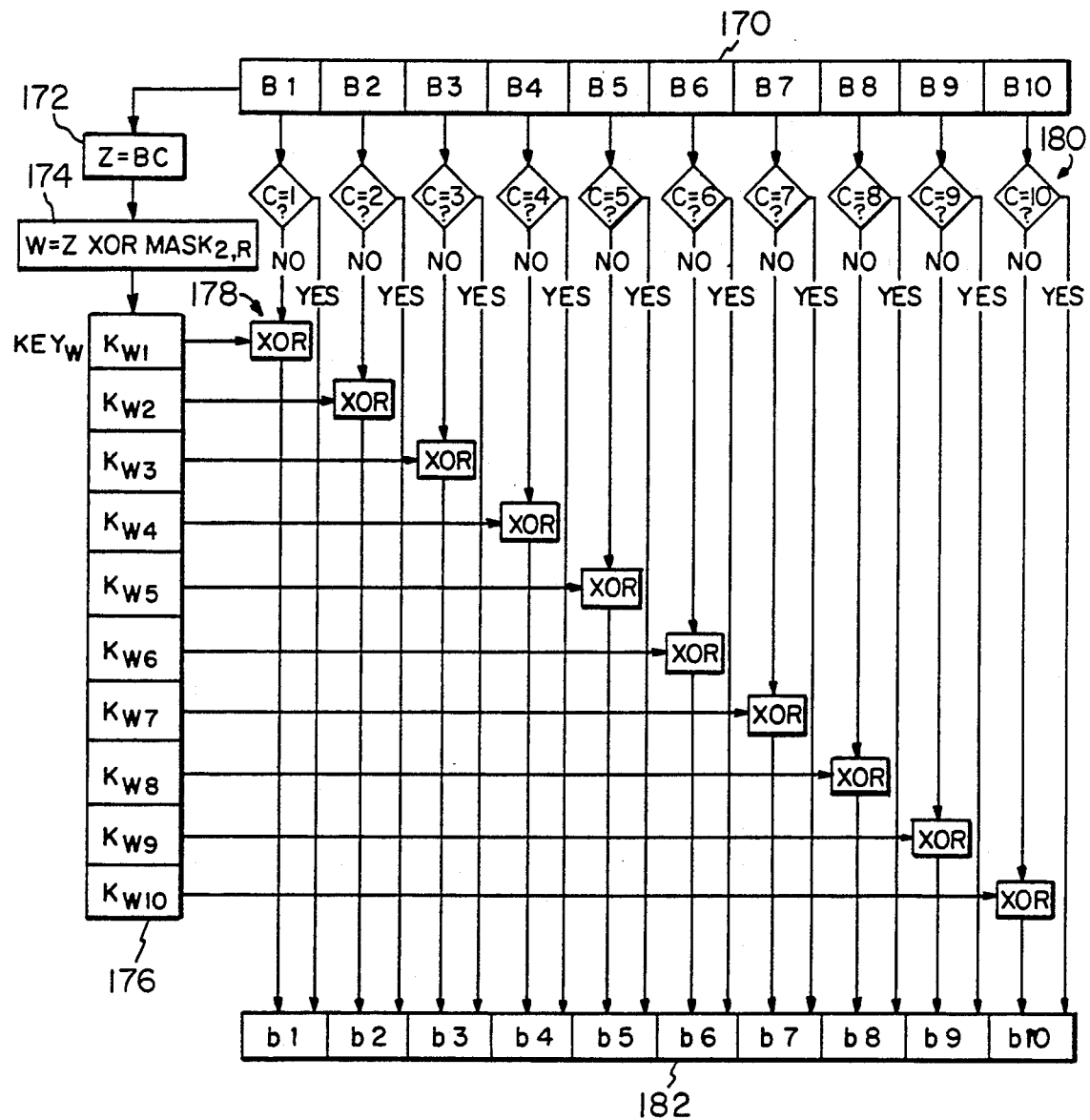
FIG. 10 is a block diagram of the variable key addition used in the encryption process of FIG. 8.

The variable key addition function of the present invention, as shown in steps 114 and 122 of FIG. 8, is shown diagramatically in FIG. 10. Each variable key addition, whether the first at step 114 or the second at step 122, are identical except that the value of the choice component C is one higher in the second variable key addition than in the first key addition, except during the tenth round of encryption when the value of the choice component C is set at one. Otherwise, the steps followed in the variable key addition at step 114 and step 122 in FIG. 8 are identical as set forth in FIG. 10.

The particular key selected from the key table memory 116 for the variable key addition is determined by byte C (referred to as BC) and $Mask_{2,R}$. This is shown by element 172 in FIG. 10 where the value Z is equated to BC and by element 174 where W is equated to Z XOR $Mask_{2,R}$. The value W is used to select the key from the key table memory 116 for use during that particular round of the variable key addition. The ten bytes of $Key_W$ are shown as element 176 in FIG. 10. Thereafter, every byte in the block of bytes in element 170 is combined by an Exclusive OR function with the corresponding byte in $Key_W$ through the series of Exclusive ORs at element 178. For example, B1 XOR $Key_{W1}$ generates $b_1$. Likewise, B2 XOR $Key_{W2}$ generates b2. The only exception is that byte C (BC) in the block undergoing transformation is not combined with its corresponding byte in $Key_W$ but remains unchanged and becomes directly bC. This is represented by the series of querys at element 180 associated with each byte of the data undergoing transformation at element 170. If C is equal to the byte number, then that byte is not combined with the corresponding key byte. The block of data after it has undergone a round of the variable key addition is shown as element 182 in FIG. 10.

Figure 11:
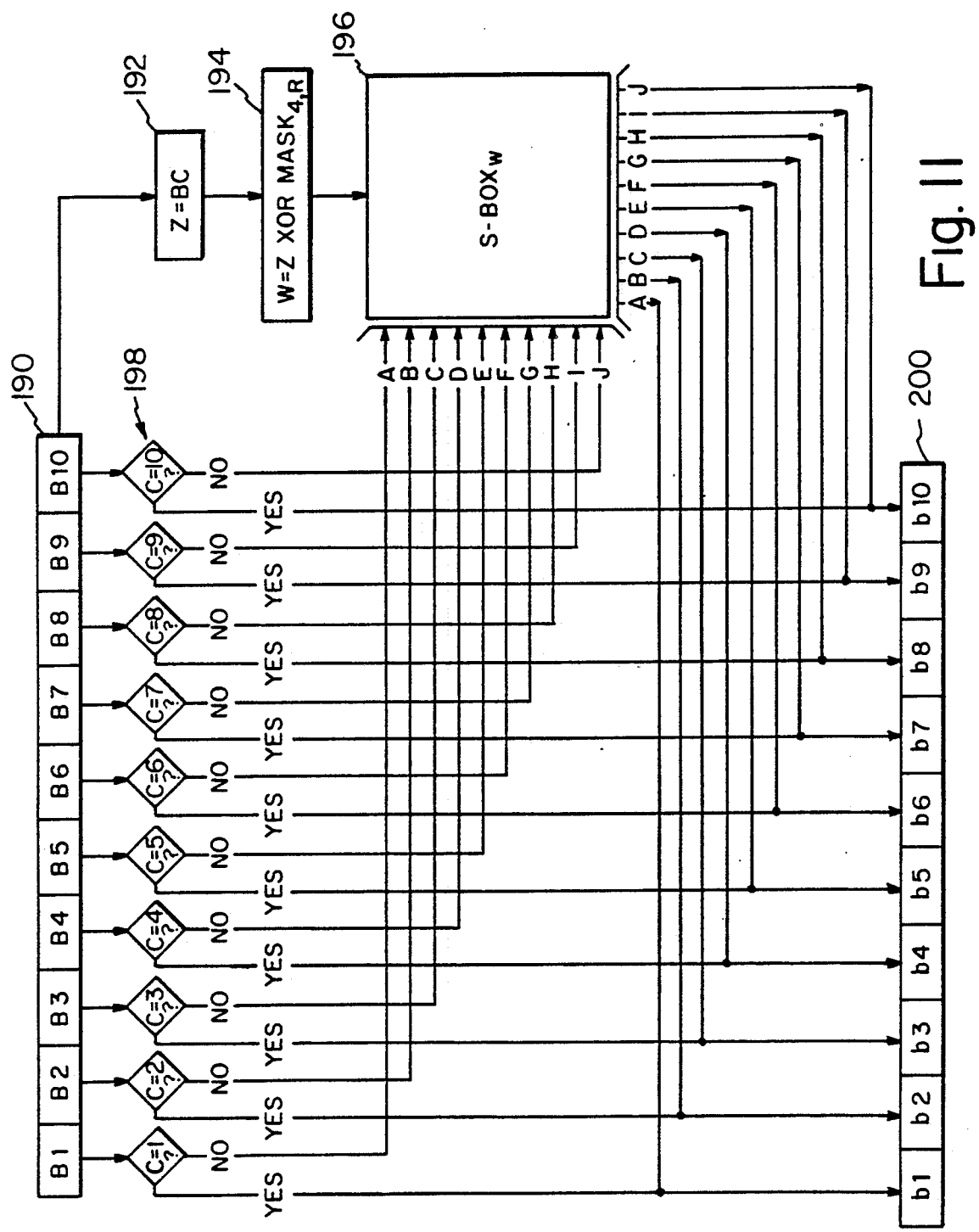
FIG. 11 is a block diagram of the variable substitution used in the encryption process of FIG. 8.

The variable substitution for the encryption process shown in FIG. 8 is shown in more detail in FIG. 11. Similar to the variable key addition, the first variable substitution at step 132 is identical to the second variable substitution at step 140 except that the choice component C is changed for the second variable substitution. Otherwise, the steps followed in each are the same. In the substitution process, the S-Box chosen Z is determined by byte C in the data undergoing transformation and $Mask_{4,R}$. This is shown in FIG. 11 where Z is equated to BC at element 192 and W is equated to Z XOR $Mask_{4,R}$ at element 194. The value of W generated in element 194 is used to select the particular S-Box used for the substitution at element 196. After the selection of the S-Box, every byte of the block undergoing transformation at element 190 is substituted with the chosen value according to S-$Box_W$, except for byte C (BC) which remains unchanged during this round of transformation.

It is important both in the variable key addition and in the variable substitution that byte C (BC) remains unchanged. In this way, it is possible to use the same transformation to work backwards in the decryption operation. A series of querys at element 198 connected to each byte of the block undergoing transformation in element 190 show how byte C remains unchanged and is passed directly and unchanged to the corresponding output byte in element 200. For example, when the choice component C is equal to 1, then B1 in element 190 would equal b1 in element 200. Otherwise, the remaining bytes in element 200 will have values different from the initial values in element 190 in accordance with the substitution protocol set forth S-$Box_W$. The same technique could be used for selecting the permutation table, i.e., use one of the bytes and leave that byte unchanged.

Figure 12:
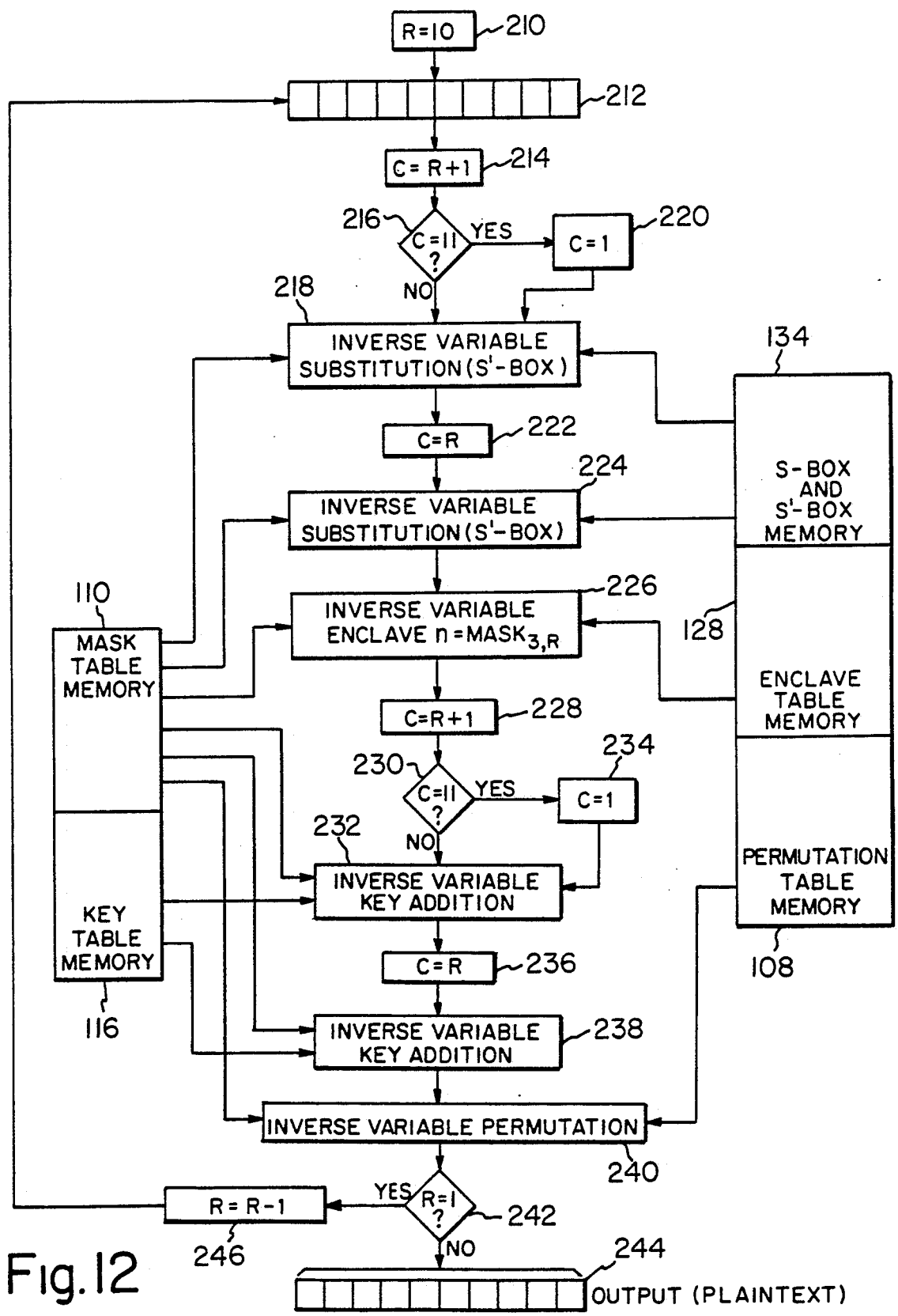
FIG. 12 is a flow chart of the overall decryption process of a single block of ciphertext which was encrypted by the process shown in FIG. 8.

The steps followed in decrypting a block of ciphertext is shown in FIG. 12. Since the decryption is essentially a backwards iteration through the encryption steps followed in FIG. 8, the round number is initially set at ten in step 210. The block of data undergoing decryption is selected and is represented in element 212 as a block of ten data bytes. During the first round of decryption, the data at step 212 will be the initial ciphertext. Control is then passed to step 214 where the choice component C is set to a value one greater than the round number. A decision is made at query 216 whether the choice component is equal to 11. If it is not, then control is passed directly to step 218 where a first inverse variable substitution is carried out on the data. The inverse variable substitution is described in more detail in FIG. 13. The first inverse variable substitution 218 uses data from the Mask table memory 110 and from the S'-Box memory 134. If query 216 determines that the choice component C is equal to 11, then the choice component set to one at step 220 and control then passes to the first inverse variable substitution at element 218. Control then passes to step 222 where the choice component is equated to the round number, following which a second inverse variable substitution is carried out at step 224.

Subsequent to the second inverse variable substitution at step 224, the data is subjected to an inverse variable enclave function at element 226. This function is described in more detail hereinafter in connection with FIGS. 14 and 15 However, it must be noted here that $Mask_{3,R}$ is selected from the Mask table memory 110 and that value is used to select the particular enclave table memory used from the enclave table memory 128.

Figure 16:
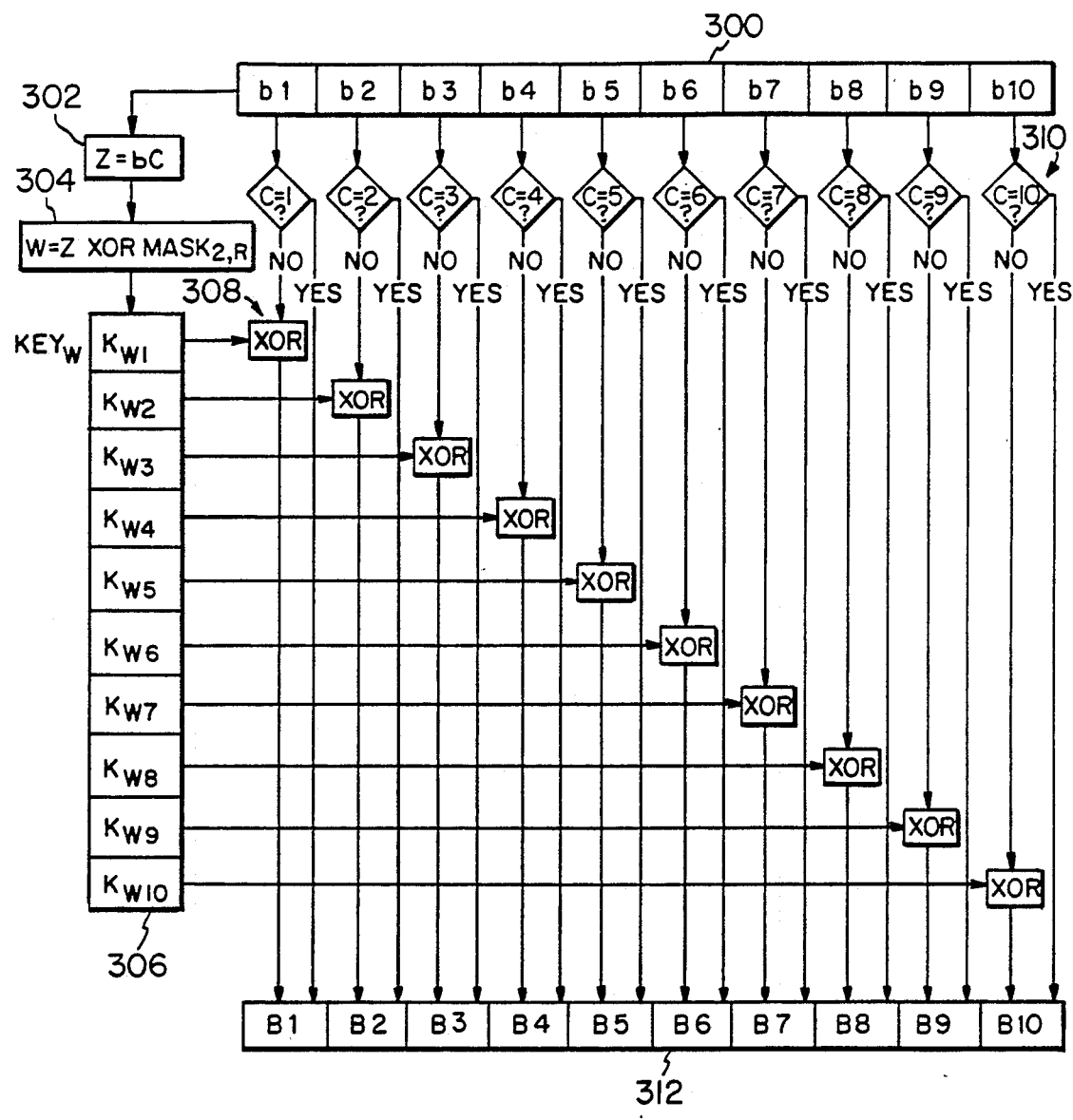
FIG. 16 is a block diagram of the inverse variable key addition used in the decryption process of FIG. 12

Control is then passed to step 228 where the choice component is incremented by one and then a decision is made at query 230 whether the choice component has reached the value of eleven. If the choice component has not yet reached a value of eleven, then control passes to the first inverse variable key addition at step 232. If the choice component has reached the value of eleven, it is reset at step 234 to a value of one and control is passed directly to the first inverse variable key addition at step 232. The first inverse variable key addition uses data from the Mask table memory 110 and the key table memory 116 to transform the data. This operation is shown in more detail in connection with FIG. 16. Control is then passed to step 236 where the choice component is equated with the round number. Then the data is subjected to a second inverse variable key addition at step 238. Other than the difference of the values of the choice component, the first inverse variable key addition at step 232 is identical to the second inverse variable key addition at step 238.

Control is then passed to the inverse variable permutation at step 240. The data is then subjected to a particular inverse permutation using an entry from the Mask table memory 110 and an entry from the permutation table memory 108. The inverse variable permutation is described in more detail in connection with FIG. 17.

Control is then passed to query 242. If the round number for the decryption has reached a value of one, then no further decryption takes place and the current state of the data is output at step 244 as the plaintext output. If the round number has not yet reached a value of one, then the round number is decreased by 1 at step 246. Control is passed to step 212 for a further round of decryption in accordance with the first inverse variable substitution 218, the second inverse variable substitution 224, the inverse variable enclave 226, the first inverse variable key addition 232, the second inverse variable key addition 238, and the inverse variable permutation 240.

Figure 13:
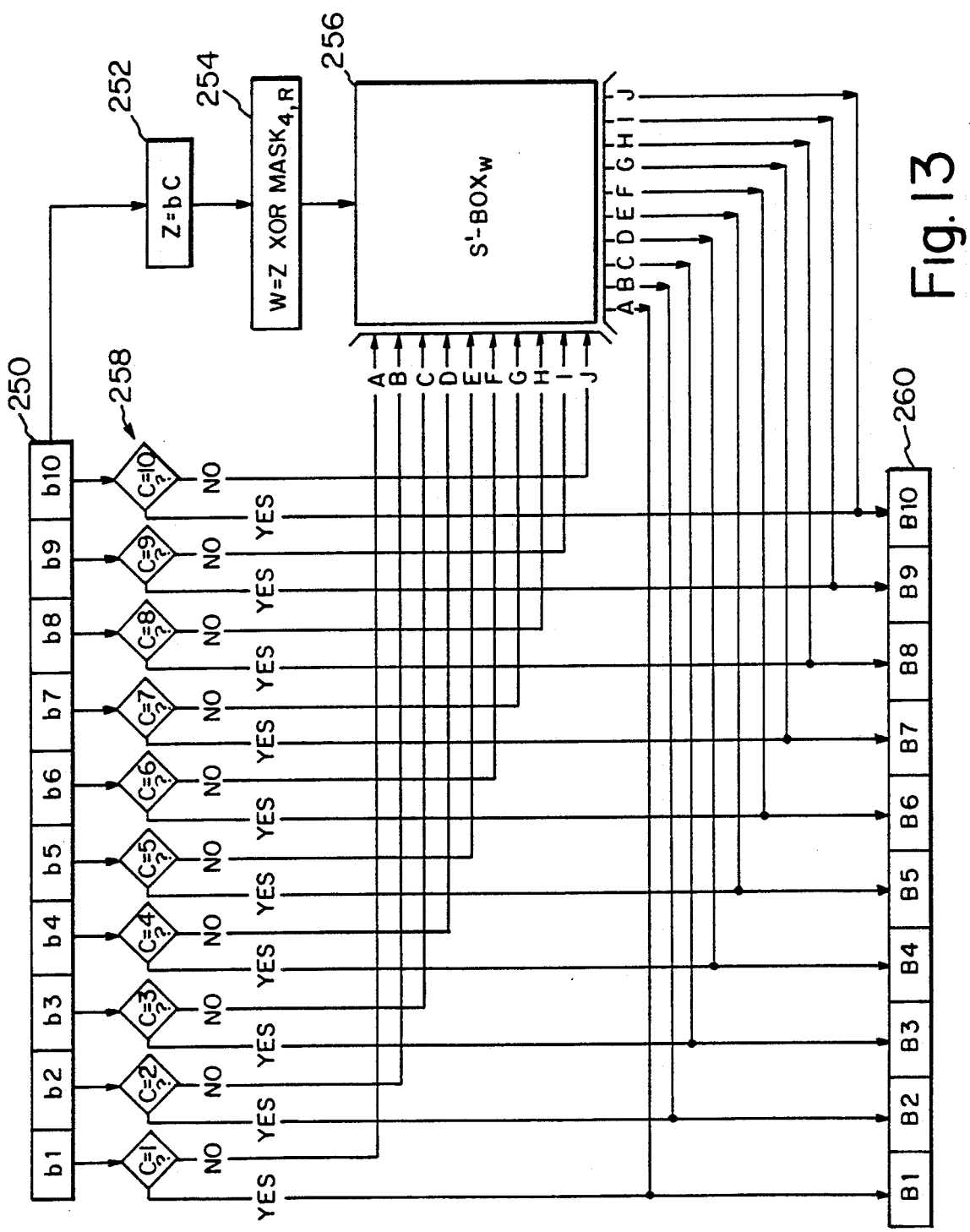
FIG. 13 is a block diagram of the inverse variable substitution used in the decryption process of FIG. 12.

The inverse variable substitution is shown in more detail in FIG. 13. The data undergoing decryption is represented by bytes b1 through b10 in element 250. The inverse substitution box (S'-Box) chosen is determined by bC XOR $Mask_{4,R}$. This is represented in FIG. 13 where Z is equated to bC at element 252 and W is equated to Z XOR $Mask_{4,R}$ at element 254. W is then used to select the particular inverse substitution box (S'-Box$_W$) at element 256. Every byte in the block in element 250 is then substituted in accordance with the protocol of the chosen S'-Box except for byte bC. The result of the inverse variable substitution is a ten byte data block B1 through B10 at element 260. The arrangement by which byte bC is not substituted is shown by a series of querys 258 associated with each byte of the data undergoing decryption in element 250. For example, in the first round of decryption, where R is ten, b10 is both used to select the S'-Box used for the inverse substitution and is also unchanged during the inverse substitution. Since the tenth byte remained unchanged during the final variable substitution carried out on the data during the encryption process shown in FIG. 8, it is possible to recreate and work backwards through the encryption process through the ciphertext data. The same is true for the inverse variable key addition of FIG. 16.

Figure 14:
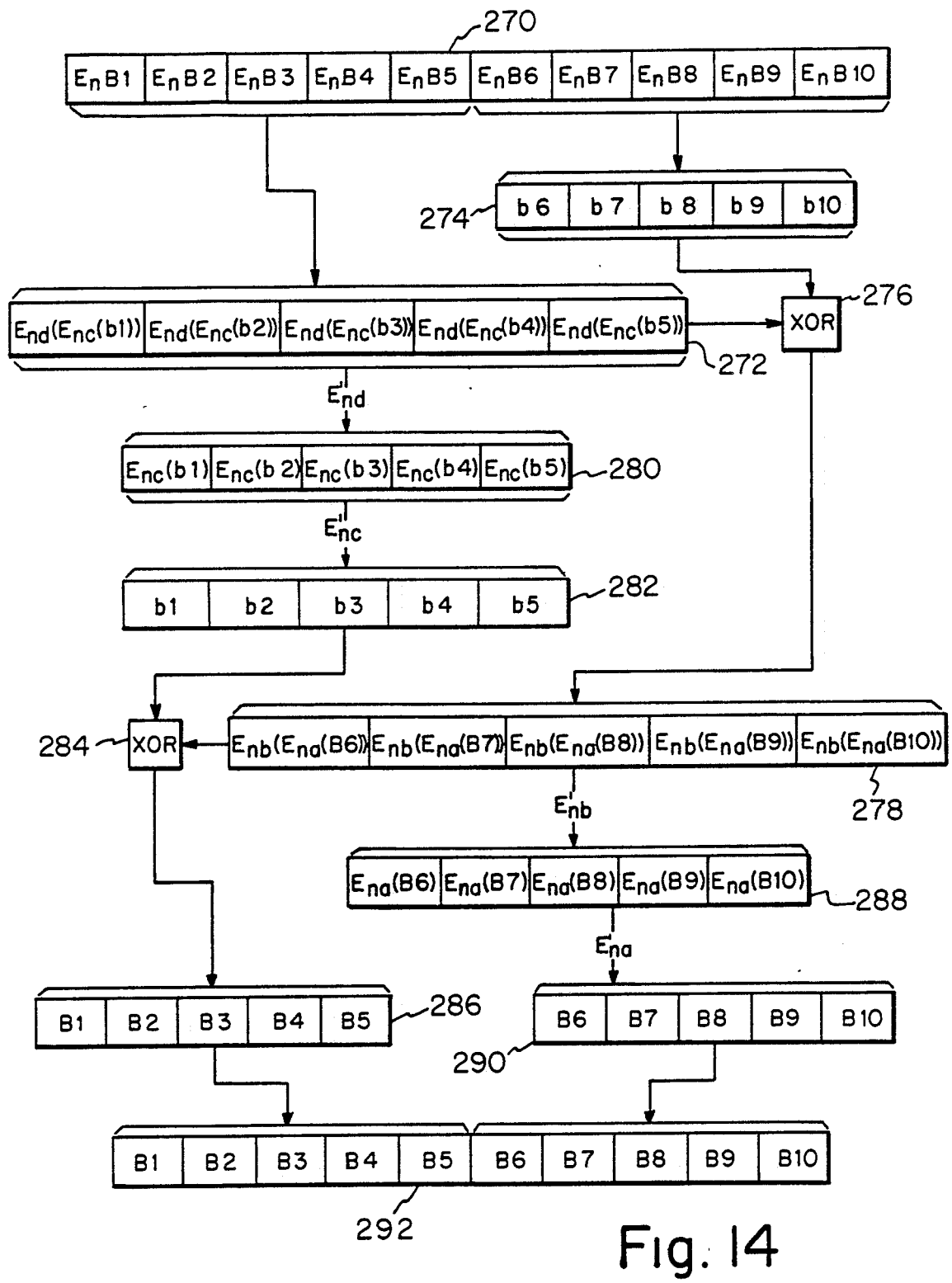
FIG. 14 is a block diagram of the inverse enclave function used in the decryption process of FIG. 12.
Figure 15:
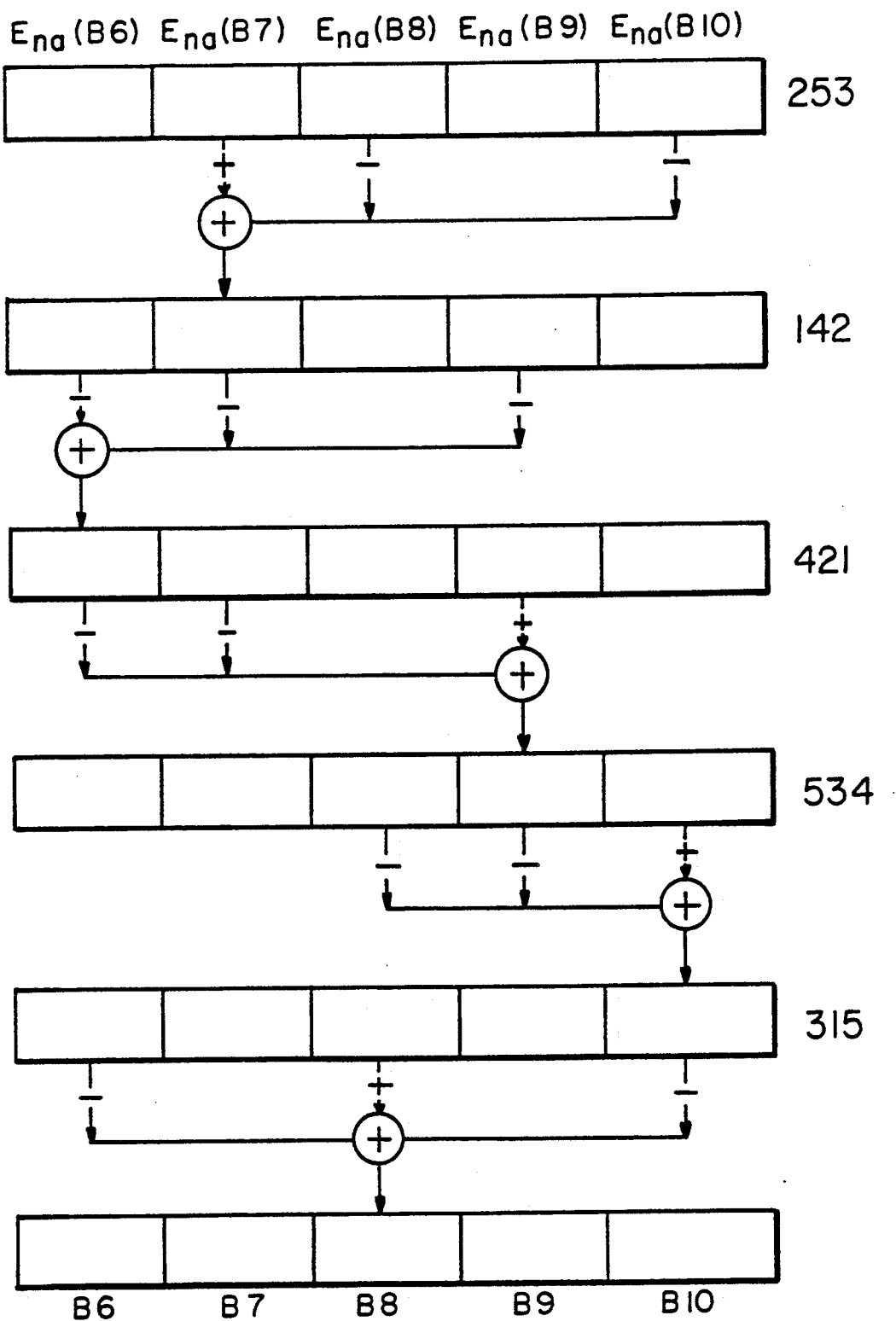
FIG. 15 is a block diagram of a portion of the autoclave function used in the inverse enclave function of FIG. 14.

The inverse variable enclave function is shown in detail in FIG. 14 and in conjunction with the particular autoclave function used in the inverse variable enclave in FIG. 15. The steps carried out in FIG. 14 are essentially the inverse of the steps taken in the variable enclave for encryption shown in FIG. 6. The block of data undergoing decryption at element 270 is split into a left half-block 272 and a right half-block 274. These two half-blocks are combined by a bit by bit Exclusive OR function at element 276 to produce a subsequent right half-block 278. The left half-block at element 272 is first transformed by an inverse autoclave function E'$_{nd}$ to left half-block element 280 and then is transformed by an inverse autoclave function E'$_{nc}$ to left half-block 282. Right half-block element 278 is then combined through an Exclusive OR function at element 284 with left half-block 282 to form the final left half-block element 286. The right half-block at element 278 is first transformed by an inverse autoclave function E'$_{nb}$ to right half-block element 288 and then is transformed by an inverse autoclave function E'$_{na}$ to the final right half-block at element 290. The left half-block element 286 and right half-block element 290 are joined together to form the final ten byte block at 292 which is the result of the inverse enclave function.

A particular autoclave function used in the inverse enclave of FIG. 14 is shown, for one example, in FIG. 15. In general, the enclave tables, as described above, are used during the inverse autoclave function. However, the entries are read from the bottom of each column to the top and the byte undergoing transformation, identified by the entry in the first row, has its value reduced by the values of the other two bytes, identified by the second and third rows in the enclave table entry. An example of an inverse autoclave function used in the inverse enclave is set forth in FIG. 15 for the same autoclave function used in connection with FIG. 7. The last entry in the enclave table used is used first for the transformation in FIG. 15. Since this entry is "2 5 3", this means that the fifth byte (B10) and the third byte (B8) are subtracted from the second byte (B7) to generate the new value of the second byte. As in the enclave function used for encryption, the arithmetic is carried out by modular arithmetic. The next entry up from the bottom in the enclave table used in FIG. 15 is "1 4 2", which means that the fourth byte (B9) and the second byte (B7) are subtracted from the first byte (B6) to give the new value of the first byte (B6). Similarly, the third entry is "4 2 1", which means that the second byte (B7) and the first byte (B6) are subtracted from the fourth byte (B9) to give the new value of the fourth byte (B9). The next entry in the enclave table used is "5 3 4", which means that the third byte (B8) and the fourth byte (B9) are subtracted from the fifth byte (B10) to give the new value of the fifth byte (B10). Finally, the first entry in the enclave table is "3 1 5", which is used last in the inverse autoclave function. This entry means that the first byte (B6) and the fifth (B10) are subtracted from the third byte (B8) to give a new value for the third byte. The result of all of these modular arithmetic calculations is shown in FIG. 15 as the last block, including bytes B6 through B10. The inverse variable key addition is shown diagramatically in FIG. 16. The particular key selected from the key table memory 116 for the inverse variable key addition is determined by byte C (referred to as bC) and Mask$_{2,R}$. This is shown by element 302 in FIG. 16, where the value Z is equated to bC, and by element 304 where W is equated to Z XOR Mask$_{2,R}$. The value W is used to select a key from the key table memory 116 for use during that particular round of the inverse variable key addition. The ten bytes of key$_W$ are shown as element 306 in FIG. 16. Thereafter, every byte in the block of bytes in element 300 is combined by an Exclusive OR function with the corresponding byte in Key$_W$ through the series of Exclusive ORs at element 310. For example, b1 XOR Key$_{W1}$ generates B1. Likewise, b2 XOR Key$_{W2}$ generates B2. The only exception is that byte C in the block undergoing transformation is not combined with its corresponding byte in Key$_W$, but remains unchanged and directly becomes BC. This is represented by the series of querys at elements 310 associated with each byte of the data undergoing transformation at element 300. If C is equal to the byte number, then that byte is not combined with the corresponding key byte. The block of data after it has undergone a round of the inverse variable key addition is shown as element 312 in FIG. 16.

Figure 17:
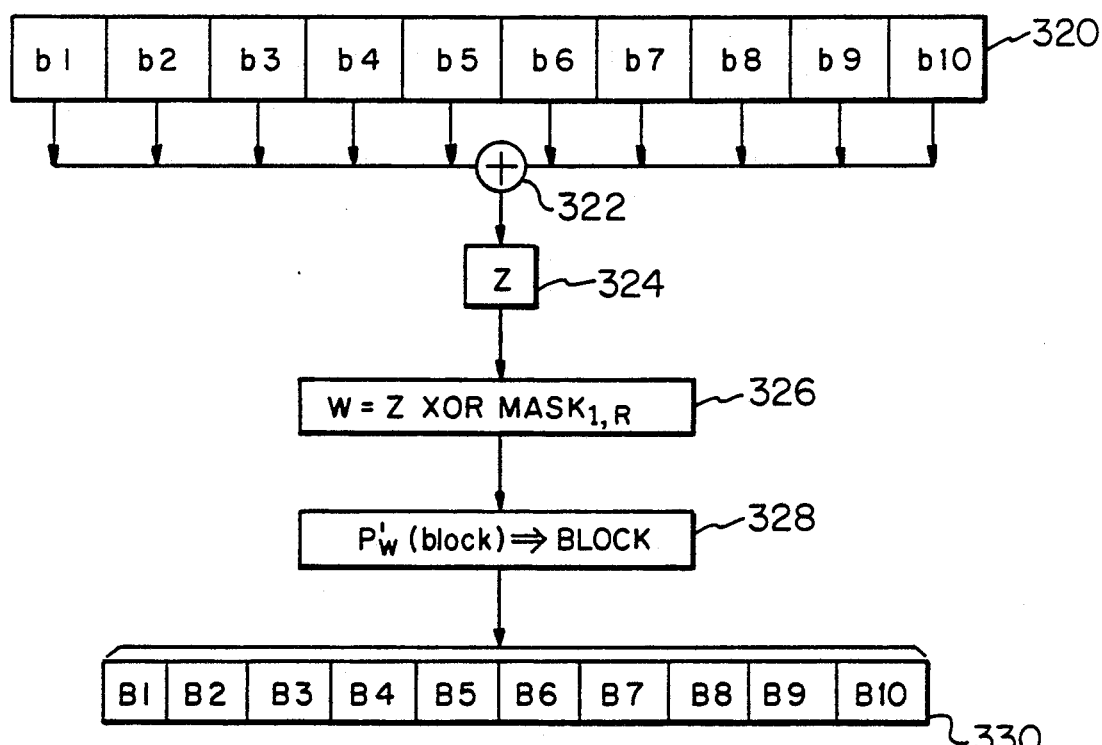
FIG. 17 is a block diagram of the inverse variable permutation used in the decryption process of FIG. 12.

The inverse variable permutation of FIG. 12 is explained in more detail in the block diagram in FIG. 17. The data undergoing transformation is represented as bytes b1 through b10 at element 320. In order to select which table in the permutation table memory 108 is used to carry out the inverse permutation, the values in the ten bytes of the data are added together using modular arithmetic at element 322 to generate a value Z at element 324. At element 326, a value W is generated by combining in a bit by bit Exclusive OR function the value Z generated at element 324 with Mask$_{1,R}$ from the Mask table memory 110. For example, during the first round of decryption, Mask$_{1,1}$ would be used at element 326 to generate W by the Exclusive OR operation with Z.

Control then passes to element 328 where a standard inverse permutation, which is merely a working backward through the permutation table entry as shown earlier in connection with FIG. 4, is carried out on the block of data, using the directions from the permutation table W, represented by P'$_W$. The block of data after it has undergone the inverse permutation operation is shown in FIG. 17 at element 330 as bytes B1 through B10. Since during the encryption process all ten bytes of the data undergoing encryption were used to select a permutation table for the transformation, this rendered it possible to decrypt the same data by once again adding together all ten bytes of the ciphertext data to determine which permutation table should be used. This is possible since the permutation operation merely rearranged the order of the values. The information used in the encryption stage can be extracted by once again summing together the values in the data.

EXAMPLE

An example of the encryption of a ten byte block of plaintext data using the embodiment of the encryption system of the present invention discussed above will now be shown in detail. The system must be initialized with a permutation table, a substitution table and an enclave table. Tables used in this example, and created in accordance with the guidelines set forth above, are shown below in Tables I, IIA and B, and III, respectively. Then a ten byte initial key is selected for creating the key table and Mask table. For this example, the initial key is selected to be:

| key = | 27 | 115 | 21 | 1 | 12 | 41 | 2 | 92 | 17 | 81 |
|---|---|---|---|---|---|---|---|---|---|---|

Sum the first five values of the initial key (mod 128):
$(27+115+21+1+12)$ mod $128=176$ mod $128=48$
Therefore, permutation table 48 will be used.
Sum the last five values of the initial key (mod 16):
$(41+2+92+17+81)$ mod $16=233$ mod $16=9$
Therefore, substitution table 9 will be used.

| Take key: | 27 | 115 | 21 | 1 | 12 | 41 | 2 | 92 | 17 | 81 |
|---|---|---|---|---|---|---|---|---|---|---|
| Substitute (tbl 9): | 50 | 56 | 15 | 124 | 102 | 99 | 109 | 74 | 26 | 73 |
| Permutate (tbl 48): | 56 | 74 | 50 | 73 | 109 | 15 | 102 | 26 | 124 | 99 |

Sum values 3–7 of the current key block (mod 32):
$(50+73+109+15+102)$ mod $32=349$ Mod $32=29$
Therefore, enclave table 29 will be used for the next step.

| Current key block: | 56 | 74 | 50 | 73 | 109 | 15 | 102 | 26 | 124 | 99 |
|---|---|---|---|---|---|---|---|---|---|---|
| Enclave (tbl 29): | 30 | 34 | 55 | 63 | 9 | 73 | 74 | 107 | 109 | 33 |
| Therefore key = | 30 | 34 | 55 | 63 | 9 | 73 | 74 | 107 | 109 | 33 |

It can be seen that the initial key was used to create the first key, identified as $key_0$, in the key table. The above steps are reproduced using $key_0$ to generate $key_1$, $key_1$ to generate $key_2$, etc., until $key_{126}$ is used to generate $key_{127}$. The completed key table, using the initial key identified above, is shown in Table IV below.

Next, the Mask table is generated using the previously generated key table. To generate the first byte or first value in $Mask_1$, the first mask, the values of the first bytes in $key_0$ to $key_{31}$ are summed (mod 128):
$0+10+26+0+102+105+111+91+95+68+6+70$
$+95+67+55+39+109+23+39+31+120+50+46$
$+71+34+48+105+51+45+123+4+1=1840$ mod $128=48$.

Therefore, the first value or the first byte in $Mask_1$ is 48.
Value 2 in $Mask_1$ is the sum of the values of byte 2 in $Key_0$ to $Key_{31}$ (mod 128). Value 3 in $Mask_1$ is the sum of the values of byte 3 in $Key_0$ to $Key_{31}$ (mod 128). Value 4 in $Mask_1$ is the sum of the values of byte 4 in $Key_0$ to $Key_{31}$ (mod 128). Value 5 in $Mask_1$ is the sum of the values of byte 5 in $Key_0$ to $Key_{31}$ (mod 128). Value 6 in $Mask_1$ is the sum of the values of byte 6 in $Key_0$ to $Key_{31}$ (mod 128). Value 7 in $Mask_1$ is the sum of the values of byte 7 in $Key_0$ to $Key_{31}$ (mod 128). Value 8 in $Mask_1$ is the sum of the Values of byte 8 in $Key_0$ to $Key_{31}$ (mod 128). Value 9 in $Mask_1$ is the sum of the values of byte 9 in $Key_0$ to $Key_{31}$ (mod 128). Value 10 in $Mask_1$ is the sum of the values of byte 10 in $Key_0$ to $Key_{31}$ (mod 128).

Similarly, the ten bytes or values of $Mask_2$ are created from $Key_{32}$ to $Key_{63}$, the values of $Mask_3$ are created from $Key_{64}$ to $Key_{95}$ and the values of $Mask_4$ are created from $Key_{96}$ to $Key_{127}$.

The completed mask table, generated from the key table in Table IV, is set forth below:

| $Mask_1 =$ | 48 | 2 | 121 | 18 | 60 | 105 | 33 | 50 | 11 | 60 |
|---|---|---|---|---|---|---|---|---|---|---|
| $Mask_2 =$ | 26 | 78 | 24 | 72 | 69 | 13 | 77 | 43 | 9 | 99 |
| $Mask_3 =$ | 64 | 113 | 72 | 61 | 37 | 13 | 49 | 71 | 24 | 60 |
| $Mask_4 =$ | 104 | 62 | 69 | 87 | 18 | 31 | 102 | 101 | 32 | 125 |

Now that the key and mask tables have been generated from the initial key (which is not included in either table), data can be encrypted using additionally the permutation, enclave and substitution tables in Tables I, IIA and IIB, and III below. A particular block of plaintext data will be encrypted under the system of the present invention and for ten rounds of encryption.

ROUND 1

| BLOCK = | 104 | 101 | 108 | 108 | 111 | 32 | 116 | 104 | 101 | 114 |
|---|---|---|---|---|---|---|---|---|---|---|

(a) Variable Permutation.
Add all values in block (mod 128):
$104+101+108+108+111+32+116+104+101+114$
$=999$ mod $128=103$
$Mask_1$ value for round 1 $(Mask_{1,1})=48$
Permutation Table=Sum of the block XOR $Mask_{1,1}$:
103 XOR $48=87$
Therefore, permutation table 87 shall be used for the permutation.

| Block before permutation: | 104 | 101 | 108 | 108 | 111 | 32 | 116 | 104 | 101 | 114 |
|---|---|---|---|---|---|---|---|---|---|---|
| Block after permutation: | 108 | 104 | 101 | 101 | 104 | 114 | 32 | 108 | 111 | 116 |

(b) First Key Addition
$Mask_2$ value for round 1 $(Mask_{2,1})=26$
First key=Value 1 in the block XOR $Mask_{2,1}$:
108 XOR $26=118$
Therefore, $Key_{118}$ shall be used for the first key addition.

| Block before key addition: | 108 | 104 | 101 | 101 | 104 | 114 | 32  | 108 | 111 | 116 |
|---|---|---|---|---|---|---|---|---|---|---|
| Block after key addition:  | 108 | 113 | 85  | 74  | 105 | 102 | 85  | 91  | 124 | 55  |

(c) Second Key Addition.
Second key = Value 2 in the block XOR $Mask_{2,1}$: 113 XOR 26 = 107
Therefore, $Key_{107}$ shall be used for the second key addition.

| Block before key addition: | 108 | 113 | 85  | 74 | 105 | 102 | 85  | 91  | 124 | 55 |
|---|---|---|---|---|---|---|---|---|---|---|
| Block after key addition:  | 72  | 113 | 120 | 64 | 94  | 93  | 56  | 118 | 30  | 47 |

(d) Variable Enclave.
Enclave table = value of $Mask_{3,1}$ (mod 32) = 64 2 mod 32 = 0
Therefore, enclave table 04 shall be used for the enclave.

| Block before enclave: | 72 | 113 | 120 | 64  | 94 | 93 | 56  | 118 | 30  | 47 |
|---|---|---|---|---|---|---|---|---|---|---|
| Block after enclave:  | 2  | 108 | 96  | 114 | 88 | 16 | 101 | 106 | 118 | 56 |

(e) First Variable Substitution.
$Mask_4$ value for round 1 ($Mask_{4,1}$) = 104
First substitution table = Value 1 in block XOR $Mask_{4,1}$:
2 XOR 104 = 10
Therefore, substitution table 10 shall be used for the first substitution.

| Block before substitution: | 2 | 108 | 96 | 114 | 88 | 16 | 101 | 106 | 118 | 56 |
|---|---|---|---|---|---|---|---|---|---|---|
| Block after substitution:  | 2 | 60  | 34 | 59  | 75 | 98 | 127 | 61  | 29  | 73 |

(f) Second Variable Substitution.
Second substitution table = Value 2 in block XOR $Mask_{4,1}$:
60 XOR 104 = 4

Therefore, substitution table 4 shall be used for the second substitution.

| Block before substitution: | 2   | 60 | 34 | 59 | 75 | 98 | 127 | 61 | 29 | 73  |
|---|---|---|---|---|---|---|---|---|---|---|
| Block after substitution:  | 103 | 60 | 82 | 74 | 18 | 38 | 11  | 49 | 50 | 110 |

ROUND 2

| BLOCK = | 103 | 60 | 82 | 74 | 18 | 38 | 11 | 49 | 50 | 110 |
|---|---|---|---|---|---|---|---|---|---|---|

(a) Variable Permutation.
Add all values in block (mod 128):
103 + 60 + 82 + 74 + 18 + 38 + 11 + 49 + 50 + 110 = 595 mod 128 = 83
$Mask_1$ value for round 2 ($Mask_{1,2}$) = 2
Permutation table = Sum of the block XOR $Mask_{1,2}$:
83 XOR 2 = 81
Therefore, permutation table 81 shall be used for the permutation.

| Block before permutation: | 103 | 60 | 82 | 74 | 18 | 38 | 11 | 49 | 50 | 110 |
|---|---|---|---|---|---|---|---|---|---|---|
| Block after permutation:  | 103 | 60 | 50 | 38 | 18 | 11 | 49 | 74 | 82 | 110 |

(b) First Key Addition.
$Mask_2$ value for round 2 ($Mask_{2,2}$) = 78
First key = Value 2 in the block XOR $Mask_{2,2}$:
60 XOR 78 = 114
Therefore, $Key_{114}$ shall be used for the first key addition.

| Block before key addition: | 103 | 60 | 50 | 38 | 18 | 11 | 49 | 74  | 82 | 110 |
|---|---|---|---|---|---|---|---|---|---|---|
| Block after key addition:  | 52  | 60 | 9  | 5  | 68 | 30 | 46 | 117 | 52 | 11  |

(c) Second Key Addition.
Second key = Value 3 in the block XOR $Mask_{2,2}$:
9 XOR 78 = 71
Therefore, $Key_{71}$ shall be used for the second key addition.

| Block before key addition: | 52 | 60  | 9 | 5  | 68  | 30 | 46  | 117 | 52 | 11  |
|---|---|---|---|---|---|---|---|---|---|---|
| Block after key addition:  | 35 | 108 | 9 | 12 | 107 | 21 | 112 | 115 | 84 | 112 |

(d) Variable Enclave.
Enclave table = value of $Mask_{3,2}$ (mod 32) = 113 mod 32 = 17
Therefore, enclave table 17 shall be used for the enclave.

| Block before enclave: | 35 | 108 | 9 | 12 | 107 | 21 | 112 | 115 | 84 | 112 |
|---|---|---|---|---|---|---|---|---|---|---|
| Block after enclave: | 43 | 37 | 14 | 65 | 92 | 20 | 110 | 59 | 17 | 111 |

(e) First Variable Substitution.
Mask$_4$ value for round 2 (Mask$_{4,2}$) = 62
First substitution table = Value 2 in block XOR Mask$_{4,2}$:
37 XOR 62 = 11
Therefore, substitution table 11 shall be used for the first substitution.

| Block before substitution: | 43 | 37 | 14 | 65 | 92 | 20 | 110 | 59 | 17 | 111 |
|---|---|---|---|---|---|---|---|---|---|---|
| Block after substitution: | 46 | 37 | 68 | 9 | 126 | 35 | 73 | 8 | 83 | 6 |

(f) Second Variable Substitution.
Second substitution table = Value 3 in block XOR Mask$_{4,2}$:
68 XOR 62 = 10
Therefore, substitution table 10 shall be used for the second substitution.

| Block before substitution: | 46 | 37 | 68 | 9 | 126 | 35 | 73 | 8 | 83 | 6 |
|---|---|---|---|---|---|---|---|---|---|---|
| Block after substitution: | 99 | 122 | 68 | 9 | 114 | 0 | 53 | 51 | 92 | 49 |

ROUND 3

| BLOCK = | 99 | 122 | 68 | 9 | 114 | 0 | 53 | 51 | 92 | 49 |
|---|---|---|---|---|---|---|---|---|---|---|

(a) Variable Permutation.
Add all values in block (mod 128):
99+122+68+9+114+0+53+51+92+49 = 657 mod 128 = 17
Mask$_1$ Value for round 3 (Mask$_{1,3}$) = 121
permutation table = Sum of the block XOR Mask$_{1,3}$:
17 XOR 121 = 104
Therefore, permutation table 104 shall be used for the permutation.

| Block before permutation: | 99 | 122 | 68 | 9 | 114 | 0 | 53 | 51 | 92 | 49 |
|---|---|---|---|---|---|---|---|---|---|---|
| Block after permutation: | 68 | 53 | 51 | 114 | 122 | 0 | 9 | 99 | 49 | 92 |

(b) First Key Addition.
Mask$_2$ value for round 3 (Mask$_{2,3}$) = 24
First key = Value 3 in the block XOR Mask$_{2,3}$:
51 XOR 24 = 43
Therefore, Key$_{43}$ shall be used for the first key addition.

| Block before key addition: | 68 | 53 | 51 | 114 | 122 | 0 | 9 | 99 | 49 | 92 |
|---|---|---|---|---|---|---|---|---|---|---|
| Block after key addition: | 84 | 59 | 51 | 126 | 4 | 30 | 98 | 119 | 73 | 113 |

(c) Second Key Addition.
Second key = Value 4 in the block XOR Mask$_{2,3}$:
126 XOR 24 = 102
Therefore, Key$_{102}$ shall be used for the second key addition.

| Block before key addition: | 84 | 59 | 51 | 126 | 4 | 30 | 98 | 119 | 73 | 113 |
|---|---|---|---|---|---|---|---|---|---|---|
| Block after key addition: | 19 | 31 | 85 | 126 | 117 | 39 | 113 | 77 | 17 | 82 |

(d) Variable Enclave.
Enclave table = value of Mask$_{3,3}$ (mod 32) = 72 mod 32 = 8
Therefore, enclave table 8 shall be used for the enclave.

| Block before enclave: | 19 | 31 | 85 | 126 | 117 | 39 | 113 | 77 | 17 | 82 |
|---|---|---|---|---|---|---|---|---|---|---|
| Block after enclave: | 127 | 113 | 18 | 67 | 108 | 90 | 103 | 103 | 96 | 85 |

(e) First Variable Substitution.
Mask$_4$ value for round 3 (Mask$_{4,3}$) = 69
First substitution table = Value 3 in block XOR Mask$_{4,3}$:
18 XOR 69 = 7
Therefore, substitution table 7 shall be used for the first substitution.

| Block before substitution: | 127 | 113 | 18 | 67 | 108 | 90 | 103 | 103 | 96 | 85 |
|---|---|---|---|---|---|---|---|---|---|---|
| Block after substitution: | 76 | 38 | 18 | 30 | 46 | 28 | 71 | 71 | 60 | 112 |

(f) Second Variable Substitution.
Second substitution table = Value 4 in block XOR Mask$_{4,3}$:
30 XOR 69 = 11
Therefore, substitution table 11 shall be used for the second substitution.

| Block before substitution: | 76 | 38 | 18 | 30 | 46 | 28 | 71 | 71 | 60 | 112 |
|---|---|---|---|---|---|---|---|---|---|---|
| Block after substitution: | 3 | 100 | 107 | 30 | 13 | 54 | 58 | 58 | 36 | 14 |

ROUND 4

| BLOCK = | 3 | 100 | 107 | 30 | 13 | 54 | 58 | 58 | 36 | 14 |
|---|---|---|---|---|---|---|---|---|---|---|

(a) Variable permutation.
Add all values in block (mod 128):
3+100+107+30+13+54+58+58+36+14 = 473 mod 128 = 89
Mask$_1$ value for round 4 (Mask$_{1,4}$) = 18
Permutation Table = Sum of the block XOR Mask$_{1,4}$:
89 XOR 18 = 75
Therefore, permutation table 75 shall be used for the permutation.

| Block before permutation: | 3 | 100 | 107 | 30 | 13 | 54 | 58 | 58 | 36 | 14 |
|---|---|---|---|---|---|---|---|---|---|---|

Block after permutation:

-continued

| 30 | 58 | 14 | 100 | 54 | 13 | 36 | 3 | 58 | 107 |

(b) First Key Addition.
Mask$_2$ value for round 4 (Mask$_{2,4}$)=72
First key=Value 4 in the block XOR Mask$_{2,4}$:
100 XOR 72=44
Therefore, Key$_{44}$ shall be used for the first key addition.

| Block before key addition: | | | | | | | | | |
|---|---|---|---|---|---|---|---|---|---|
| 30 | 58 | 14 | 100 | 54 | 13 | 36 | 3 | 58 | 107 |
| Block after key addition: | | | | | | | | | |
| 99 | 35 | 0 | 100 | 36 | 104 | 12 | 71 | 25 | 43 |

(c) Second Key Addition.
Second key=Value 5 in the block XOR Mask$_{2,4}$:
36 XOR 72=108
Therefore, Key$_{108}$ shall be used for the second key addition.

| Block before key addition: | | | | | | | | | |
|---|---|---|---|---|---|---|---|---|---|
| 99 | 35 | 0 | 100 | 36 | 104 | 12 | 71 | 25 | 43 |
| Block after key addition: | | | | | | | | | |
| 77 | 95 | 115 | 53 | 36 | 35 | 19 | 119 | 56 | 69 |

(d) Variable Enclave.
Enclave Table=value of Mask$_{3,4}$ (mod 32)=61 mod 32=29
Therefore, enclave table 29 shall be used for the enclave.

| Block before enclave: | | | | | | | | | |
|---|---|---|---|---|---|---|---|---|---|
| 77 | 95 | 115 | 53 | 36 | 35 | 19 | 119 | 56 | 69 |
| Block after enclave: | | | | | | | | | |
| 117 | 76 | 52 | 98 | 12 | 13 | 113 | 26 | 108 | 92 |

(e) First Variable Substitution.
Mask$_4$ value for round 4 (Mask$_{4,4}$)=87
First substitution table=Value 4 in block XOR Mask$_{4,4}$:
98 XOR 87=5
Therefore, substitution table 5 shall be used for the first substitution.

| Block before substitution: | | | | | | | | | |
|---|---|---|---|---|---|---|---|---|---|
| 117 | 76 | 52 | 98 | 12 | 13 | 113 | 26 | 108 | 92 |
| Block after substitution: | | | | | | | | | |
| 64 | 80 | 83 | 98 | 58 | 48 | 50 | 31 | 49 | 43 |

(f) Second Variable Substitution.
Second substitution table=Value 5 in block XOR Mask$_{4,4}$: 58 XOR 87=13
Therefore, substitution table 13 shall be used for the second substitution.

| Block before substitution: | | | | | | | | | |
|---|---|---|---|---|---|---|---|---|---|
| 64 | 80 | 83 | 98 | 58 | 48 | 50 | 31 | 49 | 43 |
| Block after substitution: | | | | | | | | | |
| 122 | 28 | 81 | 29 | 58 | 127 | 22 | 16 | 26 | 49 |

ROUND 5

| BLOCK = | 122 | 28 | 81 | 29 | 58 | 127 | 22 | 16 | 26 | 49 |

(a) Variable Permutation.
Add all values in block (mod 128):
122+28+81+29+58+127+22+16+26+49=558
mod 128=46
Mask$_1$ value for round 5 (Mask$_{1,5}$)=60
Permutation Table=Sum of the block XOR Mask$_{1,5}$:
46 XOR 60=18
Therefore, permutation table 18 shall be used for the permutation.

| Block before permutation: | | | | | | | | | |
|---|---|---|---|---|---|---|---|---|---|
| 122 | 28 | 81 | 29 | 58 | 127 | 22 | 16 | 26 | 49 |
| Block after permutation: | | | | | | | | | |
| 49 | 122 | 127 | 81 | 28 | 16 | 26 | 22 | 29 | 58 |

(b) First Key Addition.
Mask$_2$ value for round 5 (Mask$_{2,5}$)=69
First key=Value 5 in the block XOR Mask$_{2,5}$:
28 XOR 69=89
Therefore, Key$_{89}$ shall be used for the first key addition.

| Block before key addition: | | | | | | | | | |
|---|---|---|---|---|---|---|---|---|---|
| 49 | 122 | 127 | 81 | 28 | 16 | 26 | 22 | 29 | 58 |
| Block after key addition: | | | | | | | | | |
| 40 | 118 | 40 | 87 | 28 | 74 | 102 | 101 | 88 | 57 |

(c) Second Key Addition.
Second key=Value 6 in the block XOR Mask$_{2,5}$:
74 XOR 69=15
Therefore, Key$_{15}$ shall be used for the second key addition.

| Block before key addition: | | | | | | | | | |
|---|---|---|---|---|---|---|---|---|---|
| 40 | 118 | 40 | 87 | 28 | 74 | 102 | 101 | 88 | 57 |
| Block after key addition: | | | | | | | | | |
| 15 | 50 | 22 | 72 | 90 | 74 | 7 | 76 | 15 | 92 |

(d) Variable Enclave.
Enclave Table=value of Mask 3,5 (mod 32)=37 mod 32=5
Therefore, enclave table 5 shall be used for the enclave.

| Block before enclave: | | | | | | | | | |
|---|---|---|---|---|---|---|---|---|---|
| 15 | 50 | 22 | 72 | 90 | 74 | 7 | 76 | 15 | 92 |
| Block after enclave: | | | | | | | | | |
| 98 | 69 | 120 | 65 | 54 | 18 | 6 | 17 | 59 | 14 |

(e) First Variable Substitution.
Mask$_4$ value for round 5 (Mask$_{4,5}$)=18
First substitution table=Value 5 in block XOR Mask$_{4,5}$:
54 XOR 18=4
Therefore, substitution table 4 shall be used for the first substitution.

| Block before substitution: | | | | | | | | | |
|---|---|---|---|---|---|---|---|---|---|
| 98 | 69 | 120 | 65 | 54 | 18 | 6 | 17 | 59 | 14 |
| Block after substitution: | | | | | | | | | |

| 38 | 0 | 92 | 68 | 54 | 89 | 122 | 4 | 74 | 106 |

(f) Second Variable Substitution.
Second substitution table = Value 6 in block XOR Mask$_{4,5}$:
89 XOR 18 = 11
Therefore, substitution table 11 shall be used for the second substitution.

Block before substitution:
| 38 | 0 | 92 | 68 | 54 | 89 | 122 | 4 | 74 | 106 |

Block after substitution:
| 100 | 24 | 126 | 122 | 108 | 89 | 39 | 45 | 93 | 28 |

ROUND 6

BLOCK = 100 24 126 122 108 89 39 45 93 28

(a) Variable Permutation.
Add all values in block (mod 128):
100+24+126+122+108+89+39+45+93+28=774 mod 128=6
Mask$_1$ value for round 6 (Mask$_{1,6}$) = 105
permutation Table = Sum of the block XOR Mask$_{1,6}$:
6 XOR 105 = 111
Therefore, permutation table 111 shall be used for the permutation.

Block before permutation:
| 100 | 24 | 126 | 122 | 108 | 89 | 39 | 45 | 93 | 28 |

Block after permutation:
| 126 | 45 | 122 | 89 | 93 | 108 | 24 | 28 | 39 | 100 |

(b) First Key Addition.
Mask$_2$ value for round 6 (Mask$_{2,6}$) = 13
First key = Value 6 in the block XOR Mask$_{2,6}$:
108 XOR 13 = 97
Therefore, Key$_{97}$ shall be used for the first key addition.

Block before key addition:
| 126 | 45 | 122 | 89 | 93 | 108 | 24 | 28 | 39 | 100 |

Block after key addition:
| 39 | 78 | 56 | 40 | 24 | 108 | 99 | 80 | 4 | 77 |

(c) Second key Addition.
Second key = Value$_7$ in the block XOR Mask$_{2,6}$:
99 XOR 13 = 110
Therefore, Key$_{110}$ shall be used for the second key addition.

Block before key addition:
| 39 | 78 | 56 | 40 | 24 | 108 | 99 | 80 | 4 | 77 |

Block after key addition:
| 94 | 63 | 13 | 94 | 121 | 33 | 99 | 70 | 118 | 11 |

(d) Variable Enclave.
Enclave Table = value of Mask$_{3,6}$ (mod 32) = 13 = mod 32 = 13
Therefore, enclave table 13 shall be used for the enclave.

Block before enclave:
| 94 | 63 | 13 | 94 | 121 | 33 | 99 | 70 | 118 | 11 |

Block after enclave:
| 89 | 102 | 105 | 113 | 44 | 117 | 86 | 106 | 57 | 50 |

(e) First Variable Substitution.
Mask$_4$ value for round 6 (Mask$_{4,6}$) = 31
First Substitution Table = Value 6 in block XOR Mask$_{4,6}$:
117 XOR 31 = 10
Therefore, substitution table 10 shall be used for the first substitution.

Block before substitution:
| 89 | 102 | 105 | 113 | 44 | 117 | 86 | 106 | 57 | 50 |

Block after substitution:
| 78 | 65 | 30 | 125 | 17 | 117 | 57 | 61 | 89 | 38 |

(f) Second Variable Substitution.
Second substitution table = Value 7 in block XOR Mask$_{4,6}$:
57 XOR 31 = 6
Therefore, substitution table 6 shall be used for the second substitution.

Block before substitution:
| 78 | 65 | 30 | 125 | 17 | 117 | 57 | 61 | 89 | 38 |

Block after substitution:
| 6 | 92 | 76 | 30 | 120 | 66 | 57 | 51 | 58 | 80 |

ROUND 7

BLOCK = 6 92 76 30 120 66 57 51 58 80

(a) Variable Permutation.
Add all values in block (mod 128):
6+92+76+30+120+66+57+51+58+80=636 mod 128=124
Mask$_1$ value for round 7 (Mask$_{1,7}$) = 33
Permutation Table = Sum of the block XOR Mask$_{1,7}$:
124 XOR 33 = 93
Therefore permutation table 93 shall be used for the permutation.

Block before permutation:
| 6 | 92 | 76 | 30 | 120 | 66 | 57 | 51 | 58 | 80 |

Block after permutation:
| 66 | 57 | 120 | 92 | 30 | 80 | 58 | 51 | 6 | 76 |

(b) First Key Addition.
Mask$_2$ value for round 7 (Mask$_{2,7}$) = 77
First key = Value 7 in the block XOR Mask$_{2,7}$:
58 XOR 77 = 119
Therefore, Key$_{119}$ shall be used for the first key addition.

Block before key addition:
| 66 | 57 | 120 | 92 | 30 | 80 | 58 | 51 | 6 | 76 |

Block after key addition:
| 55 | 9 | 30 | 92 | 21 | 117 | 58 | 32 | 16 | 97 |

(c) Second Key Addition.
Second key = Value 8 in the block XOR Mask$_{2,7}$:

32 XOR 77 = 109
Therefore, Key$_{109}$ shall be used for the second key addition.

Block before key addition:
55  9  30  92  21  117  58  32  16  97
Block after key addition:
37  117  11  121  62  60  69  32  110  42

(d) Variable Enclave.
Enclave Table = value of Mask$_{3,7}$ (mod 32) = 49 mod 32 = 17
Therefore, enclave table 17 shall be used for the enclave.

Block before enclave:
37  117  11  121  62  60  69  32  110  42
Block after enclave:
80  95  116  23  78  60  94  113  112  2

(e) First Variable Substitution.
Mask$_4$ value for round 7 (Mask$_{4,7}$) = 102
First substitution table = Value 7 in block XOR Mask$_{4,7}$:
94 XOR 102 = 8
Therefore, substitution table 8 shall be used for the first substitution.

Block before substitution:
80  95  116  23  78  60  94  113  112  2
Block after substitution:
1  9  24  39  52  98  94  99  108  35

(f) Second Variable Substitution.
Second substitution table = Value 8 in block XOR Mask$_{4,7}$:
99 XOR 102 = 5
Therefore, substitution table 5 shall be used for the second substitution.

Block before substitution:
1  9  24  39  52  98  94  99  108  35
Block after substitution:
85  98  36  57  83  51  90  99  49  9

ROUND 8

BLOCK = 85  98  36  57  83  51  90  99  49  9

(a) Variable Permutation.
Add all values in block (mod 128):
5+98+36+57+83+51+90+99+49+9 = 657 mod 28 = 17
Mask$_1$ value for round 8 (Mask$_{1,8}$) = 50
Permutation Table = Sum of the block XOR Mask$_{1,8}$:
17 XOR 50 = 35
Therefore, permutation table 35 shall be used for the permutation.

Block before permutation:
85 98 36 57 83 51 90 99 49 9
Block after permutation:
98 49 90 83 99 36 57 51 85 9

(b) First Key Addition.
Mask$_2$ value for round 8 (Mask$_{2,8}$) = 43
First key = Value 8 in the block XOR Mask$_{2,8}$:
51 XOR 43 = 24
Therefore, Key$_{24}$ shall be used for the first key addition.

Block before key addition:
98 49 90 83 99 36 57 51 85  9
Block after key addition:
64 86 38 82 89 88 18 51 79 87

(c) Second Key Addition.
Second key = Value 9 in the block XOR Mask$_{2,8}$:
79 XOR 43 = 100
Therefore, Key$_{100}$ shall be used for the second key addition.

Block before key addition:
64 86 38 82 89 88 18 51 79 87
Block after key addition:
68 55 56 89 35  4 56 79 79 83

(d) Variable Enclave.
Enclave Table = value of Mask$_{3,8}$ (mod 32) = 71 mod 32 = 7
Therefore, enclave table 7 shall be used for the enclave.

Block before enclave:
68 55 56 89  35  4 56 79 79 83
Block after enclave:
7 63 70  6 113 40 96 62 19 61

(e) First Variable Substitution.
Mask$_4$ value for round 8 (Mask$_{4,8}$) = 101
First Substitution Table = Value 8 block XOR Mask$_{4,8}$:
62 XOR 101 = 11
Therefore, substitution table 11 shall be used for the first substitution.

Block before substitution:
7 63 70  6 113 40 96 62  19 61
Block after substitution:
87 48 91 121  80 94 52 62 110 70

(f) Second Variable Substitution.
Second substitution table = Value 9 in block XOR Mask$_{4,8}$:
110 XOR 101 = 11
Therefore, substitution table 11 shall be used for the second substitution.

Block before substitution:
87  48 91 121 80 94  52 62 110 70
Block after substitution:
25 124 95  23 67 88 102 79 110 91

ROUND 9

BLOCK = 25 124 95 23 67 88 102 79 110 91

(a) Variable Permutation.
Add all values in block (mod 128):

$25+124+95+23+67+88+102+79+110+91=804$
mod $128=36$
$Mask_1$ value for round 9 $(Mask_{1,9})=11$
Permutation Table = Sum of the block XOR $Mask_{1,9}$:
36 XOR 11 = 47
Therefore, permutation table 47 shall be used for the permutation.

| Block before permutation: |
| --- |
| 25 124 95 23 67 88 102 79 110 91 |
| Block after permutation: |
| 91 95 124 79 88 23 25 102 110 67 |

(b) First Key Addition.
$Mask_2$ value for round 9 $(Mask_{2,9})=9$
First key = Value 9 in the block XOR $Mask_{2,9}$:
110 XOR 9 = 103
Therefore, $Key_{103}$ shall be used for the first key addition.

| Block before key addition: |
| --- |
| 91 95 124 79 88 23 25 102 110 67 |
| Block after key addition: |
| 80 72 99 87 98 39 46 44 110 44 |

(c) Second Key Addition
Second key = Value 10 in the block XOR $Mask_{2,9}$:
44 XOR 9 = 37
Therefore, $Key_{37}$ shall be used for the second key addition.

| Block before key addition: |
| --- |
| 80 72 99 87 98 39 46 44 110 44 |
| Block after key addition: |
| 71 120 20 6 114 89 109 32 69 44 |

(d) Variable Enclave.
Enclave Table = value of $Mask_{3,9}$ (mod 32) = 24 mod 32 = 24
Therefore, enclave table 24 shall be used for the enclave.

| Block before enclave: |
| --- |
| 71 120 20 6 114 89 109 32 69 44 |
| Block after enclave: |
| 41 71 57 98 55 2 41 99 106 92 |

(e) First Variable Substitution.
$Mask_4$ value for round 9 $(Mask_{4,9})=32$
First Substitution Table = Value 9 in block XOR $Mask_{4,9}$:
106 XOR 32 = 10
Therefore, substitution table 10 shall be used for the first substitution.

| Block before substitution: |
| --- |
| 41 71 57 98 55 2 41 99 106 92 |
| Block after substitution: |
| 104 42 89 39 72 31 104 10 106 67 |

(f) Second Variable Substitution.
Second Substitution Table Value 10 in block XOR $Mask_{4,9}$:
67 XOR 32 = 3
Therefore, substitution table 3 shall be used for the second substitution.

| Block before substitution: |
| --- |
| 104 42 89 39 72 31 104 10 106 67 |
| Block after substitution: |
| 24 49 88 105 94 71 24 124 125 67 |

ROUND 10

| BLOCK = 24 49 88 105 94 71 24 124 125 67 |
| --- |

(a) Variable permutation.
Add all values in block (mod 128):
$24+49+88+105+94+71+24+124+125+67=771$
mod $128=3$
$Mask_1$ value for round 10 $(Mask_{1,10})=60$
Permutation Table = Sum of the block XOR $Mask_{1,10}$:
3 XOR 60 = 63
Therefore, permutation table 63 shall be used for the permutation.

| Block before permutation: |
| --- |
| 24 49 88 105 94 71 24 124 125 67 |
| Block after permutation: |
| 67 124 105 88 125 24 24 94 49 71 |

(b) First Key Addition.
$Mask_2$ value for round 10 $(Mask_{2,10})=99$
First Key = Value 10 in the block XOR $Mask_{2,10}$:
71 XOR 99 = 36
Therefore, $Key_{36}$ shall be used for the first key addition.

| Block before key addition: |
| --- |
| 67 124 105 88 125 24 24 94 49 71 |
| Block after key addition: |
| 110 9 114 70 70 96 91 117 12 71 |

(c) Second Key Addition.
Second key = Value 10 in the block XOR $Mask_{2,10}$:
71 XOR 99 = 36
Therefore, $Key_{36}$ shall be used for the second key addition.

| Block before key addition: |
| --- |
| 110 9 114 70 70 96 91 117 12 71 |
| Block after key addition: |
| 67 124 105 88 125 24 24 94 49 71 |

(d) Variable Enclave.
Enclave Table = value of $Mask_{3,10}$ (mod 32) = 60 mod 32 = 28
Therefore, enclave table 28 shall be used for the enclave.

| Block before enclave: |
| --- |
| 67 124 105 88 125 24 24 94 49 71 |
| Block after enclave: |
| 36 31 0 91 41 84 71 38 87 122 |

(e) First Variable Substitution.
$Mask_4$ value for round 10 $(Mask_{4,10})=125$
First Substitution Table Value 10 in block XOR $Mask_{4,10}$:
122 XOR 125 = 7

Therefore, substitution table 7 shall be used for the first substitution.

Block before substitution:
36 31 0 91 41 84 71 38 87 122
Block after substitution:
90 27 11 41 114 117 56 33 72 122

(f) Second Variable Substitution.
Second Substitution Table Value 10 in block XOR Mask$_{4,10}$:
122 XOR 125 = 7
Therefore, substitution table 7 shall be used for the second substitution.

Block before substitution:
90 27 11 41 114 117 56 33 72 122
Block after substitution:
28 4 87 114 88 23 122 105 44 122
TRANSMITTED BLOCK:
28 4 87 114 88 23 122 105 44 122

After ten rounds of encryption in accordance with the present invention, the plaintext block has been converted into a ciphertext block as follows:

Plaintext:
110 111 32 116 101 115 116 115 32 112
Ciphertext:
28 4 87 114 88 23 122 105 144 122

Having described above the presently preferred embodiments of this invention, it is to be understood that it may be otherwise embodied within the scope of the appended claims.

TABLE I

PERMUTATION TABLE

| | | | | | | | | | | |
|---|---|---|---|---|---|---|---|---|---|---|
| Perm 0 | 1 | 6 | 7 | 9 | 10 | 2 | 5 | 8 | 3 | 4 |
| Perm 1 | 10 | 4 | 8 | 3 | 1 | 7 | 2 | 9 | 5 | 6 |
| Perm 2 | 1 | 6 | 4 | 9 | 8 | 5 | 10 | 2 | 3 | 7 |
| Perm 3 | 9 | 8 | 3 | 4 | 5 | 10 | 6 | 1 | 7 | 2 |
| Perm 4 | 9 | 4 | 6 | 3 | 8 | 1 | 10 | 2 | 5 | 7 |
| Perm 5 | 5 | 2 | 4 | 9 | 1 | 6 | 10 | 7 | 8 | 3 |
| Perm 6 | 2 | 8 | 6 | 1 | 5 | 9 | 3 | 4 | 10 | 7 |
| Perm 7 | 7 | 8 | 10 | 2 | 5 | 4 | 3 | 1 | 9 | 6 |
| Perm 8 | 1 | 2 | 10 | 3 | 8 | 7 | 4 | 6 | 9 | 5 |
| Perm 9 | 10 | 8 | 2 | 3 | 5 | 9 | 7 | 1 | 6 | 4 |
| Perm 10 | 7 | 3 | 8 | 5 | 4 | 1 | 2 | 9 | 10 | 6 |
| Perm 11 | 6 | 5 | 7 | 2 | 10 | 4 | 3 | 9 | 1 | 8 |
| Perm 12 | 8 | 5 | 2 | 7 | 6 | 3 | 9 | 1 | 4 | 10 |
| Perm 13 | 4 | 1 | 6 | 7 | 5 | 10 | 2 | 3 | 8 | 9 |
| Perm 14 | 10 | 2 | 7 | 1 | 5 | 4 | 8 | 9 | 6 | 3 |
| Perm 15 | 3 | 5 | 7 | 9 | 8 | 1 | 2 | 10 | 4 | 6 |
| Perm 16 | 6 | 8 | 9 | 5 | 3 | 7 | 10 | 4 | 1 | 2 |
| Perm 17 | 2 | 6 | 1 | 4 | 7 | 5 | 3 | 9 | 10 | 8 |
| Perm 18 | 2 | 5 | 4 | 9 | 10 | 3 | 8 | 6 | 7 | 1 |
| Perm 19 | 3 | 10 | 5 | 8 | 6 | 7 | 4 | 2 | 1 | 9 |
| Perm 20 | 9 | 10 | 5 | 6 | 3 | 7 | 2 | 1 | 4 | 8 |
| Perm 21 | 3 | 5 | 4 | 7 | 6 | 1 | 2 | 8 | 10 | 9 |
| Perm 22 | 6 | 5 | 2 | 7 | 1 | 9 | 10 | 8 | 3 | 4 |
| Perm 23 | 4 | 1 | 3 | 6 | 7 | 8 | 9 | 10 | 5 | 2 |
| Perm 24 | 7 | 3 | 5 | 1 | 6 | 4 | 9 | 10 | 8 | 2 |
| Perm 25 | 7 | 5 | 4 | 9 | 1 | 3 | 6 | 8 | 10 | 2 |
| Perm 26 | 7 | 1 | 5 | 10 | 9 | 2 | 4 | 6 | 8 | 3 |
| Perm 27 | 5 | 1 | 3 | 10 | 9 | 7 | 8 | 2 | 4 | 6 |
| Perm 28 | 6 | 3 | 4 | 9 | 1 | 8 | 2 | 7 | 5 | 10 |
| Perm 29 | 1 | 2 | 4 | 9 | 7 | 3 | 10 | 8 | 5 | 6 |
| Perm 30 | 8 | 2 | 9 | 4 | 3 | 7 | 1 | 6 | 10 | 5 |
| Perm 31 | 3 | 4 | 9 | 10 | 8 | 5 | 1 | 6 | 2 | 7 |
| Perm 32 | 9 | 10 | 2 | 1 | 6 | 8 | 4 | 5 | 7 | 3 |
| Perm 33 | 5 | 1 | 7 | 6 | 4 | 8 | 9 | 10 | 2 | 3 |
| Perm 34 | 10 | 3 | 6 | 9 | 4 | 2 | 5 | 7 | 8 | 1 |
| Perm 35 | 9 | 1 | 6 | 7 | 4 | 8 | 3 | 5 | 2 | 10 |
| Perm 36 | 8 | 9 | 4 | 7 | 10 | 2 | 6 | 1 | 5 | 3 |
| Perm 37 | 4 | 6 | 7 | 5 | 2 | 1 | 3 | 9 | 10 | 8 |
| Perm 38 | 3 | 9 | 7 | 4 | 10 | 2 | 1 | 6 | 8 | 5 |
| Perm 39 | 2 | 4 | 5 | 6 | 7 | 10 | 1 | 8 | 9 | 3 |
| Perm 40 | 5 | 1 | 2 | 4 | 8 | 10 | 6 | 9 | 7 | 3 |
| Perm 41 | 10 | 1 | 5 | 8 | 2 | 7 | 4 | 6 | 3 | 9 |
| Perm 42 | 5 | 3 | 4 | 9 | 2 | 10 | 7 | 6 | 1 | 8 |
| Perm 43 | 6 | 5 | 10 | 4 | 1 | 2 | 9 | 8 | 3 | 7 |
| Perm 44 | 9 | 1 | 7 | 6 | 4 | 5 | 10 | 3 | 8 | 2 |
| Perm 45 | 9 | 7 | 2 | 10 | 5 | 8 | 4 | 6 | 3 | 1 |
| Perm 46 | 4 | 10 | 5 | 1 | 2 | 8 | 7 | 9 | 6 | 3 |
| Perm 47 | 7 | 3 | 2 | 6 | 10 | 5 | 8 | 4 | 9 | 1 |
| Perm 48 | 3 | 1 | 6 | 9 | 7 | 10 | 5 | 2 | 8 | 4 |
| Perm 49 | 6 | 4 | 2 | 1 | 7 | 3 | 9 | 10 | 5 | 8 |
| Perm 50 | 2 | 8 | 3 | 9 | 7 | 1 | 6 | 4 | 5 | 10 |
| Perm 51 | 3 | 10 | 4 | 7 | 1 | 5 | 6 | 2 | 8 | 9 |
| Perm 52 | 5 | 1 | 3 | 6 | 10 | 4 | 7 | 9 | 2 | 8 |
| Perm 53 | 10 | 5 | 2 | 4 | 9 | 1 | 6 | 7 | 8 | 3 |
| Perm 54 | 5 | 9 | 2 | 8 | 6 | 3 | 4 | 10 | 1 | 7 |
| Perm 55 | 6 | 1 | 5 | 10 | 8 | 4 | 2 | 3 | 9 | 7 |
| Perm 56 | 2 | 9 | 3 | 1 | 6 | 10 | 8 | 4 | 5 | 7 |
| Perm 57 | 2 | 5 | 3 | 6 | 10 | 9 | 1 | 8 | 7 | 4 |
| Perm 58 | 9 | 7 | 1 | 6 | 10 | 2 | 3 | 5 | 4 | 8 |
| Perm 59 | 2 | 10 | 4 | 5 | 1 | 9 | 6 | 7 | 8 | 3 |
| Perm 60 | 7 | 2 | 6 | 4 | 1 | 9 | 10 | 3 | 8 | 5 |
| Perm 61 | 3 | 2 | 4 | 5 | 8 | 10 | 7 | 6 | 9 | 1 |
| Perm 62 | 1 | 7 | 8 | 3 | 9 | 10 | 6 | 5 | 4 | 2 |
| Perm 63 | 6 | 9 | 4 | 3 | 8 | 10 | 7 | 2 | 5 | 1 |
| Perm 64 | 7 | 1 | 6 | 2 | 4 | 5 | 8 | 10 | 3 | 9 |
| Perm 65 | 7 | 2 | 5 | 9 | 1 | 6 | 10 | 3 | 4 | 8 |
| Perm 66 | 10 | 5 | 4 | 3 | 8 | 9 | 1 | 6 | 7 | 2 |
| Perm 67 | 9 | 2 | 3 | 6 | 8 | 7 | 5 | 4 | 1 | 10 |
| Perm 68 | 9 | 4 | 6 | 10 | 8 | 7 | 5 | 1 | 3 | 2 |
| Perm 69 | 1 | 2 | 7 | 3 | 4 | 5 | 10 | 8 | 6 | 9 |
| Perm 70 | 2 | 6 | 8 | 5 | 10 | 1 | 3 | 4 | 9 | 7 |
| Perm 71 | 9 | 4 | 3 | 1 | 5 | 6 | 10 | 8 | 2 | 7 |
| Perm 72 | 1 | 8 | 7 | 10 | 3 | 9 | 6 | 4 | 5 | 2 |
| Perm 73 | 3 | 10 | 7 | 9 | 4 | 6 | 5 | 1 | 8 | 2 |
| Perm 74 | 8 | 5 | 9 | 6 | 7 | 10 | 3 | 4 | 2 | 1 |
| Perm 75 | 8 | 4 | 10 | 1 | 6 | 5 | 9 | 2 | 7 | 3 |
| Perm 76 | 8 | 6 | 9 | 10 | 5 | 7 | 1 | 4 | 2 | 3 |
| Perm 77 | 10 | 4 | 5 | 7 | 8 | 6 | 9 | 3 | 2 | 1 |
| Perm 78 | 1 | 5 | 8 | 10 | 3 | 9 | 6 | 7 | 4 | 2 |
| Perm 79 | 4 | 9 | 7 | 5 | 8 | 2 | 3 | 1 | 10 | 6 |
| Perm 80 | 1 | 8 | 9 | 7 | 3 | 2 | 5 | 6 | 10 | 4 |
| Perm 81 | 1 | 2 | 9 | 8 | 5 | 4 | 6 | 7 | 3 | 10 |
| Perm 82 | 7 | 9 | 6 | 2 | 1 | 8 | 4 | 10 | 5 | 3 |
| Perm 83 | 10 | 4 | 8 | 3 | 5 | 2 | 6 | 9 | 1 | 7 |
| Perm 84 | 8 | 5 | 7 | 3 | 2 | 9 | 1 | 4 | 6 | 10 |
| Perm 85 | 9 | 10 | 3 | 1 | 4 | 7 | 6 | 5 | 8 | 2 |
| Perm 86 | 9 | 7 | 2 | 6 | 5 | 8 | 3 | 10 | 1 | 4 |
| Perm 87 | 5 | 3 | 8 | 1 | 9 | 7 | 10 | 2 | 4 | 6 |
| Perm 88 | 6 | 9 | 1 | 8 | 2 | 3 | 7 | 10 | 5 | 4 |
| Perm 89 | 4 | 7 | 9 | 5 | 2 | 8 | 10 | 3 | 6 | 1 |
| Perm 90 | 8 | 5 | 1 | 4 | 6 | 9 | 2 | 10 | 3 | 7 |
| Perm 91 | 10 | 2 | 4 | 8 | 3 | 7 | 9 | 5 | 6 | 1 |
| Perm 92 | 4 | 2 | 3 | 9 | 5 | 7 | 8 | 10 | 1 | 6 |
| Perm 93 | 9 | 4 | 10 | 5 | 3 | 1 | 2 | 8 | 7 | 6 |
| Perm 94 | 3 | 2 | 6 | 5 | 4 | 9 | 8 | 10 | 7 | 1 |
| Perm 95 | 6 | 4 | 10 | 3 | 7 | 9 | 5 | 1 | 2 | 8 |
| Perm 96 | 6 | 8 | 2 | 9 | 3 | 10 | 7 | 5 | 4 | 1 |
| Perm 97 | 10 | 4 | 8 | 7 | 9 | 5 | 3 | 2 | 1 | 6 |
| Perm 98 | 2 | 1 | 5 | 7 | 10 | 9 | 3 | 8 | 6 | 4 |
| Perm 99 | 3 | 6 | 10 | 5 | 8 | 2 | 9 | 7 | 4 | 1 |
| Perm 100 | 3 | 8 | 2 | 6 | 7 | 5 | 4 | 9 | 1 | 10 |
| Perm 101 | 8 | 1 | 9 | 3 | 6 | 7 | 4 | 10 | 2 | 5 |
| Perm 102 | 4 | 10 | 2 | 8 | 6 | 3 | 9 | 5 | 7 | 1 |
| Perm 103 | 4 | 8 | 2 | 3 | 7 | 1 | 10 | 5 | 6 | 9 |
| Perm 104 | 8 | 5 | 1 | 7 | 4 | 6 | 2 | 3 | 10 | 9 |
| Perm 105 | 7 | 10 | 5 | 1 | 6 | 8 | 4 | 3 | 9 | 2 |
| Perm 106 | 2 | 5 | 3 | 8 | 10 | 9 | 6 | 4 | 1 | 7 |
| Perm 107 | 2 | 9 | 6 | 1 | 7 | 8 | 5 | 4 | 3 | 10 |
| Perm 108 | 4 | 2 | 3 | 10 | 9 | 5 | 7 | 8 | 6 | 1 |
| Perm 109 | 5 | 2 | 10 | 8 | 4 | 1 | 3 | 7 | 6 | 9 |
| Perm 110 | 6 | 5 | 8 | 3 | 7 | 4 | 9 | 10 | 2 | 1 |
| Perm 111 | 10 | 7 | 1 | 3 | 6 | 4 | 9 | 2 | 5 | 8 |
| Perm 112 | 9 | 7 | 8 | 4 | 6 | 1 | 2 | 5 | 3 | 10 |
| Perm 113 | 3 | 4 | 8 | 7 | 2 | 5 | 10 | 9 | 1 | 6 |
| Perm 114 | 5 | 8 | 7 | 1 | 9 | 2 | 6 | 10 | 4 | 3 |
| Perm 115 | 5 | 4 | 3 | 1 | 2 | 8 | 10 | 7 | 9 | 6 |
| Perm 116 | 9 | 7 | 1 | 3 | 5 | 6 | 8 | 2 | 4 | 10 |

TABLE I-continued
PERMUTATION TABLE

| Perm 117 | 9 | 4 | 10 | 6 | 1 | 2 | 7 | 5 | 3 | 8 |
|---|---|---|---|---|---|---|---|---|---|---|
| Perm 118 | 1 | 6 | 5 | 10 | 9 | 8 | 2 | 7 | 4 | 3 |
| Perm 119 | 10 | 3 | 8 | 2 | 5 | 6 | 7 | 1 | 9 | 4 |
| Perm 120 | 6 | 10 | 2 | 5 | 8 | 3 | 4 | 9 | 7 | 1 |
| Perm 121 | 6 | 1 | 8 | 10 | 5 | 4 | 2 | 7 | 9 | 3 |
| Perm 122 | 9 | 10 | 8 | 2 | 5 | 1 | 3 | 7 | 4 | 6 |
| Perm 123 | 1 | 3 | 7 | 6 | 2 | 9 | 5 | 4 | 10 | 8 |
| Perm 124 | 7 | 6 | 1 | 5 | 3 | 9 | 8 | 2 | 10 | 4 |
| Perm 125 | 4 | 7 | 10 | 6 | 1 | 8 | 2 | 5 | 3 | 9 |
| Perm 126 | 9 | 8 | 3 | 7 | 1 | 10 | 5 | 6 | 2 | 4 |
| Perm 127 | 7 | 8 | 5 | 10 | 9 | 3 | 4 | 2 | 1 | 6 |

TABLE IIA
SUBSTITUTION TABLE - PART A

| ORIGINAL | TBL 0 | TBL 1 | TBL 2 | TBL 3 | TBL 4 | TBL 5 | TBL 6 | TBL 7 |
|---|---|---|---|---|---|---|---|---|
| 0 | 90 | 47 | 19 | 90 | 25 | 123 | 55 | 11 |
| 1 | 46 | 89 | 44 | 26 | 51 | 85 | 122 | 54 |
| 2 | 66 | 87 | 95 | 75 | 103 | 71 | 123 | 82 |
| 3 | 21 | 20 | 25 | 106 | 116 | 13 | 7 | 62 |
| 4 | 50 | 15 | 87 | 4 | 37 | 117 | 68 | 101 |
| 5 | 57 | 84 | 38 | 54 | 88 | 92 | 94 | 70 |
| 6 | 84 | 0 | 36 | 46 | 122 | 47 | 88 | 108 |
| 7 | 67 | 65 | 125 | 41 | 7 | 107 | 79 | 119 |
| 8 | 80 | 83 | 111 | 115 | 15 | 29 | 110 | 17 |
| 9 | 91 | 4 | 71 | 107 | 44 | 98 | 117 | 121 |
| 10 | 44 | 49 | 97 | 124 | 13 | 104 | 47 | 124 |
| 11 | 124 | 70 | 43 | 36 | 111 | 108 | 67 | 87 |
| 12 | 94 | 66 | 35 | 113 | 30 | 58 | 83 | 25 |
| 13 | 126 | 110 | 84 | 126 | 120 | 48 | 69 | 74 |
| 14 | 25 | 37 | 94 | 123 | 106 | 60 | 9 | 7 |
| 15 | 125 | 73 | 107 | 35 | 114 | 89 | 93 | 126 |
| 16 | 8 | 127 | 58 | 67 | 27 | 21 | 13 | 29 |
| 17 | 37 | 68 | 24 | 58 | 4 | 14 | 120 | 111 |
| 18 | 82 | 38 | 98 | 109 | 89 | 112 | 62 | 79 |
| 19 | 28 | 64 | 4 | 52 | 78 | 121 | 37 | 58 |
| 20 | 33 | 103 | 89 | 101 | 23 | 118 | 90 | 18 |
| 21 | 14 | 124 | 53 | 10 | 34 | 67 | 10 | 77 |
| 22 | 30 | 96 | 63 | 72 | 107 | 79 | 115 | 116 |
| 23 | 115 | 126 | 52 | 114 | 126 | 22 | 98 | 102 |
| 24 | 0 | 85 | 96 | 14 | 123 | 36 | 52 | 14 |
| 25 | 71 | 112 | 33 | 42 | 12 | 24 | 85 | 107 |
| 26 | 83 | 111 | 100 | 7 | 112 | 31 | 77 | 8 |
| 27 | 68 | 86 | 116 | 98 | 117 | 41 | 50 | 4 |
| 28 | 18 | 74 | 108 | 84 | 96 | 97 | 109 | 12 |
| 29 | 123 | 53 | 28 | 43 | 50 | 10 | 104 | 92 |
| 30 | 92 | 52 | 10 | 62 | 80 | 65 | 76 | 66 |
| 31 | 34 | 82 | 93 | 71 | 102 | 52 | 95 | 27 |
| 32 | 74 | 123 | 102 | 39 | 119 | 32 | 64 | 84 |
| 33 | 97 | 93 | 65 | 31 | 81 | 81 | 44 | 105 |
| 34 | 4 | 79 | 51 | 2 | 82 | 37 | 111 | 113 |
| 35 | 53 | 9 | 83 | 5 | 101 | 9 | 2 | 45 |
| 36 | 76 | 80 | 91 | 80 | 8 | 122 | 59 | 90 |
| 37 | 27 | 33 | 55 | 91 | 72 | 6 | 33 | 96 |
| 38 | 5 | 10 | 99 | 37 | 67 | 73 | 80 | 33 |
| 39 | 35 | 27 | 110 | 105 | 108 | 57 | 78 | 52 |
| 40 | 70 | 35 | 117 | 20 | 47 | 116 | 40 | 65 |
| 41 | 43 | 88 | 56 | 34 | 21 | 35 | 45 | 114 |
| 42 | 127 | 48 | 127 | 49 | 6 | 111 | 17 | 83 |
| 43 | 79 | 19 | 86 | 61 | 66 | 18 | 31 | 98 |
| 44 | 81 | 61 | 42 | 70 | 109 | 0 | 87 | 34 |
| 45 | 16 | 45 | 120 | 44 | 35 | 1 | 22 | 115 |
| 46 | 42 | 60 | 77 | 116 | 48 | 94 | 73 | 50 |
| 47 | 32 | 40 | 18 | 87 | 94 | 26 | 15 | 75 |
| 48 | 51 | 125 | 16 | 112 | 26 | 66 | 82 | 61 |
| 49 | 106 | 36 | 67 | 111 | 97 | 115 | 61 | 20 |
| 50 | 104 | 92 | 39 | 15 | 65 | 91 | 75 | 109 |
| 51 | 120 | 57 | 14 | 29 | 85 | 55 | 118 | 118 |
| 52 | 87 | 95 | 122 | 120 | 77 | 83 | 89 | 97 |
| 53 | 48 | 99 | 72 | 11 | 99 | 82 | 25 | 43 |
| 54 | 22 | 3 | 15 | 85 | 52 | 2 | 42 | 49 |
| 55 | 45 | 67 | 73 | 97 | 57 | 11 | 74 | 36 |
| 56 | 118 | 105 | 62 | 78 | 113 | 27 | 43 | 122 |
| 57 | 54 | 75 | 13 | 73 | 39 | 87 | 48 | 15 |
| 58 | 75 | 5 | 113 | 3 | 83 | 77 | 36 | 81 |
| 59 | 10 | 71 | 69 | 74 | 74 | 88 | 4 | 89 |
| 60 | 121 | 116 | 31 | 1 | 16 | 16 | 0 | 123 |
| 61 | 85 | 77 | 79 | 65 | 49 | 86 | 51 | 10 |
| 62 | 119 | 100 | 57 | 122 | 121 | 5 | 53 | 9 |
| 63 | 100 | 98 | 92 | 102 | 93 | 56 | 97 | 63 |
| 64 | 61 | 101 | 78 | 25 | 61 | 113 | 126 | 100 |
| 65 | 116 | 115 | 76 | 79 | 68 | 40 | 92 | 93 |
| 66 | 110 | 44 | 103 | 77 | 62 | 7 | 16 | 16 |
| 67 | 86 | 30 | 121 | 9 | 84 | 72 | 119 | 30 |
| 68 | 89 | 56 | 109 | 32 | 29 | 38 | 32 | 32 |

TABLE IIA-continued
SUBSTITUTION TABLE - PART A

| ORIGINAL | TBL 0 | TBL 1 | TBL 2 | TBL 3 | TBL 4 | TBL 5 | TBL 6 | TBL 7 |
|---|---|---|---|---|---|---|---|---|
| 69 | 9 | 81 | 106 | 63 | 0 | 46 | 8 | 31 |
| 70 | 12 | 51 | 26 | 28 | 118 | 100 | 108 | 22 |
| 71 | 13 | 32 | 37 | 103 | 17 | 84 | 24 | 56 |
| 72 | 108 | 117 | 54 | 94 | 98 | 74 | 106 | 44 |
| 73 | 69 | 26 | 40 | 68 | 110 | 68 | 49 | 110 |
| 74 | 93 | 76 | 9 | 81 | 54 | 114 | 124 | 91 |
| 75 | 55 | 120 | 32 | 47 | 18 | 19 | 21 | 120 |
| 76 | 1 | 54 | 80 | 59 | 115 | 80 | 107 | 69 |
| 77 | 52 | 1 | 8 | 92 | 60 | 54 | 121 | 13 |
| 78 | 95 | 104 | 48 | 56 | 46 | 17 | 6 | 1 |
| 79 | 20 | 121 | 41 | 121 | 73 | 93 | 101 | 103 |
| 80 | 107 | 69 | 115 | 99 | 28 | 99 | 63 | 6 |
| 81 | 64 | 72 | 23 | 8 | 86 | 95 | 60 | 40 |
| 82 | 29 | 24 | 1 | 23 | 53 | 44 | 27 | 21 |
| 83 | 23 | 41 | 27 | 51 | 127 | 78 | 71 | 86 |
| 84 | 47 | 8 | 74 | 64 | 100 | 119 | 38 | 117 |
| 85 | 40 | 63 | 60 | 57 | 91 | 15 | 39 | 112 |
| 86 | 26 | 12 | 46 | 89 | 63 | 125 | 127 | 78 |
| 87 | 58 | 31 | 112 | 40 | 71 | 4 | 102 | 72 |
| 88 | 114 | 102 | 64 | 27 | 45 | 110 | 99 | 24 |
| 89 | 65 | 113 | 50 | 88 | 31 | 12 | 58 | 42 |
| 90 | 17 | 109 | 49 | 127 | 14 | 45 | 100 | 28 |
| 91 | 36 | 25 | 17 | 6 | 43 | 28 | 11 | 41 |
| 92 | 59 | 13 | 114 | 50 | 36 | 43 | 86 | 39 |
| 93 | 2 | 91 | 0 | 12 | 33 | 3 | 34 | 53 |
| 94 | 72 | 2 | 81 | 38 | 90 | 90 | 56 | 104 |
| 95 | 39 | 21 | 90 | 86 | 87 | 124 | 113 | 37 |
| 96 | 111 | 17 | 105 | 69 | 32 | 101 | 5 | 60 |
| 97 | 15 | 55 | 47 | 18 | 64 | 127 | 103 | 57 |
| 98 | 38 | 22 | 126 | 119 | 38 | 51 | 41 | 68 |
| 99 | 60 | 122 | 66 | 48 | 5 | 69 | 19 | 35 |
| 100 | 103 | 16 | 119 | 21 | 55 | 120 | 84 | 67 |
| 101 | 19 | 18 | 61 | 16 | 56 | 23 | 14 | 0 |
| 102 | 102 | 106 | 2 | 22 | 124 | 126 | 70 | 19 |
| 103 | 77 | 39 | 5 | 33 | 3 | 61 | 112 | 71 |
| 104 | 99 | 94 | 59 | 24 | 70 | 96 | 28 | 73 |
| 105 | 109 | 6 | 101 | 66 | 58 | 75 | 81 | 95 |
| 106 | 98 | 97 | 6 | 125 | 19 | 102 | 72 | 80 |
| 107 | 56 | 7 | 70 | 0 | 79 | 25 | 26 | 106 |
| 108 | 88 | 29 | 12 | 104 | 59 | 49 | 96 | 46 |
| 109 | 96 | 46 | 123 | 82 | 40 | 109 | 65 | 64 |
| 110 | 11 | 23 | 85 | 110 | 42 | 30 | 18 | 99 |
| 111 | 6 | 108 | 29 | 76 | 104 | 33 | 46 | 85 |
| 112 | 73 | 78 | 20 | 45 | 10 | 103 | 54 | 5 |
| 113 | 101 | 58 | 7 | 13 | 75 | 50 | 23 | 38 |
| 114 | 117 | 114 | 45 | 118 | 125 | 63 | 57 | 88 |
| 115 | 62 | 90 | 68 | 117 | 2 | 76 | 35 | 26 |
| 116 | 112 | 107 | 82 | 19 | 95 | 53 | 29 | 55 |
| 117 | 41 | 59 | 30 | 83 | 1 | 64 | 66 | 23 |
| 118 | 105 | 28 | 3 | 17 | 69 | 70 | 114 | 48 |
| 119 | 63 | 34 | 34 | 100 | 22 | 8 | 105 | 51 |
| 120 | 113 | 50 | 124 | 96 | 92 | 105 | 12 | 59 |
| 121 | 7 | 11 | 21 | 95 | 24 | 62 | 1 | 94 |
| 122 | 78 | 43 | 88 | 60 | 20 | 20 | 91 | 3 |
| 123 | 49 | 119 | 104 | 30 | 9 | 34 | 125 | 127 |
| 124 | 3 | 42 | 11 | 53 | 41 | 42 | 20 | 47 |
| 125 | 31 | 118 | 118 | 93 | 76 | 59 | 30 | 2 |
| 126 | 24 | 14 | 75 | 55 | 105 | 106 | 3 | 125 |
| 127 | 122 | 62 | 22 | 108 | 11 | 39 | 116 | 76 |

TABLE IIB
SUBSTITUTION TABLE - PART B

| ORIGINAL | TBL 8 | TBL 9 | TBL 10 | TBL 11 | TBL 12 | TBL 13 | TBL 14 | TBL 15 |
|---|---|---|---|---|---|---|---|---|
| 0 | 42 | 18 | 66 | 24 | 119 | 121 | 73 | 0 |
| 1 | 32 | 124 | 13 | 0 | 58 | 56 | 36 | 52 |
| 2 | 35 | 109 | 31 | 69 | 27 | 78 | 107 | 44 |
| 3 | 20 | 17 | 7 | 53 | 70 | 58 | 43 | 83 |
| 4 | 13 | 37 | 97 | 45 | 120 | 8 | 2 | 40 |
| 5 | 38 | 119 | 91 | 26 | 0 | 85 | 28 | 54 |
| 6 | 14 | 100 | 49 | 121 | 57 | 79 | 54 | 28 |
| 7 | 2 | 89 | 56 | 87 | 17 | 51 | 31 | 7 |
| 8 | 78 | 83 | 51 | 82 | 6 | 77 | 50 | 51 |
| 9 | 81 | 96 | 9 | 22 | 35 | 123 | 93 | 110 |
| 10 | 118 | 28 | 15 | 97 | 7 | 42 | 29 | 20 |
| 11 | 59 | 52 | 93 | 127 | 94 | 87 | 0 | 106 |
| 12 | 46 | 102 | 87 | 78 | 102 | 15 | 34 | 35 |
| 13 | 107 | 126 | 45 | 59 | 108 | 112 | 48 | 92 |

TABLE IIB-continued
SUBSTITUTION TABLE - PART B

| ORIGINAL | TBL 8 | TBL 9 | TBL 10 | TBL 11 | TBL 12 | TBL 13 | TBL 14 | TBL 15 |
|---|---|---|---|---|---|---|---|---|
| 14 | 31 | 91 | 33 | 68 | 77 | 38 | 104 | 67 |
| 15 | 8 | 104 | 46 | 116 | 117 | 111 | 22 | 30 |
| 16 | 115 | 35 | 98 | 106 | 99 | 23 | 25 | 60 |
| 17 | 61 | 26 | 70 | 83 | 82 | 125 | 92 | 123 |
| 18 | 82 | 105 | 95 | 107 | 30 | 12 | 94 | 38 |
| 19 | 49 | 62 | 115 | 110 | 67 | 66 | 96 | 101 |
| 20 | 102 | 85 | 20 | 35 | 15 | 45 | 72 | 4 |
| 21 | 87 | 15 | 11 | 29 | 95 | 105 | 5 | 97 |
| 22 | 125 | 125 | 82 | 104 | 32 | 35 | 63 | 26 |
| 23 | 39 | 66 | 6 | 33 | 79 | 25 | 98 | 56 |
| 24 | 117 | 107 | 85 | 118 | 121 | 24 | 109 | 111 |
| 25 | 53 | 21 | 123 | 76 | 59 | 52 | 125 | 99 |
| 26 | 116 | 110 | 19 | 18 | 78 | 60 | 76 | 70 |
| 27 | 80 | 50 | 79 | 114 | 40 | 33 | 23 | 126 |
| 28 | 30 | 48 | 119 | 54 | 48 | 0 | 42 | 8 |
| 29 | 25 | 67 | 24 | 63 | 81 | 7 | 99 | 112 |
| 30 | 112 | 111 | 74 | 74 | 9 | 115 | 47 | 95 |
| 31 | 57 | 5 | 3 | 41 | 3 | 16 | 11 | 81 |
| 32 | 50 | 63 | 16 | 71 | 16 | 100 | 57 | 117 |
| 33 | 40 | 90 | 116 | 123 | 72 | 5 | 84 | 41 |
| 34 | 120 | 59 | 103 | 112 | 127 | 44 | 20 | 90 |
| 35 | 105 | 106 | 0 | 32 | 41 | 119 | 69 | 5 |
| 36 | 21 | 80 | 23 | 2 | 106 | 18 | 70 | 55 |
| 37 | 47 | 9 | 122 | 125 | 112 | 62 | 120 | 14 |
| 38 | 101 | 57 | 40 | 100 | 63 | 89 | 52 | 109 |
| 39 | 94 | 116 | 62 | 34 | 13 | 92 | 83 | 127 |
| 40 | 5 | 81 | 105 | 94 | 71 | 13 | 24 | 74 |
| 41 | 76 | 99 | 104 | 5 | 47 | 11 | 39 | 80 |
| 42 | 54 | 19 | 32 | 19 | 28 | 3 | 115 | 21 |
| 43 | 34 | 84 | 37 | 46 | 60 | 49 | 26 | 119 |
| 44 | 92 | 77 | 17 | 4 | 25 | 99 | 71 | 64 |
| 45 | 66 | 49 | 113 | 115 | 11 | 117 | 60 | 100 |
| 46 | 15 | 123 | 99 | 13 | 51 | 86 | 61 | 42 |
| 47 | 111 | 33 | 77 | 117 | 19 | 1 | 85 | 73 |
| 48 | 127 | 1 | 55 | 124 | 92 | 127 | 35 | 94 |
| 49 | 100 | 60 | 18 | 62 | 76 | 26 | 95 | 23 |
| 50 | 77 | 98 | 38 | 56 | 100 | 22 | 102 | 48 |
| 51 | 7 | 65 | 35 | 92 | 87 | 54 | 21 | 19 |
| 52 | 19 | 38 | 68 | 102 | 4 | 84 | 89 | 82 |
| 53 | 70 | 41 | 86 | 55 | 122 | 41 | 117 | 116 |
| 54 | 68 | 95 | 44 | 108 | 85 | 98 | 90 | 33 |
| 55 | 104 | 58 | 72 | 51 | 90 | 57 | 67 | 88 |
| 56 | 48 | 118 | 73 | 72 | 46 | 61 | 17 | 9 |
| 57 | 83 | 97 | 89 | 50 | 105 | 43 | 81 | 18 |
| 58 | 71 | 88 | 48 | 37 | 8 | 97 | 62 | 46 |
| 59 | 119 | 72 | 47 | 8 | 24 | 114 | 113 | 66 |
| 60 | 98 | 46 | 118 | 36 | 54 | 74 | 32 | 108 |
| 61 | 72 | 23 | 90 | 70 | 123 | 73 | 37 | 59 |
| 62 | 89 | 120 | 1 | 79 | 1 | 9 | 127 | 114 |
| 63 | 85 | 2 | 41 | 48 | 89 | 71 | 38 | 71 |
| 64 | 41 | 29 | 58 | 89 | 118 | 122 | 126 | 34 |
| 65 | 109 | 93 | 107 | 9 | 52 | 76 | 82 | 122 |
| 66 | 62 | 44 | 8 | 15 | 61 | 102 | 7 | 39 |
| 67 | 74 | 34 | 112 | 111 | 96 | 19 | 10 | 102 |
| 68 | 22 | 40 | 14 | 122 | 86 | 120 | 78 | 118 |
| 69 | 0 | 45 | 102 | 90 | 83 | 47 | 41 | 53 |
| 70 | 121 | 16 | 100 | 91 | 2 | 116 | 8 | 16 |
| 71 | 29 | 30 | 42 | 58 | 33 | 82 | 87 | 31 |
| 72 | 114 | 112 | 5 | 86 | 37 | 91 | 112 | 125 |
| 73 | 3 | 117 | 53 | 75 | 114 | 69 | 106 | 75 |
| 74 | 91 | 22 | 88 | 93 | 38 | 37 | 86 | 62 |
| 75 | 36 | 115 | 64 | 120 | 111 | 59 | 88 | 13 |
| 76 | 4 | 24 | 109 | 3 | 107 | 113 | 30 | 32 |
| 77 | 51 | 122 | 108 | 40 | 62 | 101 | 44 | 27 |
| 78 | 52 | 114 | 101 | 7 | 50 | 67 | 121 | 86 |
| 79 | 86 | 70 | 2 | 17 | 126 | 68 | 97 | 57 |
| 80 | 1 | 36 | 71 | 67 | 84 | 28 | 119 | 87 |
| 81 | 67 | 73 | 124 | 119 | 73 | 107 | 6 | 10 |
| 82 | 43 | 47 | 27 | 42 | 125 | 118 | 105 | 76 |
| 83 | 103 | 121 | 92 | 27 | 44 | 81 | 40 | 24 |
| 84 | 63 | 27 | 43 | 77 | 88 | 14 | 4 | 107 |
| 85 | 113 | 71 | 121 | 43 | 45 | 80 | 64 | 25 |
| 86 | 56 | 43 | 57 | 64 | 49 | 72 | 118 | 36 |
| 87 | 55 | 87 | 84 | 25 | 116 | 106 | 101 | 105 |
| 88 | 18 | 3 | 75 | 30 | 14 | 94 | 79 | 72 |
| 89 | 96 | 79 | 78 | 109 | 68 | 126 | 123 | 78 |
| 90 | 75 | 75 | 26 | 103 | 29 | 109 | 103 | 2 |
| 91 | 6 | 101 | 111 | 95 | 65 | 53 | 53 | 12 |
| 92 | 11 | 74 | 67 | 126 | 31 | 83 | 12 | 47 |
| 93 | 110 | 108 | 126 | 16 | 110 | 50 | 124 | 37 |

TABLE IIB-continued

SUBSTITUTION TABLE - PART B

| ORIGINAL | TBL 8 | TBL 9 | TBL 10 | TBL 11 | TBL 12 | TBL 13 | TBL 14 | TBL 15 |
|---|---|---|---|---|---|---|---|---|
| 94 | 45 | 0 | 110 | 88 | 36 | 10 | 19 | 91 |
| 95 | 9 | 42 | 117 | 113 | 39 | 32 | 9 | 98 |
| 96 | 16 | 82 | 34 | 52 | 103 | 17 | 110 | 43 |
| 97 | 124 | 39 | 50 | 11 | 109 | 110 | 80 | 11 |
| 98 | 69 | 53 | 39 | 98 | 5 | 29 | 14 | 103 |
| 99 | 95 | 10 | 10 | 49 | 10 | 34 | 108 | 85 |
| 100 | 79 | 20 | 12 | 99 | 69 | 2 | 15 | 63 |
| 101 | 126 | 54 | 127 | 21 | 124 | 103 | 100 | 104 |
| 102 | 97 | 113 | 65 | 57 | 18 | 21 | 68 | 1 |
| 103 | 88 | 4 | 83 | 44 | 21 | 6 | 1 | 124 |
| 104 | 60 | 64 | 28 | 12 | 104 | 20 | 3 | 15 |
| 105 | 26 | 7 | 30 | 84 | 43 | 46 | 91 | 65 |
| 106 | 33 | 11 | 61 | 28 | 23 | 46 | 18 | 93 |
| 107 | 123 | 92 | 81 | 105 | 93 | 30 | 27 | 58 |
| 108 | 28 | 32 | 60 | 10 | 101 | 36 | 59 | 17 |
| 109 | 64 | 13 | 54 | 85 | 74 | 96 | 55 | 77 |
| 110 | 23 | 55 | 21 | 73 | 20 | 88 | 46 | 84 |
| 111 | 12 | 103 | 25 | 6 | 56 | 65 | 65 | 61 |
| 112 | 108 | 51 | 94 | 14 | 26 | 4 | 33 | 121 |
| 113 | 99 | 94 | 125 | 80 | 22 | 48 | 111 | 29 |
| 114 | 106 | 31 | 59 | 96 | 91 | 27 | 56 | 45 |
| 115 | 65 | 56 | 36 | 60 | 34 | 63 | 13 | 22 |
| 116 | 24 | 86 | 69 | 38 | 98 | 75 | 114 | 115 |
| 117 | 10 | 61 | 96 | 66 | 42 | 40 | 66 | 68 |
| 118 | 17 | 6 | 29 | 20 | 113 | 55 | 122 | 3 |
| 119 | 90 | 78 | 22 | 1 | 80 | 124 | 75 | 113 |
| 120 | 93 | 127 | 76 | 31 | 66 | 64 | 74 | 89 |
| 121 | 73 | 76 | 80 | 23 | 53 | 104 | 45 | 96 |
| 122 | 122 | 14 | 4 | 39 | 97 | 70 | 51 | 49 |
| 123 | 44 | 25 | 106 | 81 | 12 | 95 | 16 | 69 |
| 14 | 37 | 8 | 120 | 61 | 115 | 108 | 116 | 120 |
| 125 | 84 | 12 | 52 | 65 | 55 | 39 | 58 | 50 |
| 126 | 27 | 68 | 114 | 47 | 75 | 31 | 77 | 6 |
| 127 | 58 | 69 | 63 | 101 | 64 | 93 | 49 | 79 |

TABLE III

ENCLAVE TABLE

| | a | b | c | d |
|---|---|---|---|---|
| TABLE 0: | 5 2 3 | 3 5 2 | 5 4 2 | 5 4 2 |
| | 4 3 1 | 1 3 5 | 4 3 1 | 2 5 1 |
| | 2 5 4 | 2 4 1 | 1 5 3 | 1 3 5 |
| | 1 4 5 | 5 1 4 | 3 2 5 | 3 2 4 |
| | 3 1 2 | 4 2 3 | 2 1 4 | 4 1 3 |
| TABLE 1: | 3 1 2 | 3 2 5 | 4 2 1 | 4 2 3 |
| | 4 3 1 | 5 1 4 | 3 4 5 | 5 3 1 |
| | 2 5 4 | 2 4 3 | 5 1 4 | 2 1 5 |
| | 5 2 3 | 4 3 1 | 1 3 2 | 3 5 4 |
| | 1 4 5 | 1 5 2 | 2 5 3 | 1 4 2 |
| TABLE 2: | 4 1 3 | 1 4 2 | 2 5 3 | 2 5 3 |
| | 1 2 5 | 4 5 3 | 3 2 5 | 4 3 5 |
| | 3 5 1 | 2 1 4 | 4 3 1 | 3 2 1 |
| | 2 3 4 | 3 2 5 | 1 4 2 | 5 1 4 |
| | 5 4 2 | 5 3 1 | 5 1 4 | 1 4 2 |
| TABLE 3: | 1 2 4 | 5 3 4 | 2 4 5 | 4 2 3 |
| | 4 5 1 | 4 5 2 | 4 2 1 | 2 5 4 |
| | 2 3 5 | 2 1 3 | 1 5 3 | 5 3 1 |
| | 3 4 2 | 3 4 1 | 5 3 4 | 3 1 2 |
| | 5 1 3 | 1 2 5 | 3 1 2 | 1 4 5 |
| TABLE 4: | 2 5 3 | 2 3 1 | 4 2 1 | 2 5 3 |
| | 4 1 2 | 4 2 5 | 1 4 2 | 1 4 5 |
| | 5 2 4 | 5 1 4 | 2 3 5 | 4 3 2 |
| | 1 3 5 | 1 4 3 | 3 5 4 | 3 2 1 |
| | 3 4 1 | 3 5 2 | 5 1 3 | 5 1 4 |
| TABLE 5: | 1 4 3 | 2 4 1 | 2 3 4 | 5 3 1 |
| | 5 1 2 | 4 5 3 | 3 1 2 | 3 5 2 |
| | 2 3 4 | 1 2 5 | 1 5 3 | 1 4 3 |
| | 3 2 5 | 5 3 4 | 5 4 1 | 4 2 5 |
| | 4 5 1 | 3 1 2 | 4 2 5 | 2 1 4 |
| TABLE 6: | 1 5 4 | 1 5 2 | 3 5 2 | 5 1 4 |
| | 3 1 2 | 2 1 3 | 4 2 1 | 3 4 2 |
| | 5 4 3 | 4 3 5 | 1 3 4 | 4 3 1 |
| | 4 2 5 | 3 4 1 | 2 4 5 | 1 2 5 |
| | 2 3 1 | 5 2 4 | 5 1 3 | 2 5 3 |
| TABLE 7: | 2 5 1 | 2 1 5 | 5 4 2 | 3 5 4 |
| | 5 1 2 | 1 5 2 | 2 1 3 | 4 3 2 |
| | 3 4 5 | 5 4 3 | 3 2 5 | 5 2 1 |
| | 4 2 3 | 4 3 1 | 4 3 1 | 2 1 5 |
| TABLE 8: | 1 3 4 | 3 2 4 | 1 5 4 | 1 4 3 |
| | 2 5 4 | 1 2 4 | 4 2 5 | 2 3 1 |
| | 1 2 3 | 5 3 1 | 2 3 4 | 5 2 4 |
| | 3 4 1 | 2 4 5 | 1 5 3 | 1 5 2 |
| | 4 3 5 | 3 5 2 | 5 1 2 | 3 4 5 |
| | 5 1 2 | 4 1 3 | 3 4 1 | 4 1 3 |
| TABLE 9: | 1 3 2 | 4 1 2 | 4 5 1 | 4 3 2 |
| | 5 1 3 | 1 3 5 | 1 2 3 | 3 1 5 |
| | 2 5 4 | 3 2 1 | 5 3 2 | 5 4 1 |
| | 4 2 5 | 5 4 3 | 3 4 5 | 2 5 3 |
| | 3 4 1 | 2 5 4 | 2 1 4 | 1 2 4 |
| TABLE 10: | 1 4 3 | 5 4 3 | 5 2 3 | 2 5 1 |
| | 2 5 1 | 2 3 5 | 1 4 5 | 3 4 2 |
| | 3 1 5 | 1 5 4 | 3 1 2 | 5 1 4 |
| | 5 2 4 | 3 1 2 | 2 5 4 | 1 2 3 |
| | 4 3 2 | 4 2 1 | 4 3 1 | 4 3 5 |
| TABLE 11: | 5 1 2 | 1 4 2 | 2 4 5 | 3 1 4 |
| | 4 5 3 | 2 3 1 | 3 5 4 | 2 4 3 |
| | 1 2 4 | 5 1 4 | 1 2 3 | 5 2 1 |
| | 3 4 5 | 4 5 3 | 5 1 2 | 4 3 5 |
| | 2 3 1 | 3 2 5 | 4 3 1 | 1 5 2 |
| TABLE 12: | 4 1 2 | 2 5 3 | 5 3 2 | 5 1 4 |
| | 5 4 3 | 4 2 5 | 2 1 4 | 4 5 2 |
| | 2 3 1 | 5 1 4 | 4 5 1 | 3 2 1 |
| | 1 2 5 | 3 4 1 | 1 4 3 | 1 4 3 |
| | 3 5 4 | 1 3 2 | 3 2 5 | 2 3 5 |
| TABLE 13: | 2 3 1 | 4 2 5 | 3 2 4 | 5 2 4 |
| | 1 4 2 | 5 3 1 | 2 4 5 | 3 1 5 |
| | 5 2 4 | 2 5 4 | 4 3 1 | 4 5 1 |
| | 3 1 5 | 3 1 2 | 5 1 2 | 2 4 3 |
| | 4 5 3 | 1 4 3 | 1 5 3 | 1 3 2 |
| TABLE 14: | 5 3 2 | 2 3 4 | 4 3 1 | 4 2 5 |
| | 3 2 5 | 5 1 2 | 2 4 5 | 1 5 2 |
| | 2 1 4 | 4 2 5 | 1 5 2 | 3 4 1 |
| | 1 4 3 | 1 4 3 | 3 2 4 | 2 1 3 |
| | 4 5 1 | 3 5 1 | 5 1 3 | 5 3 4 |
| TABLE 15: | 1 2 5 | 3 5 1 | 5 3 2 | 2 3 5 |
| | 5 4 2 | 5 3 4 | 1 4 5 | 5 1 3 |
| | 3 5 4 | 2 4 3 | 4 2 3 | 1 2 4 |

TABLE III-continued

ENCLAVE TABLE

| | | a | b | c | d |
|---|---|---|---|---|---|
| | | 2 3 1 | 4 1 2 | 2 5 1 | 3 4 2 |
| | | 4 1 3 | 1 2 5 | 3 1 4 | 4 5 1 |
| TABLE 16: | | 2 4 1 | 2 3 1 | 2 1 5 | 5 1 3 |
| | | 4 5 2 | 3 4 5 | 1 4 3 | 3 2 1 |
| | | 1 2 3 | 4 5 2 | 5 3 2 | 4 5 2 |
| | | 3 1 5 | 1 2 4 | 3 2 4 | 2 3 4 |
| | | 5 3 4 | 5 1 3 | 4 5 1 | 1 4 5 |
| TABLE 17: | | 4 3 5 | 2 3 5 | 5 2 1 | 5 3 4 |
| | | 3 2 4 | 4 5 1 | 1 3 2 | 3 5 1 |
| | | 5 1 2 | 5 1 3 | 3 5 4 | 1 4 2 |
| | | 2 4 1 | 3 2 4 | 2 4 5 | 2 1 5 |
| | | 1 5 3 | 1 4 2 | 4 1 3 | 4 2 3 |
| TABLE 18: | | 2 4 1 | 3 1 4 | 5 1 4 | 5 3 1 |
| | | 4 3 5 | 1 5 3 | 2 5 1 | 4 1 3 |
| | | 1 2 4 | 4 3 2 | 4 3 2 | 1 4 2 |
| | | 5 1 3 | 2 4 5 | 3 4 5 | 3 2 5 |
| | | 3 5 2 | 5 2 1 | 1 2 3 | 2 5 4 |
| TABLE 19: | | 2 5 3 | 4 1 3 | 2 5 3 | 4 5 2 |
| | | 4 3 5 | 3 4 2 | 1 3 2 | 3 2 5 |
| | | 3 4 1 | 1 3 5 | 4 1 5 | 5 1 3 |
| | | 5 1 2 | 2 5 1 | 5 4 1 | 2 4 1 |
| | | 1 2 4 | 5 2 4 | 3 2 4 | 1 3 4 |
| TABLE 20: | | 3 1 4 | 4 2 1 | 4 2 1 | 3 4 2 |
| | | 2 4 5 | 3 1 4 | 2 1 4 | 5 1 4 |
| | | 1 5 2 | 2 3 5 | 1 3 5 | 2 3 1 |
| | | 5 2 3 | 1 5 3 | 3 5 2 | 1 5 3 |
| | | 4 3 1 | 5 4 2 | 5 4 3 | 4 2 5 |
| TABLE 21: | | 2 4 5 | 5 2 3 | 4 5 3 | 1 3 2 |
| | | 3 5 1 | 3 4 2 | 5 4 2 | 2 1 4 |
| | | 5 1 2 | 4 5 1 | 2 3 1 | 3 2 5 |
| | | 1 3 4 | 1 3 5 | 1 2 5 | 4 5 1 |
| | | 4 2 3 | 2 1 4 | 3 1 4 | 5 4 3 |
| TABLE 22: | | 3 1 4 | 4 5 1 | 1 3 4 | 2 5 1 |
| | | 5 4 2 | 5 2 3 | 2 5 1 | 5 3 4 |
| | | 1 5 3 | 2 3 5 | 5 1 2 | 3 4 2 |
| | | 4 2 5 | 1 4 2 | 4 2 3 | 1 2 5 |
| | | 2 3 1 | 3 1 4 | 3 4 5 | 4 1 3 |
| TABLE 23: | | 2 3 5 | 4 1 5 | 5 2 3 | 1 3 2 |
| | | 1 4 3 | 3 2 1 | 2 3 1 | 4 1 5 |
| | | 4 5 2 | 5 4 2 | 4 1 5 | 2 4 1 |
| | | 5 2 1 | 1 3 4 | 1 4 2 | 3 5 4 |

TABLE III-continued

ENCLAVE TABLE

| | | a | b | c | d |
|---|---|---|---|---|---|
| | | 3 1 4 | 2 5 3 | 3 5 4 | 5 2 3 |
| TABLE 24: | | 2 1 5 | 3 5 2 | 3 2 5 | 3 2 1 |
| | | 5 4 3 | 2 3 1 | 1 4 2 | 4 1 5 |
| | | 3 2 4 | 1 4 3 | 2 5 3 | 1 5 4 |
| | | 4 5 1 | 5 1 4 | 5 1 4 | 2 4 3 |
| | | 1 3 2 | 4 2 5 | 4 3 1 | 5 3 2 |
| TABLE 25: | | 4 5 2 | 4 2 1 | 2 5 3 | 4 3 1 |
| | | 3 1 4 | 5 3 4 | 3 2 4 | 1 4 5 |
| | | 1 3 5 | 2 1 3 | 1 4 5 | 2 5 3 |
| | | 5 2 3 | 3 5 2 | 5 1 2 | 3 1 2 |
| | | 2 4 1 | 1 4 5 | 4 3 1 | 5 2 4 |
| TABLE 26: | | 4 2 5 | 5 4 3 | 3 2 1 | 1 4 5 |
| | | 1 4 2 | 2 1 4 | 5 3 4 | 5 2 3 |
| | | 2 3 4 | 1 3 5 | 2 1 5 | 3 1 2 |
| | | 5 1 3 | 4 2 1 | 4 5 3 | 4 5 1 |
| | | 3 5 1 | 3 5 2 | 1 4 2 | 2 3 4 |
| TABLE 27: | | 2 1 5 | 2 5 1 | 3 2 5 | 4 5 2 |
| | | 4 2 3 | 4 1 3 | 1 3 2 | 2 4 5 |
| | | 1 4 2 | 1 3 5 | 2 4 1 | 1 3 4 |
| | | 5 3 4 | 3 4 2 | 5 1 4 | 5 1 3 |
| | | 3 5 1 | 5 2 4 | 4 5 3 | 3 2 1 |
| TABLE 28: | | 3 1 5 | 5 4 3 | 4 1 3 | 3 4 5 |
| | | 5 3 4 | 2 3 1 | 3 2 5 | 5 2 1 |
| | | 4 2 1 | 4 2 5 | 1 5 2 | 4 1 3 |
| | | 1 4 2 | 3 1 2 | 2 3 4 | 2 5 4 |
| | | 2 5 3 | 1 5 4 | 5 4 1 | 1 3 2 |
| TABLE 29: | | 4 5 3 | 4 3 2 | 2 3 1 | 3 4 2 |
| | | 5 1 4 | 2 5 1 | 4 5 2 | 2 1 4 |
| | | 1 3 2 | 5 4 3 | 5 2 4 | 4 3 5 |
| | | 3 2 5 | 1 2 4 | 1 4 3 | 5 2 1 |
| | | 2 4 1 | 3 1 5 | 3 1 5 | 1 5 3 |
| TABLE 30: | | 2 4 1 | 2 4 3 | 1 5 3 | 4 1 5 |
| | | 3 5 4 | 4 1 2 | 2 4 1 | 3 5 2 |
| | | 5 1 3 | 3 5 4 | 4 3 2 | 1 4 3 |
| | | 1 2 5 | 5 2 1 | 5 2 4 | 2 3 4 |
| | | 4 3 2 | 1 3 5 | 3 1 5 | 5 2 1 |
| TABLE 31: | | 5 3 1 | 4 1 5 | 4 2 3 | 1 5 2 |
| | | 1 2 4 | 2 3 1 | 3 5 4 | 3 1 4 |
| | | 3 1 5 | 1 5 3 | 1 4 2 | 4 2 1 |
| | | 4 5 2 | 3 4 2 | 5 3 1 | 2 3 5 |
| | | 2 4 3 | 5 2 4 | 2 1 5 | 5 4 3 |

TABLE IV

KEY TABLE

| | | | | | | | | | | |
|---|---|---|---|---|---|---|---|---|---|---|
| KEY 0 = | 0 | 34 | 55 | 63 | 9 | 73 | 74 | 107 | 109 | 33 |
| KEY 1 = | 10 | 62 | 48 | 85 | 32 | 101 | 8 | 0 | 63 | 56 |
| KEY 2 = | 26 | 59 | 75 | 97 | 33 | 80 | 8 | 6 | 73 | 26 |
| KEY 3 = | 0 | 92 | 102 | 108 | 73 | 29 | 43 | 98 | 31 | 118 |
| KEY 4 = | 102 | 110 | 121 | 22 | 60 | 56 | 24 | 124 | 118 | 15 |
| KEY 5 = | 105 | 67 | 89 | 14 | 80 | 51 | 28 | 122 | 26 | 115 |
| KEY 6 = | 111 | 105 | 44 | 0 | 42 | 63 | 14 | 121 | 49 | 28 |
| KEY 7 = | 91 | 70 | 52 | 58 | 88 | 15 | 107 | 22 | 51 | 48 |
| KEY 8 = | 95 | 91 | 21 | 22 | 109 | 80 | 79 | 64 | 60 | 2 |
| KEY 9 = | 68 | 53 | 115 | 99 | 54 | 56 | 91 | 56 | 27 | 27 |
| KEY 10 = | 6 | 86 | 116 | 122 | 38 | 79 | 83 | 116 | 48 | 60 |
| KEY 11 = | 70 | 31 | 48 | 44 | 121 | 44 | 0 | 55 | 34 | 57 |
| KEY 12 = | 95 | 73 | 50 | 69 | 67 | 22 | 21 | 79 | 24 | 9 |
| KEY 13 = | 67 | 102 | 117 | 6 | 28 | 24 | 2 | 0 | 93 | 107 |
| KEY 14 = | 55 | 122 | 97 | 98 | 34 | 124 | 50 | 69 | 37 | 4 |
| KEY 15 = | 39 | 68 | 62 | 31 | 70 | 44 | 97 | 41 | 87 | 101 |
| KEY 16 = | 109 | 34 | 27 | 6 | 81 | 46 | 22 | 112 | 39 | 19 |
| KEY 17 = | 23 | 109 | 58 | 95 | 9 | 78 | 93 | 109 | 65 | 87 |
| KEY 18 = | 39 | 6 | 95 | 39 | 112 | 79 | 10 | 17 | 51 | 63 |
| KEY 19 = | 31 | 122 | 83 | 97 | 18 | 22 | 113 | 37 | 50 | 69 |
| KEY 20 = | 120 | 118 | 120 | 45 | 97 | 50 | 105 | 70 | 9 | 37 |
| KEY 21 = | 50 | 44 | 32 | 62 | 83 | 85 | 121 | 44 | 43 | 19 |
| KEY 22 = | 46 | 10 | 0 | 107 | 120 | 87 | 58 | 68 | 56 | 69 |
| KEY 23 = | 71 | 119 | 36 | 74 | 123 | 87 | 96 | 68 | 70 | 39 |
| KEY 24 = | 34 | 103 | 124 | 1 | 58 | 124 | 43 | 15 | 26 | 94 |
| KEY 25 = | 48 | 74 | 74 | 90 | 90 | 61 | 30 | 120 | 0 | 120 |
| KEY 26 = | 105 | 115 | 120 | 31 | 55 | 29 | 70 | 24 | 61 | 107 |
| KEY 27 = | 51 | 107 | 57 | 32 | 29 | 9 | 59 | 50 | 18 | 95 |
| KEY 28 = | 45 | 4 | 53 | 89 | 114 | 78 | 73 | 56 | 105 | 48 |
| KEY 29 = | 123 | 68 | 4 | 24 | 30 | 1 | 47 | 48 | 97 | 83 |
| KEY 30 = | 4 | 84 | 30 | 125 | 59 | 11 | 74 | 74 | 38 | 62 |
| KEY 31 = | 1 | 92 | 44 | 83 | 92 | 109 | 82 | 106 | 17 | 35 |
| KEY 32 = | 105 | 96 | 0 | 11 | 16 | 108 | 0 | 70 | 39 | 109 |

TABLE IV-continued

KEY TABLE

| | | | | | | | | | |
|---|---|---|---|---|---|---|---|---|---|
| KEY 33 = | 85 | 49 | 62 | 75 | 1 | 41 | 29 | 123 | 87 | 14 |
| KEY 34 = | 31 | 29 | 51 | 125 | 101 | 42 | 123 | 98 | 45 | 69 |
| KEY 35 = | 67 | 114 | 81 | 52 | 121 | 45 | 51 | 32 | 86 | 98 |
| KEY 36 = | 45 | 117 | 27 | 30 | 59 | 120 | 67 | 43 | 61 | 124 |
| KEY 37 = | 23 | 48 | 119 | 81 | 16 | 126 | 67 | 12 | 43 | 98 |
| KEY 38 = | 11 | 47 | 51 | 0 | 113 | 122 | 20 | 26 | 123 | 17 |
| KEY 39 = | 57 | 121 | 57 | 28 | 91 | 30 | 123 | 61 | 91 | 60 |
| KEY 40 = | 65 | 123 | 111 | 68 | 34 | 94 | 79 | 92 | 15 | 88 |
| KEY 41 = | 59 | 89 | 79 | 104 | 121 | 43 | 46 | 27 | 6 | 50 |
| KEY 42 = | 120 | 47 | 47 | 85 | 117 | 120 | 50 | 42 | 89 | 51 |
| KEY 43 = | 16 | 14 | 103 | 12 | 126 | 30 | 107 | 20 | 120 | 45 |
| KEY 44 = | 125 | 25 | 14 | 33 | 18 | 101 | 40 | 68 | 35 | 64 |
| KEY 45 = | 12 | 111 | 36 | 10 | 68 | 92 | 14 | 25 | 119 | 3 |
| KEY 46 = | 48 | 95 | 71 | 14 | 11 | 40 | 61 | 123 | 82 | 73 |
| KEY 47 = | 48 | 71 | 12 | 44 | 99 | 63 | 108 | 27 | 73 | 103 |
| KEY 48 = | 58 | 91 | 42 | 42 | 2 | 52 | 32 | 73 | 58 | 31 |
| KEY 49 = | 67 | 97 | 120 | 32 | 97 | 126 | 90 | 39 | 49 | 48 |
| KEY 50 = | 87 | 52 | 104 | 84 | 33 | 24 | 3 | 4 | 42 | 94 |
| KEY 51 = | 26 | 44 | 3 | 123 | 85 | 70 | 21 | 74 | 76 | 121 |
| KEY 52 = | 43 | 106 | 74 | 52 | 20 | 50 | 45 | 18 | 126 | 112 |
| KEY 53 = | 19 | 5 | 43 | 68 | 28 | 65 | 75 | 95 | 104 | 84 |
| KEY 54 = | 102 | 52 | 81 | 40 | 26 | 86 | 16 | 106 | 13 | 47 |
| KEY 55 = | 53 | 95 | 62 | 82 | 55 | 87 | 78 | 47 | 49 | 40 |
| KEY 56 = | 65 | 34 | 38 | 8 | 94 | 4 | 91 | 15 | 15 | 108 |
| KEY 57 = | 57 | 80 | 6 | 41 | 87 | 7 | 55 | 17 | 104 | 21 |
| KEY 58 = | 15 | 4 | 113 | 24 | 55 | 117 | 104 | 57 | 26 | 76 |
| KEY 59 = | 124 | 14 | 1 | 83 | 103 | 92 | 71 | 29 | 4 | 104 |
| KEY 60 = | 3 | 6 | 115 | 41 | 16 | 90 | 125 | 124 | 42 | 34 |
| KEY 61 = | 72 | 98 | 79 | 121 | 27 | 7 | 74 | 40 | 3 | 8 |
| KEY 62 = | 40 | 83 | 118 | 121 | 107 | 108 | 5 | 52 | 72 | 78 |
| KEY 63 = | 70 | 69 | 24 | 2 | 42 | 115 | 127 | 28 | 32 | 75 |
| KEY 64 = | 124 | 61 | 6 | 10 | 112 | 117 | 42 | 111 | 57 | 9 |
| KEY 65 = | 20 | 76 | 85 | 6 | 88 | 12 | 108 | 22 | 87 | 101 |
| KEY 66 = | 75 | 111 | 25 | 52 | 95 | 28 | 98 | 40 | 87 | 122 |
| KEY 67 = | 48 | 68 | 75 | 26 | 77 | 8 | 0 | 41 | 23 | 79 |
| KEY 68 = | 26 | 61 | 44 | 79 | 11 | 9 | 46 | 80 | 62 | 23 |
| KEY 69 = | 58 | 20 | 97 | 59 | 90 | 89 | 50 | 120 | 59 | 52 |
| KEY 70 = | 42 | 119 | 74 | 86 | 34 | 104 | 30 | 59 | 49 | 108 |
| KEY 71 = | 23 | 80 | 54 | 9 | 47 | 11 | 94 | 6 | 96 | 123 |
| KEY 72 = | 41 | 96 | 73 | 71 | 58 | 26 | 111 | 65 | 117 | 90 |
| KEY 73 = | 115 | 76 | 68 | 105 | 29 | 24 | 95 | 5 | 96 | 122 |
| KEY 74 = | 101 | 85 | 81 | 11 | 51 | 68 | 28 | 77 | 3 | 108 |
| KEY 75 = | 126 | 86 | 99 | 30 | 21 | 54 | 122 | 119 | 124 | 16 |
| KEY 76 = | 62 | 15 | 15 | 33 | 90 | 104 | 8 | 53 | 86 | 114 |
| KEY 77 = | 33 | 120 | 87 | 109 | 49 | 51 | 57 | 35 | 61 | 100 |
| KEY 78 = | 4 | 43 | 72 | 61 | 35 | 9 | 12 | 95 | 17 | 12 |
| KEY 79 = | 82 | 102 | 0 | 66 | 46 | 105 | 109 | 45 | 34 | 71 |
| KEY 80 = | 116 | 98 | 35 | 20 | 110 | 27 | 82 | 122 | 8 | 99 |
| KEY 81 = | 103 | 39 | 69 | 34 | 83 | 86 | 74 | 81 | 9 | 119 |
| KEY 82 = | 33 | 26 | 44 | 87 | 97 | 27 | 13 | 86 | 78 | 71 |
| KEY 83 = | 73 | 1 | 4 | 69 | 5 | 82 | 74 | 87 | 49 | 117 |
| KEY 84 = | 104 | 45 | 121 | 122 | 14 | 12 | 67 | 31 | 9 | 13 |
| KEY 85 = | 118 | 42 | 61 | 121 | 19 | 2 | 54 | 81 | 99 | 93 |
| KEY 86 = | 34 | 73 | 118 | 14 | 69 | 42 | 123 | 83 | 119 | 77 |
| KEY 87 = | 81 | 104 | 102 | 74 | 57 | 34 | 78 | 8 | 19 | 0 |
| KEY 88 = | 51 | 114 | 30 | 103 | 127 | 85 | 108 | 123 | 113 | 24 |
| KEY 89 = | 25 | 12 | 87 | 6 | 64 | 90 | 124 | 115 | 69 | 3 |
| KEY 90 = | 110 | 116 | 65 | 121 | 12 | 5 | 19 | 108 | 21 | 60 |
| KEY 91 = | 26 | 108 | 63 | 82 | 31 | 84 | 90 | 48 | 10 | 116 |
| KEY 92 = | 110 | 127 | 117 | 96 | 91 | 98 | 99 | 33 | 70 | 104 |
| KEY 93 = | 101 | 95 | 21 | 6 | 112 | 9 | 77 | 74 | 10 | 6 |
| KEY 94 = | 103 | 125 | 43 | 52 | 33 | 76 | 97 | 58 | 80 | 82 |
| KEY 95 = | 72 | 73 | 57 | 33 | 100 | 99 | 36 | 11 | 123 | 2 |
| KEY 96 = | 63 | 107 | 84 | 51 | 18 | 102 | 59 | 101 | 102 | 36 |
| KEY 97 = | 89 | 99 | 66 | 113 | 69 | 115 | 123 | 76 | 35 | 41 |
| KEY 98 = | 29 | 63 | 39 | 94 | 76 | 82 | 26 | 61 | 22 | 115 |
| KEY 99 = | 97 | 104 | 51 | 103 | 52 | 50 | 110 | 68 | 28 | 12 |
| KEY 100 = | 4 | 97 | 30 | 11 | 122 | 92 | 42 | 124 | 91 | 4 |
| KEY 101 = | 88 | 11 | 36 | 32 | 24 | 105 | 119 | 40 | 91 | 55 |
| KEY 102 = | 71 | 36 | 102 | 125 | 113 | 57 | 19 | 58 | 88 | 35 |
| KEY 103 = | 11 | 23 | 31 | 24 | 58 | 48 | 55 | 74 | 125 | 111 |
| KEY 104 = | 4 | 95 | 102 | 126 | 125 | 100 | 92 | 3 | 92 | 55 |
| KEY 105 = | 12 | 83 | 82 | 75 | 36 | 71 | 126 | 77 | 79 | 61 |
| KEY 106 = | 39 | 95 | 101 | 69 | 77 | 110 | 29 | 97 | 47 | 102 |
| KEY 107 = | 36 | 123 | 45 | 10 | 55 | 59 | 109 | 45 | 98 | 24 |
| KEY 108 = | 46 | 124 | 115 | 81 | 65 | 75 | 31 | 48 | 33 | 110 |
| KEY 109 = | 18 | 124 | 21 | 37 | 43 | 73 | 127 | 37 | 126 | 75 |
| KEY 110 = | 121 | 113 | 53 | 118 | 97 | 77 | 41 | 22 | 114 | 70 |
| KEY 111 = | 33 | 81 | 68 | 67 | 74 | 3 | 67 | 24 | 60 | 96 |
| KEY 112 = | 104 | 31 | 67 | 124 | 84 | 99 | 68 | 95 | 9 | 20 |
| KEY 113 = | 74 | 121 | 92 | 101 | 12 | 57 | 114 | 65 | 45 | 3 |

TABLE IV-continued
KEY TABLE

| | | | | | | | | | | |
|---|---|---|---|---|---|---|---|---|---|---|
| KEY 114 = | 83 | 17 | 59 | 35 | 86 | 21 | 31 | 63 | 102 | 101 |
| KEY 115 = | 31 | 7 | 87 | 110 | 11 | 35 | 94 | 35 | 110 | 118 |
| KEY 116 = | 35 | 51 | 66 | 112 | 33 | 113 | 66 | 43 | 58 | 4 |
| KEY 117 = | 36 | 6 | 59 | 82 | 58 | 77 | 2 | 36 | 103 | 93 |
| KEY 118 = | 95 | 25 | 48 | 47 | 1 | 20 | 117 | 55 | 19 | 67 |
| KEY 119 = | 117 | 48 | 102 | 0 | 11 | 37 | 94 | 19 | 22 | 45 |
| KEY 120 = | 14 | 125 | 59 | 92 | 35 | 94 | 58 | 104 | 84 | 71 |
| KEY 121 = | 37 | 34 | 56 | 124 | 124 | 29 | 67 | 33 | 4 | 14 |
| KEY 122 = | 97 | 54 | 123 | 125 | 69 | 95 | 37 | 118 | 19 | 4 |
| KEY 123 = | 72 | 104 | 81 | 10 | 40 | 85 | 125 | 25 | 121 | 109 |
| KEY 124 = | 95 | 27 | 107 | 111 | 5 | 53 | 110 | 29 | 116 | 37 |
| KEY 125 = | 44 | 46 | 118 | 68 | 34 | 69 | 125 | 3 | 94 | 65 |
| KEY 126 = | 62 | 110 | 70 | 27 | 124 | 31 | 119 | 97 | 9 | 2 |
| KEY 127 = | 11 | 54 | 25 | 87 | 107 | 73 | 4 | 118 | 62 | 34 |

I claim:

1. A method of cryptographically transforming electronic digital data from one form to another comprising the steps of:
   a. establishing in memory at least one transformation table associated with a predetermined cryptographic function, said table including a plurality of addressable entries which each direct a predetermined transformation of data in accordance with said function;
   b. establishing in memory one or more key based determinants;
   c. selecting one of said entries in said transformation table based upon certain information in one of said data key based determinants; and
   d. cryptographically transforming said data by said function in accordance with the directions of said selected entry in said transformation table.

2. A method of generating a table of keys for use in cryptographically transforming electronic digital data from one form to another comprising the steps of:
   a. establishing an initial key;
   b. establishing in memory at least one transformation table associated with a predetermined cryptographic function, said table including a plurality of addressable entries which each direct a predetermined transformation of data in accordance with said function;
   c. selecting at least one of said entries in said transformation table based upon certain information in said initial key;
   d. transforming said initial key by said function in accordance with the directions of said selected entry in said transformation table;
   e. storing said transformed initial key as an entry in the key table memory;
   f. selecting at least one of said entries in said transformation table based upon certain information in the initial key or in a key stored in the key table memory;
   g. transforming the key used in step (f) above by said function in accordance with the directions of said selected entry in said transformation table;
   h. storing said transformed key as another entry in the key table memory; and
   i. performing steps (f)-(h) above repetitively until said key table memory has a desired plurality of keys stored therein.

3. The method of claim 2 wherein said initial key is not stored as an entry in the key table memory.

4. The method of claim 2 wherein said transformation table entry selected in step (f) above is based upon certain information in the latest key stored in the key table memory.

5. A method of generating a table of keys for use in cryptographically transforming electronic digital data from one form to another comprising the steps of:
   a. establishing an initial key having a plurality of bytes;
   b. establishing in memory a plurality of transformation tables, each associated with a predetermined cryptographic function, each of said tables including a plurality of addressable entries which direct a predetermined transformation of data in accordance with said function;
   c. selecting, in turn, at least one of said entries in each of said transformation tables based upon certain information in said initial key;
   d. transforming said initial key by said functions in accordance with the directions of said selected entries in said transformation tables;
   e. storing said transformed initial key as an entry in the key table memory;
   f. selecting, in turn, at least one of said entries in each of said transformation tables based upon certain information in at least one of the keys stored in the key table memory;
   g. transforming the key used in step (f) above by said functions in accordance with the directions of said selected entries in said transformation tables;
   h. storing said transformed key as another entry in the key table memory; and
   i. performing steps (f)-(h) above repetitively until said key table memory has a desired plurality of keys stored therein.

6. The method of claim 5 wherein said initial key is not stored as an entry in the key table memory.

7. The method of claim 5 wherein the entries in the transformation tables selected in step (f) above are based upon certain information in the latest key stored in the key table memory.

8. The method of claim 5 wherein said transformation tables include a substitution table with a plurality of entries for directing a particular substitution on said key undergoing transformation.

9. The method of claim 5 wherein said transformation tables include a permutation table with a plurality of entries for directing a particular permutation on said key undergoing transformation.

10. The method of claim 5 wherein said transformation tables include an enclave table with a plurality of entries for directing a particular transformation on said key undergoing transformation in which each byte in said key becomes a function of itself and of every other byte in the key.

11. The method of claim 5 wherein said transformation tables include a substitution table with a plurality of entries for directing a particular substitution on said key undergoing transformation and a permutation table with a plurality of entries for directing a particular permutation on said key undergoing transformation.

12. The method of claim 5 wherein said transformation tables include a substitution table with a plurality of entries for directing a particular substitution on said key undergoing transformation, a permutation table with a plurality of entries for directing a particular permutation on said key undergoing transformation, and an enclave table with a plurality of entries for directing a particular transformation on said key undergoing transformation in which each byte in said key becomes a function of itself and of every other byte in the key.

13. The method of claim 12 wherein the substitution table entry, the permutation table entry and the enclave table entry selected is determined by an arithmetic combination of the values of a portion of the bytes in the key undergoing transformation.

14. The method of claim 12 wherein said key undergoing transformation is first substituted in accordance with the selected entry in the substitution table, is then permutated in accordance with the selected entry in the permutation table, and is then transformed in accordance with the selected entry in the enclave table.

15. The method of claim 14 wherein the substitution and permutation table entries selected are determined by an arithmetic combination of the values of a portion of the bytes in the key undergoing transformation, and the enclave table entry selected is determined by an arithmetic combination of the values of a portion of the bytes in the key after it has been substituted and permutated.

16. The method of claim 15 wherein the substitution table entry selected is determined by an arithmetic combination of the values of one-half of the bytes in the key undergoing transformation and the permutation table entry selected is determined by an arithmetic combination of the values of the other half of the bytes in the key undergoing transformation.

17. A method cryptographically transforming electronic data from one form to another comprising the steps of:
 a. establishing in memory a key table with a plurality of multi-byte key entries;
 b. selecting a multi-byte block of data for transformation;
 c. selecting an entry from the key table based on information in at least one of the bytes of the data block;
 d. arithmetically combining each byte in the selected key with a corresponding byte in the data block, except that the bytes in the data block used to select the entry from the key table remain unchanged; and
 e. repeating steps (c) and (d) above for a plurality of rounds and using a different byte of the data block in each round for selecting the entry from the key table.

18. A method of cryptographically transforming electronic data from one form to another comprising the steps of:
 a. establishing in memory a key table with a plurality of multi-byte key entries;
 b. selecting a multi-byte block of data for transformation;
 c. selecting an entry from the key table based on information in at least one of the bytes of the data block;
 d. arithmetically combining each byte in the selected key with a corresponding byte in the data block, except that the bytes in the data block used to select the entry from the key table remain unchanged; and
 e. repeating steps (c) and (d) above for a plurality of rounds.

19. The method of claims 17 or 18 further including the steps of generating from the key table a determinant table having a plurality of entries which are each the result of an arithmetic combination of two or more values in the key table, and then combining an entry from said determinant table with said one of the values in the data block undergoing transformation to select an entry from the key table.

20. The method of claim 19 wherein a different entry from said determinant table is used during each round.

21. The method of claim 19 wherein the entry from the determinant table and said one of the bytes in the data block are combined by an Exclusive OR operation.

22. The method of claim 19 wherein the value of the entry from the determinant table is added to the value of said one of the bytes in the data block.

23. A method of cryptographically transforming electronic data from one form to another comprising the steps of:
 a. establishing in memory a key table with a plurality of multi-byte key entries;
 b. establishing in memory one or more multi-byte key based determinants;
 c. selecting a multi-byte block of data for transformation;
 d. selecting an entry from the key table based on information in at least one of the bytes of one of said key based determinants;
 e. arithmetically combining each byte in the selected key with a corresponding byte in the data block; and
 f. repeating steps (d) and (e) above for a plurality of rounds.

24. The method of claims 17, 18 or 23 wherein the bits in the selected key are arithmetically combined with the corresponding bits in the data block undergoing transformation by an Exclusive OR operation.

25. The method of claims 17, 18 or 23 wherein the values of the bytes in the selected key are added to the values of the corresponding bytes in the data block undergoing transformation.

26. The method of claims 17, 18 or 23 wherein said key table is established by the steps of:
 f. establishing an initial key;
 g. establishing in memory at least one transformation table associated with a predetermined cryptographic function, said table including a plurality of addressable entries which each direct a predetermined transformation of data in accordance with said function;
 h. selecting at least one of said entries in said transformation table based upon certain information in said initial key;
 i. transforming said initial key by said function in accordance with the directions of said selected entry in said transformation table;

j. storing said transformed initial key as an entry in the key table memory;

k. selecting at least one of said entries in said transformation table based upon certain information in the initial key or in a key stored in the key table memory;

l. transforming the key used in step (k) above by said function in accordance with the directions of said selected entry in said transformation table;

m. storing said transformed key as another entry in the key table memory; and n. performing steps (k)–(m) above repetitively until said key table memory has a desired plurality of keys stored therein.

27. The method of claim 26 wherein said initial key is not stored as an entry in the key table memory.

28. The method of claim 26 wherein said transformation table entry selected in step (k) above is based upon certain information in the latest key stored in the key table memory.

29. The method of claims 17, 18 or 23 wherein said key table is generated by the steps of:

f. establishing an initial key having a plurality of bytes;

g. establishing in memory a plurality of transformation tables, each associated with a predetermined cryptographic function, each of said tables including a plurality of addressable entries which direct a predetermined transformation of data in accordance with said function;

h. selecting, in turn, at least one of said entries in each of said transformation tables based upon certain information in said initial key;

i. transforming said initial key by said functions in accordance with the directions of said selected entries in said transformation tables;

j. storing said transformed initial key as an entry in the key table memory;

k. selecting, in turn, at least one of said entries in each of said transformation tables based upon certain information in at least one of the keys stored in the key table memory;

l. transforming the key used in step (k) above by said functions in accordance with the directions of said selected entries in said transformation tables;

m. storing said transformed key as another entry in the key table memory; and n. performing steps (k)–(m) above repetitively until said key table memory has a desired plurality of keys stored therein.

30. The method of claim 29 wherein said initial key is not stored as an entry in the key table memory.

31. The method of claim 29 wherein the entries in the transformation tables selected in step (k) above are based upon certain information in the latest key stored in the key table memory.

32. The method of claim 29 wherein said transformation tables include a substitution table with a plurality of entries for directing a particular substitution on said key undergoing transformation and a permutation table with a plurality of entries for directing a particular permutation on said key undergoing transformation.

33. The method of claim 29 wherein said transformation tables include a substitution table with a plurality of entries for directing a particular substitution on said key undergoing transformation, a permutation table with a plurality of entries for directing a particular permutation on said key undergoing transformation, and an enclave table with a plurality of entries for directing a particular transformation on said key undergoing transformation in which each byte in said key becomes a function of itself and of every other byte in the key.

34. A method cryptographically transforming electronic data from one form to another comprising the steps of:

a. establishing in memory at least one transformation table associated with a predetermined cryptographic function, said table including a plurality of addressable entries which direct a predetermined transformation of data in accordance with said function;

b. selecting at least one of the entries in said transformation table based upon certain information in the data undergoing transformation;

c. cryptographically transforming the data by said function in accordance with the directions of the entry in the transformation table selected in step (b);

d. arithmetically combining the data transformed in step (c) above with a key;

e. selecting at least one other entry in said transformation table based upon certain information in the data transformed in step (d) above; and f. cryptographically transforming the data transformed in step (d) above by said function in accordance with the directions of the entry in the transformation table selected in step (e).

35. The method of claim 34 wherein steps (b) through (f) are carried out repetitively in a predetermined number of rounds.

36. A method of cryptographically transforming electronic data from one form to another comprising the steps of:

a. establishing in memory a first transformation table associated with a first cryptographic function and a second transformation table associated with a second cryptographic function, said tables each including a plurality of addressable entries which direct a predetermined transformation of data in accordance with said functions;

b. selecting at least one of the entries in said first transformation table based upon certain information in said data undergoing transformation;

c. cryptographically transforming said data by said first function in accordance with the directions of the entry in the first transformation table selected in step (b);

d. arithmetically combining the data transformed in step (c) above with a key;

e. selecting at least one of the entries in the second transformation table based upon certain information in the data transformed in step (d) above; and f. cryptographically transforming the data transformed in step (d) above by the second function in accordance with the directions of the entry in the second transformation table selected in step (e).

37. The method of claim 36 wherein steps (b) through (f) are carried out repetitively in a predetermined number of rounds.

38. An enclave function for cryptographically transforming electronic digital data from one form to another comprising the steps of:

a. establishing in memory an enclave table with a plurality of entries for directing an autoclave function on a portion of the data undergoing transformation;

b. selecting a block of data having an even number of bytes;

c. dividing said data block into a first half-block including one-half of the bytes of the data block and into a second half-block including the remaining bytes of the data block;

d. transforming the first half-block by said autoclave function as directed by a first entry in said enclave table;

e. transforming the resultant first half-block after step (d) above by said autoclave function as directed by a second entry in said enclave table;

f. combining the second half-block with the resultant first half-block after step (e) above by an Exclusive OR operation to generate resultant second half-block;

g. transforming the resultant second half-block after step (f) above by said autoclave function as directed by a third entry in said enclave table;

h. transforming the resultant second half-block after step (g) above by said autoclave function as directed by a fourth entry in said enclave table;

i. combining the resultant second half-block after step (h) above with the resultant first half-block after step (e) above by an Exclusive OR operation to generate a resultant first half-block; and j. joining said resultant first half-block after step (i) above to said resultant second half-block after step (h) above to form the transformed data block.

39. The method of claim 38 wherein the autoclave function used includes the steps of modifying a byte in the half-block undergoing transformation by adding said byte to at least two other bytes in the half-block, and sequentially repeating this addition process on each of the other bytes in the half-block, using different bytes in each repetition to be added to the byte, undergoing transformation.

40. A method of cryptographically transforming electronic data from one form to another comprising the steps of:

a. establishing in memory a permutation table with a plurality of addressable entries for directing a particular permutation of said data undergoing transformation;

b. establishing in memory a substitution table with a plurality of addressable entries for directing a particular substitution on said data undergoing transformation;

c. selecting at least one of the entries in one of said permutation and substitution tables based upon certain information in said data undergoing transformation;

d. cryptographically transforming said data in accordance with the table entry selected in step (c) above and the function associated therewith;

e. arithmetically combining the data transformed in step (d) with a key;

f. selecting at least one of the entries in the other of said permutation and substitution tables; and g. cryptographically transforming the data transformed in step (e) in accordance with the table entry selected in step (f) and the function associated therewith.

41. The method of claim 40 wherein the substitution table entry selected is determined by the value of one of the bytes in the data undergoing transformation and the substitution function is carried out on all bytes in the data except for the byte used to select the entry from the substitution table, which byte remains unchanged.

42. The method of claims 40 or 41 further including the steps of establishing an enclave table with a plurality of entries for directing an enclave transformation in which each byte in the data undergoing transformation becomes a function of itself and of every other byte in the data, selecting at least one of said entries in said enclave table, and transforming the data in accordance with the directions of the selected entry in the enclave table.

43. The method of claim 40 further including the steps of generating from said key a determinant table having a plurality of entries which are the result of an arithmetic combination of two or more values in the key, and then using one entry in said determinant table to select the entry from the enclave table used in the enclave function transformation of the data.

44. The method of claim 40 wherein steps (b) through (g) are carried out repetitively in a predetermined number of rounds.

45. The method of claim 44 wherein the substitution table entry selected is determined by the value of one of the bytes in the data undergoing transformation, the substitution function is carried out on all bytes in the data except for the byte used to select the entry from the substitution table, which byte remains unchanged, and a different byte in the data undergoing transformation is used in each round to select the substitution table entry.

46. The method of claim 45 further including the steps of selecting a second entry in the substitution table based upon certain information in the data undergoing transformation after it has been subjected to said substitution function, and then cryptographically transforming said data by a second substitution function in accordance with the second entry selected.

47. The method of claim 46 wherein the substitution table entry selected for the second substitution is determined by the value of one of the bytes in the data undergoing transformation, excluding the byte used in claim 62 for determining the substitution table entry for the initial substitution function.

48. The method of claim 44 wherein the step of combining the transformed data with a key includes the steps of:

h. establishing in memory a key table with a plurality of multi-byte key entries;

i. selecting an entry from the key table based on information in at least one of the bytes in the data undergoing transformation; and j. arithmetically combining each byte in the selected key with a corresponding byte in the data undergoing transformation, except that the data bytes used to select the key from the table entry remain unchanged, with a different byte in the data undergoing transformation used in each round to select the entry from the key table.

49. The method of claim 44 wherein the step of combining the transformed data with a key includes the steps of: p1 h. establishing in memory a key table with a plurality of multi-byte key entries;

i. selecting an entry from the key table based on information in at least one of the bytes in the data undergoing transformation; and j. arithmetically combining each byte in the selected key with a corresponding byte in the data undergoing transformation, except that the data bytes used to select the key from the table entry remain unchanged.

50. The method of claim 44 wherein the step of combining the transformed data with a key includes the steps of:
   h. establishing in memory a key table with a plurality of multi-byte key entries;
   i. selecting an entry from the key table based on information in at least one of the bytes in the data undergoing transformation; and
   j. arithmetically combining each byte in the selected key with a corresponding byte in the data undergoing transformation.

51. The method of claims 48, 49 or 50 wherein bits in the selected key are arithmetically combined with the corresponding bits in the data undergoing transformation by an Exclusive OR operation.

52. The method of claims 48, 49, or 50 further including the steps of generating from the key table a determinant table having a plurality of entries which are each the result of an arithmetic combination of two or more values in the key table, and then combining an entry from said determinant table with said one of the values in the data undergoing transformation to select an entry from the key table.

53. The method of claim 52 wherein a different entry from said determinant table is used during each round.

54. The method of claim 52 wherein the entry from the determinant table and said one of the bytes in the data undergoing transformation are combined by an Exclusive OR operation.

55. The method of claims 48, 49 or 50 wherein said key table is established by the steps of:
   k. establishing an initial key having a plurality of bytes;
   l. selecting, in turn, at least one of said entries in each of said permutation and substitution tables based upon certain information in said initial key;
   m. transforming said initial key by said substitution and permutation functions in accordance with the directions of said selected entries in said tables;
   n. storing said transformed initial key as an entry in the key table memory;
   o. electing, in turn, at least one of said entries in each of said substitution and permutation tables based upon certain information in at least one of the keys stored in the key table memory.
   p. transforming the key used in step (o) above by said substitution and permutation functions in accordance with the directions of said selected entries in said tables;
   q. storing said transformed key as another entry in the key table memory; and
   r. performing steps (o)-(q) above repetitively until said key table memory has a desired plurality of keys stored therein.

56. The method of claim 55 wherein said initial key is not stored as an entry in the key table memory.

57. The method of claim 55 wherein the entries in the substitution and permutation tables selected in step (o) above are based upon certain information in the latest key stored in the key table memory.

58. The method of claims 48, 49 or 50 further including the steps of establishing an enclave table with a plurality of entries for directing an enclave transformation in which each byte in the data undergoing transformation in which each byte in the data undergoing transformation becomes a function of itself and of every other byte in the data, selecting at least one of said entries in said enclave table, and transforming the data in accordance with the directions of the selected entry in the enclave table.

59. The method of claim 58 further including the steps of generating from said key table a determinant table having a plurality of entries which are the result of an arithmetic combination of two or more values in the key table, and then using one entry in said determinant table to select the entry from the enclave table used in the enclave function transformation of the data.

60. The method of claim 59 wherein a different entry from said determinant table is used during each round.

61. The method of claims 48, 49 or 50 further including the steps of selecting a second key from the key table memory based on the value of one of the bytes in the data undergoing transformation, excluding the byte used in claims 48, 49 or 50 and arithmetically combining each byte in the selected second key with a corresponding byte in the data undergoing transformation, except that the byte used to select the second key remains unchanged, with a different byte in the data undergoing transformation used in each round to select the second key.

62. The method of claims 40 or 44 wherein the permutation table entry selected is determined by an arithmetic combination of the values of the bytes in the data undergoing transformation.

* * * * *

UNITED STATES PATENT AND TRADEMARK OFFICE
CERTIFICATE OF CORRECTION

PATENT NO. : 5,003,596                                                           Page 1 of 2

DATED : March 26, 1991

INVENTOR(S) : Michael C. Wood

It is certified that error appears in the above-identified patent and that said Letters Patent is hereby corrected as shown below:

On the title page, Item [56]:

Under Referenced Cited U.S. PATENT DOCUMENTS "3,461,451 8/1969 Guteber 341/178" should read --3,461,451 8/1969 Gutleber 341/178--.

and under

OTHER PUBLICATIONS insert

--Favre et al., "Data Scrambler Using Table Look-Up Procedure"; IBM Technical Disclosure Bulletin, (Vol. 20, No. 7; 12/77; pp. 2724-2726; 380/28).--.

Column 2 Line 5 after "for" insert --business and non-military government use. Patents--.

Column 3 Line 17 following "is" insert --shown--.

Column 5 Line 37 "2 modulus 1." should read --2 = modulus - 1.--.

Column 19 Line 55 "key" should read --$key_o$--.

UNITED STATES PATENT AND TRADEMARK OFFICE
CERTIFICATE OF CORRECTION

PATENT NO. : 5,003,596
DATED : March 26, 1991
INVENTOR(S) : Michael C. Wood

It is certified that error appears in the above-identified patent and that said Letters Patent is hereby corrected as shown below:

Column 29 Line 55 "5" should read --85--.

Column 29 Line 56 "28" should read --128--.

Claim 1 c. Lines 30-31 Column 47 after "said" delete --data--.

Claim 29 Line 43 Column 51 "1" should read --l--.

Claim 43 Line 12 Column 54 "40" should read --42--.

Claim 47 Line 42 Column 54 "62" should read --39--.

Claim 49 Line 61 Column 54 "of: p1 h." should read --of:
h.--.

Claim 55 o. Line 44 Column 55 "electing" should read --selecting--.

Claim 58 Lines 17-18 Column 56 after "transformation" delete
--in which each byte in the data undergoing transformation--.

Signed and Sealed this

Eighth Day of June, 1993

Attest:

MICHAEL K. KIRK

Attesting Officer

Acting Commissioner of Patents and Trademarks